United States Patent
Nohara

(10) Patent No.: US 7,043,257 B2
(45) Date of Patent: May 9, 2006

(54) POSITIONING APPARATUS, POSITIONING METHOD, AND POSITIONING SYSTEM

(75) Inventor: Manabu Nohara, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 654 days.

(21) Appl. No.: 10/083,292

(22) Filed: Feb. 27, 2002

(65) Prior Publication Data
US 2002/0151314 A1 Oct. 17, 2002

(30) Foreign Application Priority Data
Feb. 27, 2001 (JP) ............................. 2001-051476

(51) Int. Cl.
*H04Q 7/20* (2006.01)

(52) U.S. Cl. ................... 455/456.6; 455/65; 455/456.1; 370/386; 370/450; 370/453; 375/342

(58) Field of Classification Search ............... 455/63.1, 455/65, 67.13, 456.1, 456.5, 456.6; 342/386, 342/387, 450, 453, 457, 458, 464; 375/342
See application file for complete search history.

(56) References Cited

U.S. PATENT DOCUMENTS

| 5,945,948 | A | 8/1999 | Buford et al. |
| 5,982,324 | A | 11/1999 | Watters et al. |
| 6,310,576 | B1 * | 10/2001 | Johnson ....................... 342/465 |
| 6,342,854 | B1 * | 1/2002 | Duffett-Smith et al. ..... 342/457 |
| 6,356,608 | B1 * | 3/2002 | Atarius ....................... 375/362 |
| 6,414,634 | B1 * | 7/2002 | Tekinay ....................... 342/453 |
| 2002/0142726 | A1 * | 10/2002 | Hunzinger ................... 455/65 |

FOREIGN PATENT DOCUMENTS

| WO | 99/11086 WO | 3/1999 |
| WO | WO 99/11086 | 3/1999 |

* cited by examiner

*Primary Examiner*—William Trost
*Assistant Examiner*—James D. Ewart
(74) *Attorney, Agent, or Firm*—Arent Fox PLLC

(57) ABSTRACT

A positioning apparatus for determining a present position of a mobile station by using radio waves coming from a plurality of base stations arranged within a communication area is provided. The positioning apparatus receives the radio waves coming from the plurality of base stations to generate reception signals corresponding to the respective radio waves, and determines propagation ranges of the radio waves coming from the respective base stations. The apparatus further derives propagation ranges of direct waves coming from the respective base stations from the determined propagation ranges. Then, the present position of the mobile station is determined by performing positioning operation using the derived propagation ranges of the direct waves.

49 Claims, 30 Drawing Sheets

POSITIONING APPARATUS, POSITIONING METHOD, AND POSITIONING SYSTEM

BACKGROUND OF THE INVENTION

1. Field of the Invention

The invention relates to a communications technology using radio communications. In particular, the invention relates to a positioning apparatus, a positioning method, and a positioning system for determining the position of a mobile station such as a cellular phone.

The present application claims priority from Japanese Application No. 2001-051476, the disclosure of which is incorporated herein by reference for all purposes.

2. Description of the Related Art

In recent years, communication systems using radio communications start prevailing rapidly. Further developments are expected in the fields of mobile communications, such as cellular phones and pagers, and navigation systems for assisting persons and vehicles in moving.

For further progress of these communication systems, it is desired to develop positioning methods and the like which determine the position of a mobile station such as a movable cellular phone and navigation system, establish a stable communication state etc. with base stations according to the result of positioning, and also ensure adaptability to mobile communications environments and navigation system environments which are becoming diversified.

Among the conventional positioning methods is a positioning method for a mobile communications system of code division multiple access (CDMA) scheme.

In this positioning method, as shown in FIG. 25, a cellular phone, or mobile station P, receives radio waves emitted from base stations A, B, and C which are arranged within the communication area. The propagation time (or propagation ranges) required for the radio waves to reach the mobile station P from the respective base stations A, B, and C are determined, and a triangulation-based analysis is performed to determine the position of the mobile station P with respect to the base stations A, B, and C.

The conventional positioning method will be described more concretely. As shown in FIG. 26, the mobile station P contains a positioning apparatus which has a range measuring unit 6 and a position computing unit 7 connected to a receiving unit 1.

The mobile station P includes the receiving unit 1, a transmitting unit 2, an RF unit 3, and a transmitting/receiving antenna ANT for conducting communications with base stations. In the mobile station P, the transmitting/receiving antenna ANT receives the incoming waves from the base stations A, B, and C. Reception signals resulting from the reception are down-converted by the RF unit 3 before they are A/D converted into digital data. The digital data is passed through a roll-off filter 4 and despread by a demodulating unit 5 to generate reception data Drx. The range measuring unit 6 and the position computing unit 7 arranged in the mobile station P perform the triangulation-based analysis using output data Dd of the roll-off filter 4 and the reception data Drx of the demodulating unit 5 to determine the present position of the mobile station P.

As shown in FIG. 27, the range measuring unit 6 includes a correlator 8 and a range computing unit 9. The correlator 8 obtains correlations between correlating data DA, DB, and DC having correlativity to the incoming waves from the base stations A, B, and C, and the output data Dd from the roll-off filter 4, respectively. The range computing unit 9 analyzes correlation values CRRA, CRRB, and CRRC determined by the correlation operations to detect the propagation ranges LA, LB, and LC of the respective incoming waves.

More specifically, as shown in FIGS. 28(a)–28(c), the correlator 8 computes the correlation values CRRA, CRRB, and CRRC corresponding to the incoming waves from the base stations A, B, and C, respectively. The range computing unit 9 compares those correlation values CRRA, CRRB, and CRRC with a predetermined threshold value THD to peak-detect positions (points of time) tA, tB, and tC where the correlation values reach their maximums, respectively. Then, the phase differences τA, τB, and τC up to the respective points of time tA, tB, and tC are regarded as propagation time, and are converted into propagation ranges. Thereby, the propagation ranges LA, LB, and LC of the incoming waves are determined.

The position computing unit 7 subjects the propagation ranges LA, LB, and LC to the above-mentioned triangulation for analysis, and thereby determines the position of the cellular phone P. In other words, the base stations A, B, and C are supposed to transmit radio waves which contain information for indicating the positions (latitudes, longitudes) of the respective base stations A, B, and C. Upon reception, the position computing unit 7 extracts the positional information as to the base stations A, B, and C out of the reception data Drx. It analyzes the positional information extracted and the propagation ranges LA, LB, and LC through the application of the triangulation, and obtains positional data Dp which shows the present position of the mobile station P.

The conventional positioning method, however, has had the problems that the positioning precision may deteriorate due to the influence of multipath fading and noise, and that it is difficult to improve the positioning precision because of the susceptibility to multipath fading and noise.

To name a concrete example for description, as shown in FIG. 29, a building or suchlike shielding BL1 lies between, e.g., the base station A and the mobile station P. Here, the direct wave coming from the base station A to the mobile station P lowers in level accordingly. Besides, multipath waves reflected from other buildings or suchlike reflecting objects BL2 and BL3 shall arrive at the mobile station P. In such a case, as shown in FIG. 30(a), a plurality of peak values greater than the threshold value THD can appear in the correlation value CRRA, resulting from the direct wave and the multipath waves. This makes it impossible to determine which peak value is of the direct wave. This has caused the problem that a peak value occurring from a multipath wave can possibly misjudged to be of the direct wave.

In addition, the direct wave relatively decreases in level as compared to the multipath waves coming to the mobile station P because of the shielding BL. This has produced the problem that when the peak value resulting from the direct wave falls below the threshold value THD and a peak value resulting from a multipath wave exceeds the threshold value THD, as shown in FIG. 30(b), the phase difference (time) τAe up to the position of appearance of the peak value resulting from the multipath wave can be misjudged to be of the direct wave.

Such a condition as shown in FIG. 30(b) also occurs not only under the influence of multipath waves but also in cases where noise having correlativity to the correlating data DA for the base station A is received and the peak value resulting from the noise appears in the correlation value CRRA. Hence, there has been a problem of difficult distinction between noise and a direct wave.

In the presence of such problems, i.e., situations that the propagation time or propagation range of the direct wave coming from the base station A to the mobile station P is misjudged as the propagation time τAe or propagation range LAe resulting from a multipath wave or noise, then a position Pe off the original position (true position) of the mobile station P might be determined to be the present position as shown in FIG. 31. This has deteriorated the positioning precision.

The foregoing example has dealt with the case where the direct wave from the base station A cannot be detected with high precision. High precision detection may also fail on the direct waves from the other base stations B and C, due to the effects of multipath waves and the like. Thus, it has been difficult to improve the positioning precision.

That is, in the triangulation, the positions of the respective base stations A, B, and C are known. Therefore, as long as the propagation ranges LA, LB, and LC of the three direct waves from the base stations A, B, and C are precisely detectable, the true position of the mobile station P may be considered to fall at a single point where three circles intersect one another on the assumption that the three circles are drawn around the base stations A, B, and C with the propagation ranges LA, LB, and LC as the radii, respectively. Nevertheless, in actual communication environment, the propagation ranges of the incoming waves from the base stations A, B, and C to the mobile station P may vary with errors at random due to the influence of multipath fading and noise. It follows that various positions, e.g., those in the hatched region in FIG. 31 can be misjudged to be the true position of the mobile station P. This has caused a problem of difficult improvement in positioning precision.

SUMMARY OF THE INVENTION

The present invention has been achieved in view of the foregoing conventional problems. It is thus an object of the present invention to provide a positioning apparatus, a positioning method, and a positioning system which can determine the position of a mobile station with higher precision and ensure adaptability, for example, to mobile communications environments, navigation environments, and the like which are becoming diversified.

To achieve the foregoing object, a positioning apparatus, a positioning method, and a positioning system of the present invention determine the present position of a mobile station by using radio waves coming from a plurality of base stations arranged within a communication area. Here, the radio waves coming from the plurality of base stations are received to generate reception signals corresponding to the respective radio waves. A plurality of direct wave candidates of the radio waves coming from the respective base stations are extracted out of the reception signals generated. Reception signals equivalent to direct waves are derived from the plurality of direct wave candidates extracted. The present position of the mobile station is determined from the reception signals derived.

According to the invention, direct wave candidates are extracted from the plurality of radio waves coming from the plurality of base stations to the mobile station, and the reception signals equivalent to the direct waves are derived from the direct wave candidates. Then, the reception signals derived are used to determine the present position of the mobile position, whereby the present position of the mobile station is determined with high precision.

To achieve the foregoing object, a positioning apparatus, a positioning method, and a positioning system of the present invention determine the present position of a mobile station by using radio waves coming from the mobile station to a plurality of base stations arranged within a communication area. Here, the radio waves coming from the mobile station are received to generate reception signals corresponding to the respective radio waves. A plurality of direct wave candidates of the radio waves coming to the respective base stations are extracted from the reception signals generated. Reception signals equivalent to direct waves are derived from the plurality of direct wave candidates extracted. The present position of the mobile station is determined from the reception signals derived.

According to the invention, direct wave candidates are extracted from the plurality of radio waves coming from the mobile station to the plurality of base stations, and the reception signals equivalent to the direct waves are derived from the direct wave candidates. Then, the reception signals derived are used to determine the present position of the mobile position, whereby the present position of the mobile station is determined with high precision.

In the positioning apparatuses, the positioning methods, and the positioning systems described above, the direct wave candidates are extracted from reception signals which are generated from radio waves coming within predetermined time since the point of start of positioning.

According to the invention, predetermined time necessary for the radio waves output from the base stations to reach the mobile station or predetermined time necessary for the radio wave output from the mobile station to reach the base stations is set in advance. Then, the direct wave candidates are extracted from reception signals of the radio waves which arrive at the mobile station or the base stations within the set predetermined time since the point of start of the positioning. This makes it possible to extract the direct wave candidates necessary for positioning without fail, and by extension to determine the present position of the mobile station with high precision.

In the positioning apparatuses, the positioning methods, and the positioning systems described above, the predetermined time is set in accordance with the sizes of communication areas of the respective base stations.

According to the invention, the time in accordance with the sizes of the communication areas (in other words, "cells") of the respective base stations is established as upper limit time. The direct wave candidates are extracted from reception signals of the radio waves which arrive at the mobile station or the base stations within the upper limit time. The communication areas of the base stations correspond to the coverages of the respective base stations. Therefore, setting the time depending on the sizes of the communication areas as the upper limit time makes it possible to extract the direct wave candidates necessary for positioning without fail, and by extension to determine the present position of the mobile station with high precision.

In the positioning apparatuses, the positioning methods, and the positioning systems described above, a plurality of signals of greater reception intensities out of the reception signals generated from the incoming waves are extracted as the direct wave candidates.

According to the invention, the reception signals equivalent to the direct waves can always be extracted within the regions of shorter time than the points of occurrence of the signals having greater reception intensities. This makes it possible to extract the direct wave candidates necessary for positioning without fail, and by extension to determine the present position of the mobile station with high precision.

In the foregoing positioning apparatus, method, and system for determining the present position of a mobile station by using radio waves coming from base stations to the mobile station, a plurality of direct wave candidates are extracted with respect to each of the radio waves coming from the plurality of base stations to the mobile station. A plurality of combinations of direct wave candidates are obtained by combining direct wave candidates which are selected in ones from among those of the respective base stations extracted. Approximate positions of the mobile station and positioning errors in the approximate positions are determined from the plurality of combinations, respectively. The direct wave candidates contained in a combination corresponding to the positioning error of minimum value are derived as the reception signals corresponding to the direct waves respectively coming from the plurality of base stations to the mobile station. The present position of the mobile station is determined from the derived reception signals corresponding to the direct waves respectively coming from the plurality of base stations.

According to the invention, the direct wave candidates obtained from the plurality of radio waves coming from the plurality of base stations to the mobile station are initially combined one another. Upon this combination, direct wave candidates of the respective base stations are selected and combined in ones, thereby obtaining a plurality of combinations. Then, the plurality of combinations are used to determine the approximate positions of the mobile station and the positioning errors in the approximate positions, respectively. Next, the direct wave candidates contained in the combination corresponding to the positioning error of minimum value are derived as the reception signals corresponding to the direct waves coming from the respective base stations to the mobile station. Then, the derived reception signals corresponding to the direct waves respectively coming from the plurality of base stations are used to determine the present position of the mobile station. Such positioning of the mobile station based on the reception signals of minimum positioning error allows the present position of the mobile station to be determined with high precision.

In the foregoing positioning apparatus, method, and system for determining the present position of a mobile station by using radio waves coming from the mobile station to a plurality of base stations, a plurality of direct wave candidates are extracted with respect to each of the radio waves coming from the mobile station to the plurality of base stations. A plurality of combinations of direct wave candidates are obtained by combining direct wave candidates which are selected in ones from among those of the respective base stations extracted. Approximate positions of the mobile station and positioning errors in the approximate positions are determined from the plurality of combinations, respectively. The direct wave candidates contained in a combination corresponding to the positioning error of minimum value are derived as the reception signals corresponding to the direct waves respectively coming from the mobile station to the plurality of base stations. The present position of the mobile station is determined from the derived reception signals corresponding to the direct waves respectively coming to the plurality of base stations.

According to the invention, the direct wave candidates obtained from the plurality of radio waves coming from the mobile station to the plurality of base stations are initially combined one another. Upon this combination, direct wave candidates of the respective base stations are selected and combined in ones, thereby obtaining a plurality of combinations. Then, the plurality of combinations are used to determine the approximate positions of the mobile station and the positioning errors in the approximate positions, respectively. Next, the direct wave candidates contained in the combination corresponding to the positioning error of minimum value are derived as the reception signals corresponding to the direct waves coming from the mobile station to the respective base stations. Then, the derived reception signals corresponding to the direct waves respectively coming to the plurality of base stations are used to determine the present position of the mobile station. Such positioning of the mobile station based on the reception signals of minimum positioning error allows the present position of the mobile station to be determined with high precision.

In the foregoing positioning apparatus, method, and system for determining the present position of a mobile station by using radio waves coming from the mobile station to a plurality of base stations, positioning means for determining the present position of the mobile station by using the GPS are provided on the mobile-station side, so as to switch to the positioning by the GPS positioning means in cases where the result of the positioning based on the communication waves among the base stations and the mobile station exceeds a predetermined positioning error.

According to the invention, the positioning using the GPS positioning means will not be performed as long as the result of the positioning based on the communication waves among the base stations and the mobile station is favorable. This achieves a reduction in the power consumption of the mobile station.

Alternatively, the mobile station is provided with the positioning means for determining the present position of the mobile station by using the GPS and power supply means, so that the positioning is switched between the one based on the communication waves among the base stations and the mobile station and the one using the GPS, depending on the remaining amount of charge of the power supply means. On this account, positioning can be performed with maintained high precision, depending on the remaining amount of charge of the power supply means.

BRIEF DESCRIPTION OF THE DRAWINGS

These and other objects and advantages of the present invention will become clear from the following description with reference to the accompanying drawings, wherein:

FIG. 29 is a diagram for explaining conventional problems resulting from the influence of multipath fading and the like;

DETAILED DESCRIPTION OF THE PREFERRED EMBODIMENTS

Hereinafter, embodiments of the present invention will be described with reference to the drawings. The embodiments will deal with a positioning apparatus, a positioning method, and a positioning system for a mobile communications system which uses a wideband CDMA scheme, a type of spread spectrum (SS) communications scheme.

First Embodiment

A first embodiment of the present invention will be described with reference to FIGS. 1–15.

Figure 1:
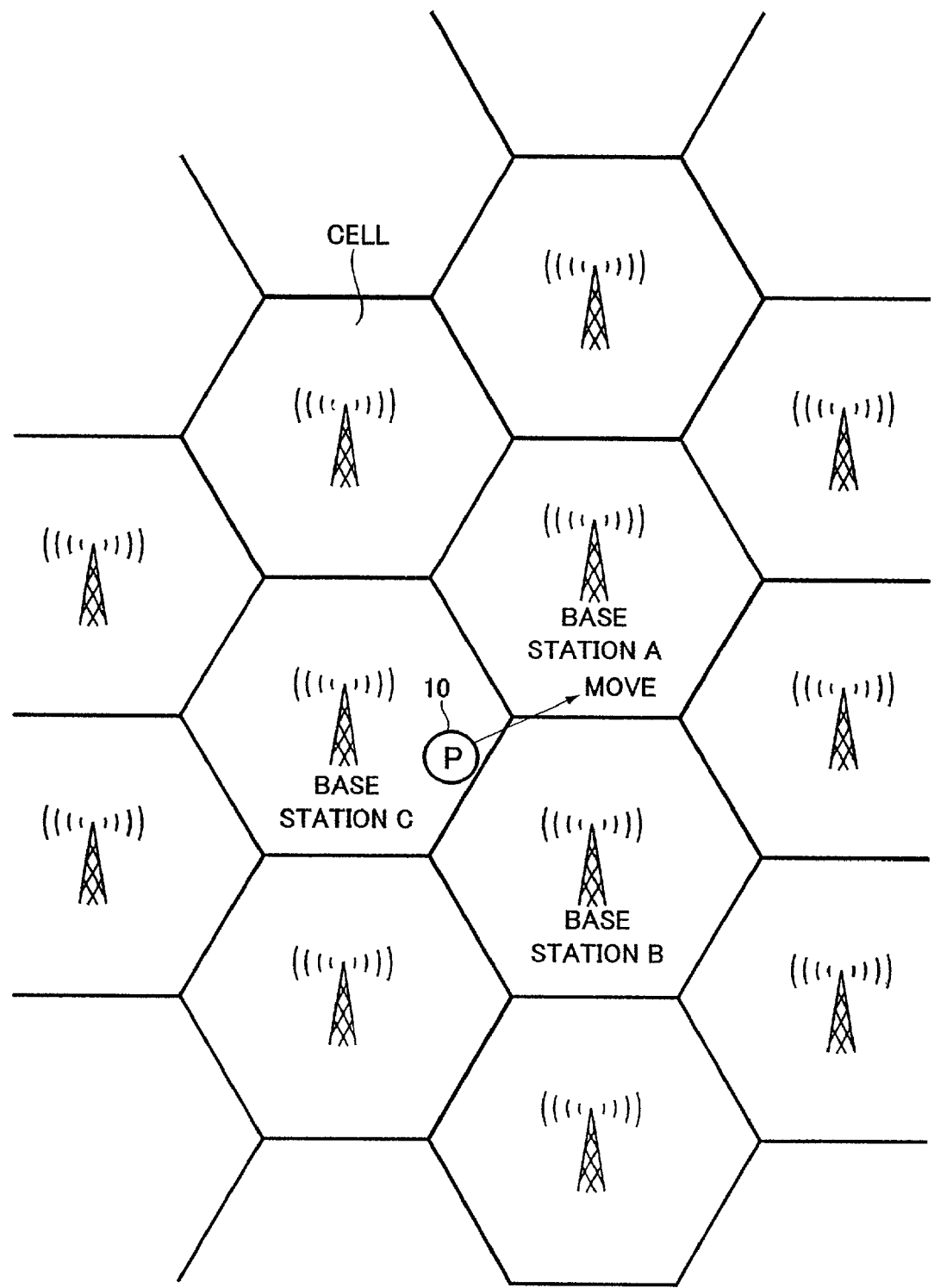
FIG. 1 is a diagram schematically showing the cell configuration of a communication area.

FIG. 1 is a diagram schematically showing the general configuration of a mobile communications system which uses a wideband CDMA scheme. By way of example, a hexagonal cell configuration is shown here.

In this mobile communications system, the communication area is partitioned and defined into an arbitrary number of sections called "cells" in advance. Each cell has a base station installed therein. The cells are defined so as to fall within the coverages of the radio waves output from their respective base stations. In addition, the wave coverages of the cells are overlapped one another to prevent communication unavailable areas from occurring.

When a mobile station 10 such as a cellular phone or a navigation system moves in the communication area along with its user, communications are made with base stations which lie around the mobile station 10, such as A, B, and C.

Figure 2:
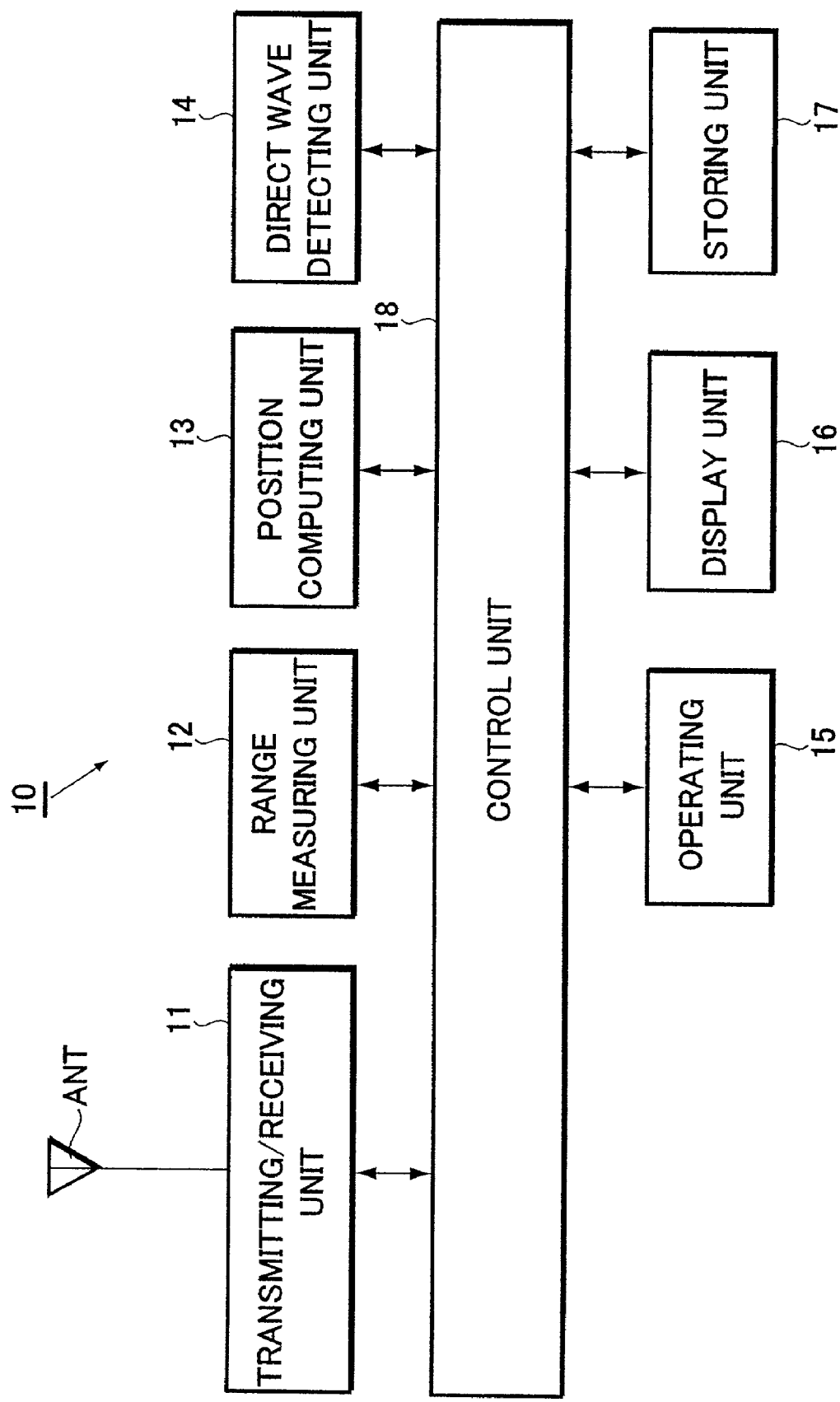
FIG. 2 is a block diagram showing the configuration of the essential parts of a mobile station in a first embodiment.
Figure 3:
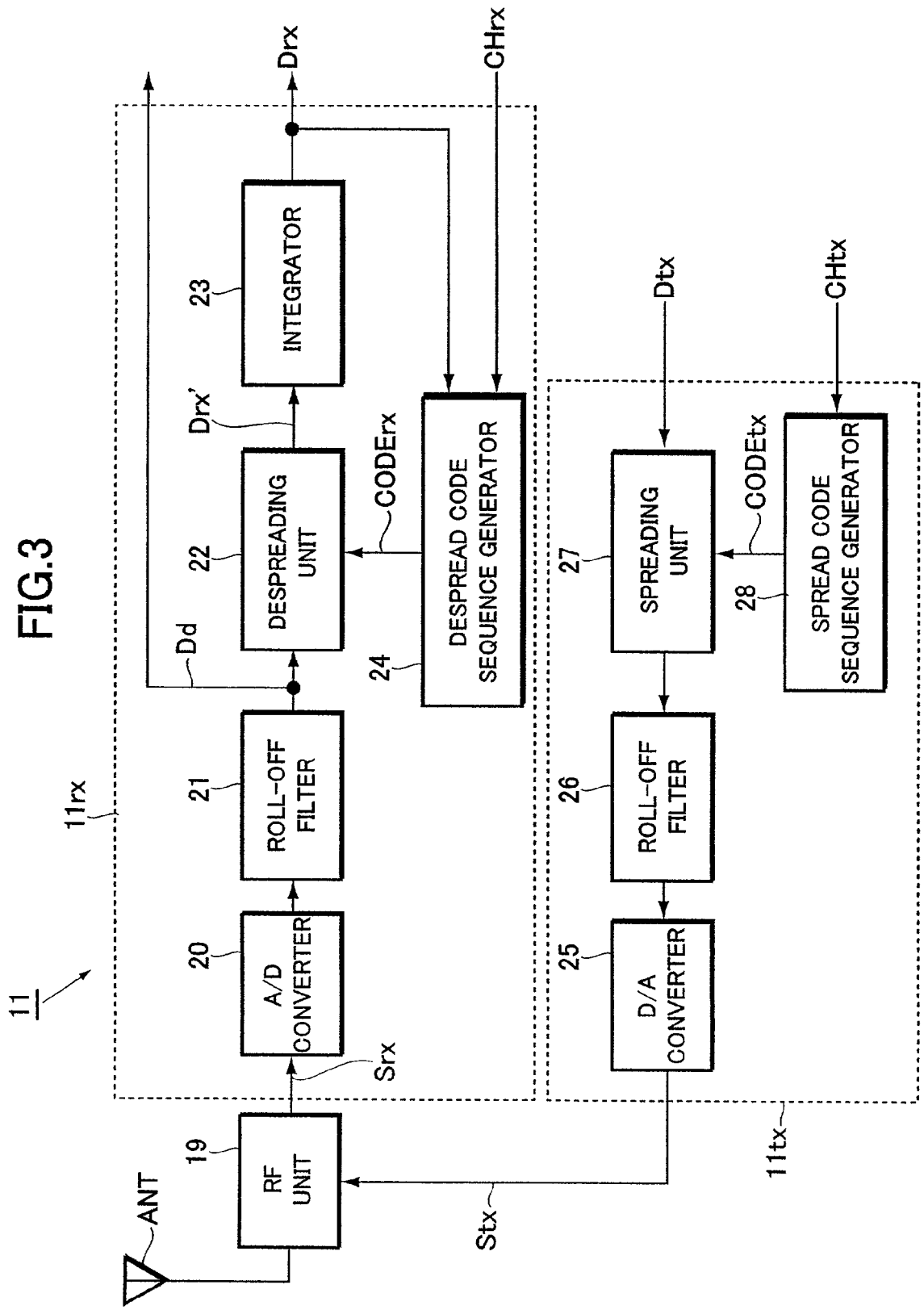
FIG. 3 is a block diagram showing the configuration of a transmitting/receiving unit arranged in the mobile station.
Figure 4:
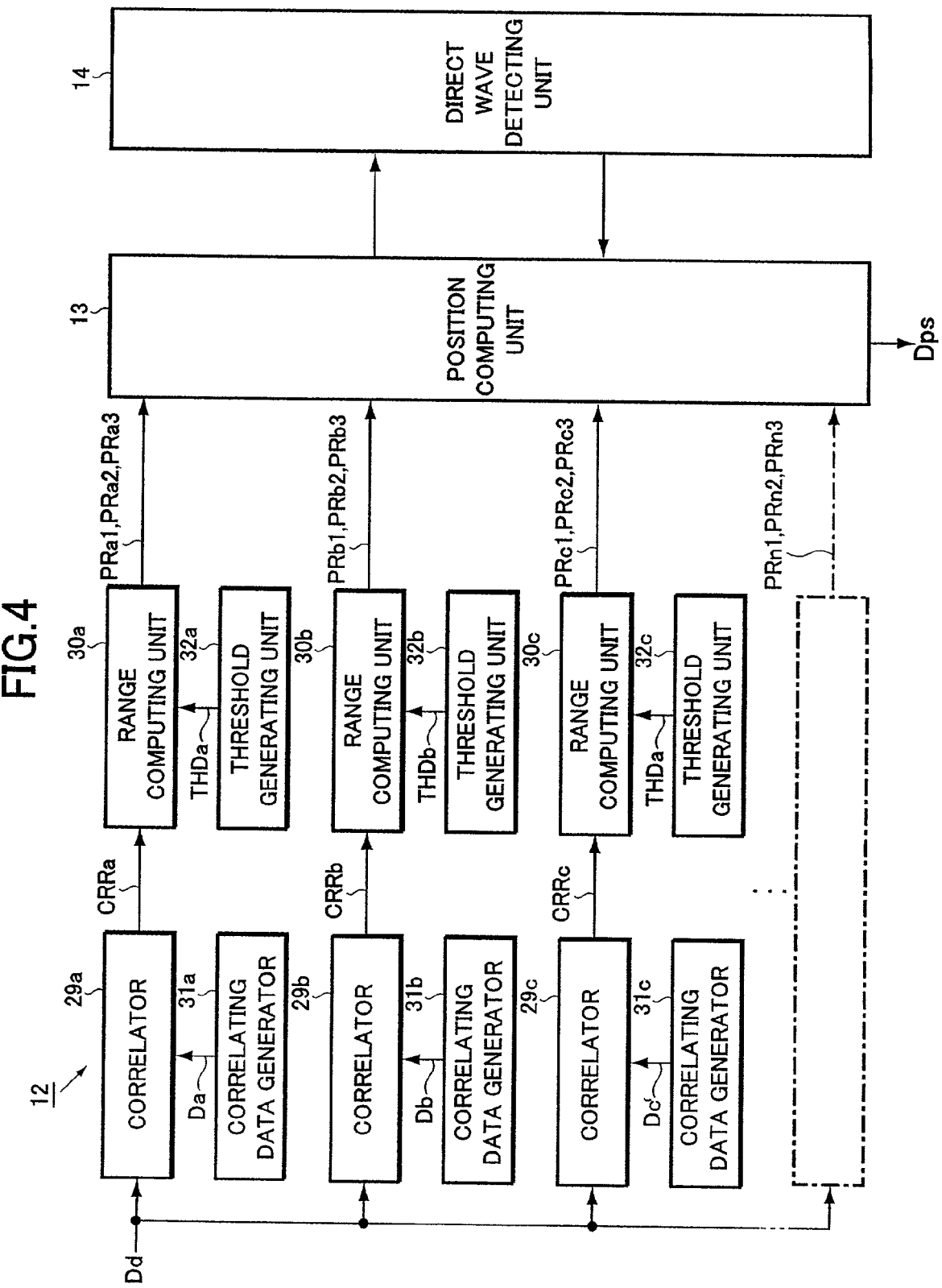
FIG. 4 is a block diagram showing the configuration of a range measuring unit, a position computing unit, and a direct wave detecting unit arranged in the mobile station.

FIG. 2 is a block diagram showing the configuration of the essential parts of a positioning apparatus which is provided to the above-mentioned mobile station 10 such as a cellular phone or a navigation system. FIG. 3 is a block diagram showing the configuration of a transmitting/receiving unit 11 arranged in the mobile station 10. FIG. 4 is a block diagram showing the configuration of a range measuring unit 12, a position computing unit 13, and a direct wave detecting unit 14 arranged in the mobile station 10. In the following description, the positioning apparatus provided to the mobile station 10 will be designated and described by the same reference numeral as that of the mobile station 10.

In FIG. 2, the positioning apparatus 10 comprises a transmitting/receiving antenna ANT, the transmitting/receiving unit 11, the range measuring unit 12, the position computing unit 13, and the direct wave detecting unit 14. The positioning apparatus 10 also contains an operating unit 15 which has operation keys including a plurality of push button switches, a display unit 16 which consists of a liquid crystal display or the like, a storing unit 17 which is composed of nonvolatile memories and the like, and a control unit 18 which exercises central control over the operation of the entire positioning apparatus 10.

As shown in FIG. 3, the transmitting/receiving unit 11 comprises a receiving unit 11$rx$ and a transmitting unit 11$tx$. The receiving unit 11$rx$ receives radio waves (reception waves) coming from base stations through the transmitting/receiving antenna ANT and an RF unit 19. The transmitting unit 11$tx$ transmits radio waves (transmission waves) to the base-station side through the RF unit 19 and the transmitting/receiving antenna ANT.

The receiving unit 11$rx$ in turn comprises an A/D converter 20, a roll-off filter 21, a despreading unit 22, an integrator 23, and a despread code sequence generator 24. The transmitting unit 11$tx$ comprises a D/A converter 25, a roll-off filter 26, a spreading unit 27, and a spread code sequence generator 28. These receiving unit 11$rx$ and transmitting unit 11$tx$ are used to conduct communications with base stations.

More specifically, for the case of receiving radio waves (reception waves) coming from a base station, the reception waves, or incoming waves, are received by the transmitting/receiving antenna ANT. The resultant reception signal Srx is down-converted by the RF unit 19 before it is converted into digital data by the A/D converter 20. The digital data is passed through the roll-off filter 21 and despread by the despreading unit 22. The resultant despread data Drx' is integrated by the integrator (digital integrator) 23 to reproduce the reception data Drx which is sent from the base station.

Here, the despread code sequence generator 24 generates a despread code sequence CODErx corresponding to the base station specified, in accordance with base station specification data CHrx which is supplied from the control unit 18. The despreading unit 22 performs a correlation operation between the despread code sequence CODErx and the output data Dd of the roll-off filter 21 to generate the despread data Drx' mentioned above.

The despread code sequence generator 24 also examines the state of reception of the reception data Drx output from the integrator 23, and performs such processing as making fine adjustments to the phase of the despread code sequence CODErx within the chip duration according to the state of reception examined. This implements feedback control so that favorable reception data Drx is obtained.

When the positioning apparatus 10 makes transmission to a base station, transmission data Dtx supplied from the control unit 18 is spread by the spreading unit 27 for modulation. The data modulated is passed through the roll-off filter 26 and converted into an analog transmission signal Stx by the D/A converter 25. The transmission signal Stx is up-converted by the RF unit 19 and supplied to the transmitting/receiving antenna ANT so that it is transmitted to the base station in the form of transmission waves.

Here, the spread code sequence generator 28 generates a spread code sequence CODEtx corresponding to the designation base station, in accordance with base station specification data CHtx which is supplied from the control unit 18. The spreading unit 27 performs a correlation operation between the spread code sequence CODEtx and the transmission data Dtx to generate the modulated spread data mentioned above, and supplies the same to the roll-off filter 26.

As shown in FIG. 4, the range measuring unit 12 comprises a plurality of signal processing systems (reference numerals omitted) consisting of a plurality of correlators 29a, 29b, 29c, . . . , range computing units 30a, 30b, 30c, . . . , correlating data generators 31a, 31b, 31c, . . . , and threshold generating units 32a, 32b, 32c, . . . .

A first signal processing system is composed of the correlator 29a, the range computing unit 30a, the correlating data generator 31a, and the threshold generating unit 32a. A second signal processing system is composed of the correlator 29b, the range computing unit 30b, the correlating data generator 31b, and the threshold generating unit 32b. A third signal processing system is composed of the correlator 29c, the range computing unit 30c, the correlating data generator 31c, and the threshold generating unit 32c. The rest of the signal processing systems are formed in the same fashion. Then, the correlators 29a, 29b, 29c, . . . in the respective signal processing systems are supplied with the output data Dd which is limited in bandwidth by the roll-off filter 21 of the receiving unit 11rx, through the control unit 18.

The minimum number of these signal processing systems required is three. Any number of systems no fewer than three are acceptable. For convenience of explanation, however, the following description will deal with the most fundamental configuration of having three signal processing systems.

The correlator 29a in the first signal processing system performs a cross-correlation operation between correlating data Da generated by the correlating data generator 31a and the output data Dd. The result of the operation, or a correlation value CRRa, is supplied to the range computing unit 30a. Incidentally, the correlation value CRRa obtained is normalized with reference to its maximum peak value (as 1).

Here, the correlating data generator 31a generates correlating data Da which has correlativity to radio waves to come from a base station arranged near the positioning apparatus 10 (for example, the base station A shown in FIG. 1), under the instruction from the control unit 18.

That is, when the receiving unit 11rx shown in FIG. 3 reproduces the reception data Drx and supplies the same to the control unit 18, the control unit 18 determines the sending base station from base station identification data (reference numeral omitted) included in the reception data Drx. If the base station is determined, for example, to be the base station A in FIG. 1, then instruction data (not shown) specifying the base station A is supplied to the correlating data generator 31a. According to the instruction data, the correlating data generator 31a generates the correlating data Da having correlativity to the radio waves to come from the base station A, and supplies the same to the correlator 29a.

Thus, the correlator 29a obtains the correlation between the correlating data Da and the output data Dd to generate, as illustrated in FIG. 5(a), a correlation value CRRa which has high correlativity to the incoming waves from the base station A.

In some cases, the incoming waves from the base station A contain multipath waves aside from the direct wave. It follows that peak values corresponding to the direct wave, the multipath waves, and others appear in the correlation value CRRa. In addition, if the incoming waves include any noises having correlativity to the correlating data Da, the peak values resulting from the noises will also appear.

The range computing unit 30a compares the correlation value CRRa with a threshold value THDa generated in the threshold generating unit 32a, and thereby detects the positions where top three peak values including the maximum peak value appear. More specifically, the threshold generating unit 32a variably adjusts the threshold value THDa under the instruction from the control unit 18, and the range computing units 30a detects the positions where the top three peak values higher than the threshold value THDa appear, respectively.

Nevertheless, as illustrated in FIG. 5(a), the peak values occurring in the right region with respect to the position of appearance of the maximum peak value PPK1 are excluded from the detection. Only those peak values occurring in the left region of the position of appearance of the maximum peak value PK1 are subjected to the detection to detect the positions where the top three peak values PK1, PK2, and PK3 appear.

Incidentally, the right and left regions with respect to the position of appearance of the maximum peak value PK1 may be defined in terms of phase difference (time) in the correlation value CRRa. Then, the peak values occurring in the region of greater phase differences than at the position of appearance of the maximum peak value PK1 are excluded from the detection. The detection covers only the maximum peak value PK1 and the peak values occurring in the region of smaller phase differences than at the position of appearance of the maximum peak value PK1, detecting the positions where the total of three peak values PK1, PK2, and PK3 appear.

The positions of appearance of the three peak values PK1, PK2, and PK3 are detected thus, and the phase differences $\tau a1$, $\tau a2$, and $\tau a3$ at the respective positions of appearance are determined to be the propagation time of the direct wave, multipath waves, or the like coming from the base station A to the positioning apparatus 10. These propagation time $\tau a1$, $\tau a2$, and $\tau a3$ are multiplied by the propagation velocity v of the radio wave to calculate propagation ranges (hereinafter, referred to as "pseudo ranges") PRa1(=$\tau a1 \times$v), PRa2(=$\tau a2 \times$v), and PRa3(=$\tau a3 \times$v), which are supplied to the position computing unit 13.

Subjecting those peak values occurring in the region of smaller phase differences than at the position of appearance of the maximum peak value PK1 to the detection as above allows the position of appearance of the peak value resulting from the direct wave to be detected without fail.

That is, in cases where shieldings such as a building lie between the base station A and the positioning apparatus 10, or multipath waves reflected from reflecting objects such as a building arrive with higher levels than that of the direct wave, the maximum peak value PK1 can occur from a multipath wave. The peak value resulting from the direct wave, shorter than multipath waves in propagation time, will appear in the region of smaller phase differences than at the position of that maximum peak value PK1. Otherwise, if no shielding lies between the base station A and the positioning apparatus 10, then the maximum peak value PK1 occurs from the direct wave. Accordingly, subjecting the maximum peak value PK1 and the peak values occurring in the region of smaller phase differences than at the position of appearance of the maximum peak value PK1 to the detection allows the position of appearance of the peak value resulting from the direct wave to be detected properly.

The second and third signal processing systems also perform the same processing as that of the first signal processing system described above, whereby propagation ranges (pseudo ranges) PRb1, PRb2, PRb3, and PRc1, PRc2, PRc3 are determined and supplied to the position computing unit 13.

That is, when the control unit 18 identifies the base station identification data contained in the reception data Drx (see FIG. 3) to determine that the incoming waves from the base station B illustrated in FIG. 1 are received, the correlator 29b in the second signal processing system performs a correlation operation between correlating data (correlating data having correlativity to the incoming waves from the base station B) Db generated by the correlating data generator 31b and the output data Dd. As a result, a normalized correlation value CRRb is obtained. The range computing unit 30b compares the correlation value CRRb and a threshold value THDb from the threshold generating unit 32b to detect, as illustrated in FIG. 5(b), the phase differences $\tau b1$, $\tau b2$, and $\tau b3$ up to the positions of appearance of the top three peak values including the maximum peak value. The range computing unit 30b also calculates the propagation ranges (pseudo ranges) PRb1, PRb2, and PRb3 corresponding to the phase differences $\tau b1$, $\tau b2$, and $\tau b3$.

When the control unit 18 identifies the base station identification data contained in the reception data Drx to determine that the incoming waves from the base station C illustrated in FIG. 1 are received, the correlator 29c in the third signal processing system performs a correlation operation between correlating data (correlating data having correlativity to the incoming waves from the base station C) Dc generated by the correlating data generator 31c and the output data Dd. As a result, a normalized correlation value CRRc is obtained. The range computing unit 30c compares the correlation value CRRc and a threshold value THDc from the threshold generating unit 32c to detect, as illustrated in FIG. 5(c), the phase differences $\tau c1$, $\tau c2$, and $\tau c3$ up to the positions of appearance of the top three peak values including the maximum peak value. The range computing unit 30c also calculates the propagation ranges (pseudo ranges) PRc1, PRc2, and PRc3 corresponding to the phase differences $\tau c1$, $\tau c2$, and $\tau c3$.

Incidentally, the correspondences between the first, second, and third signal processing systems and the base stations A, B, and C are not fixed in advance. When the control unit 18 determines that the radio waves coming from any three base stations are received, it associates the three base stations with the first, second, and third signal processing systems as appropriate and makes the correlators 29a, 29b, and 29c perform the correlation operations described above. Therefore, even if the positioning apparatus 10 moves to an arbitrary location within the communication area and receives incoming waves from three base stations in other combinations than the base stations A, B, and C illustrated above, it is still possible to determine the position of the positioning apparatus 10.

In the foregoing description with reference to FIGS. 5(a)–5(c), the propagation ranges (pseudo ranges) PRa1–PRa3, PRb1–PRb3, and PRc1–PRc3 are calculated by detecting the peak values occurring in the regions of smaller phase differences including the positions of appearance of the maximum peak values. As a modified example, the propagation ranges (pseudo ranges) may be calculated in the manner as follows.

The communication areas of the base stations A, B, and C each are defined as a section called "cell" shown in FIG. 1. The extensions of the respective "cells" make allowable zones where the radio waves emitted from the base stations A, B, and C can reach. Then, as shown in FIGS. 5(a)–5(c), time Ta, Tb, and Tc required for the radio waves emitted from the base stations A, B, and C to reach the extensions of the respective "cells" may be established so that peak values occurring in the regions of smaller phase differences than the respective time Ta, Tb, and Tc are detected to calculate the propagation ranges (pseudo ranges).

When the time depending on the sizes of the communication areas (in other words, "cells") of the respective base stations A, B, and C is established as upper limit time Ta, Tb, and Tc, and peak values occurring in the regions shorter than the upper limit time Ta, Tb, and Tc are detected thus, it is possible to detect the peak values of the direct waves coming to the positioning apparatus 10 from the base stations A, B, and C without fail. In addition, the time Ta, Tb, and Tc described above can be set in accordance with the information on the communication areas which is known of each of the base stations A, B, and C. This produces such effects that the range measuring unit 12 can be simplified in configuration.

The position computing unit 13 calculates the present position (xp,yp) of the positioning apparatus 10 by triangulation using the pseudo ranges PRa1–PRa3, PRb1–PRb3, and PRc1–PRc3 calculated by the range measuring unit 12 and the positions (xa,ya), (xb,yb), and (xc,yc) of the respective base stations A, B, and C. To be more specific, when the control unit 18 determines from the reception data Drx that the incoming waves from the base stations A, B, and C illustrated above are received, it extracts positional information indicating the position (xa,ya) of the base station A, the position (xb,yb) of the base station B, and the position (xc,yc) of the base station C out of the reception data Drx, and supplies the same to the position computing unit 13. The position computing unit 13 calculates the present position (xp,yp) of the positioning apparatus 10 by triangulation, using the positions (xa,ya), (xb,yb), and (xc,yc) supplied and the pseudo ranges PRa1–PRa3, PRb1–PRb3, and PRc1–PRc3 calculated by the range measuring unit 12.

As will be detailed later, the position computing unit 13 does not calculate the position (xp,yp) of the mobile station 10 by simple triangulation. Instead, the position computing unit 13 determines positions close to the true position of the positioning apparatus 10 as approximate positions POSI by successive approximations. Of the plurality of approximate positions POSI determined, one having the highest precision is selected as the position of the positioning apparatus 10, or the present position (xp,yp). In determining approximate positions POSI by the successive approximations, position error calculating parameters PARA are obtained as parameters for indicating the precisions of the approximate positions POSI.

The direct wave detecting unit 14 obtains positioning errors HDOP to be described later from the position error calculating parameters PARA generated by the position computing unit 13. The direct wave detecting unit 14 determines that three pseudo ranges which minimize the positioning error HDOP are of the direct waves from the base stations A, B, and C, and notifies the position computing unit 13 of the determination information.

When the direct wave detecting unit 14 thus notifies the position computing unit 13 of the foregoing determination information, the position computing unit 13 determines that the approximate position POSI obtained from the three pseudo ranges of minimum positioning error HDOP described above (i.e., the pseudo ranges determined to be of the direct waves from the base stations A, B, and C) is the position closest to the true position of the positioning apparatus 10, or the present position (xp,yp). The position computing unit 13 generates positioning data Dps for indicating the present position (xp,yp), and supplies the same to the control unit 18.

In the present embodiment, when the incoming waves coming from the three base stations A, B, and C are received, the pseudo ranges in threes (or a total of nine pseudo ranges) PRa1–PRa3, PRb1–PRb3, and PRc1–PRc3 are detected out of the incoming waves.

Based on combinations of pseudo ranges in threes corresponding to the base stations A, B, and C, respectively, a plurality of approximate positions POSI are obtained. Of the plurality of approximate positions POSI obtained, one closest to the true position of the mobile station 10 is determined as the present position (xp,yp). Here, the individual approximate positions POSI are obtained through successive approximations so as to reduce the influence of multipath fading and noise on the obtained approximate positions POSI significantly.

Returning to FIG. 2, the operating unit 15 is provided with operation keys including the plurality of push button switches mentioned above. When users or others select and operate predetermined operation keys, the operating unit 15 can instruct the control unit 18 to determine the present position of the positioning apparatus, as well as issue instructions such that information on a map, shops, and various facilities around the present position (xp,yp) determined by the positioning is distributed from the base-station side.

More specifically, when the range measuring unit 12, the position computing unit 13, and the direct wave detecting unit 14 determine the present position (xp,yp) of the positioning apparatus 10 under an instruction from users or others, the control unit 18 adds the positioning data Dps indicating the present position (xp,yp) to transmission data Dtx. The control unit 18 transmits the resultant to the nearest base station through the transmitting unit 11tx, and thereby requests that the information on a map, shops, and various facilities around the present position be distributed from a database installed in a base station. When the information on the map and the like requested is distributed from the base station, the receiving unit 11rx receives it and reproduces the reception data Drx. The storing unit 17 downloads and thereby stores the reception data Drx. Based on the reception data Drx stored, the display unit 16 displays on-screen the information as to the map, shops, and various facilities around the present position of the positioning apparatus 10. On the map displayed on-screen, blinking or other display for indicating the present position (xp,yp) is made based on the positioning data Dps, for the sake of presentation to users or others.

The display unit 16 is configured to make on-screen display according to display-specific data supplied from the control unit 18. Aside from the map and other information mentioned above, the display unit 16 also displays a menu for prompting users or others to make a desired operation and shows information entered from the operating unit 15 for user confirmation or other purposes.

The storing unit 17 stores the map and other information mentioned above, distributed from base stations. The storing unit 17 also stores data for menu display in advance, and saves information entered from the operating unit 15, such as data on destination addresses including those of communication destinations and data destinations set by the users or others (telephone numbers, mail numbers, etc.).

When the transmitting unit 11tx requests the base-station side for contents information such as image data and music data according to an instruction from users or others and the receiving unit 11rx receives the contents information distributed from the base-station side in response to the request, the storing unit 17 downloads and stores the contents information such as image data and music data. Besides, the storing unit 17 is capable of such operations as supplying the image data to the display unit 16 for on-screen display and having the music data reproduced in a not-shown audio reproducing unit to sound. In addition, this storing unit 17 can be expanded with removable semiconductor memories for wider storage area.

Now, the operation of the positioning apparatus 10 having such a configuration will be described with reference to FIGS. 6–15. Incidentally, the description will chiefly deal with the operation of the positioning apparatus 10 in determining its present position.

Initially, referring to FIG. 6, description will be given of the definitions of terms and the principle of positioning in the present invention.

Figure 6:
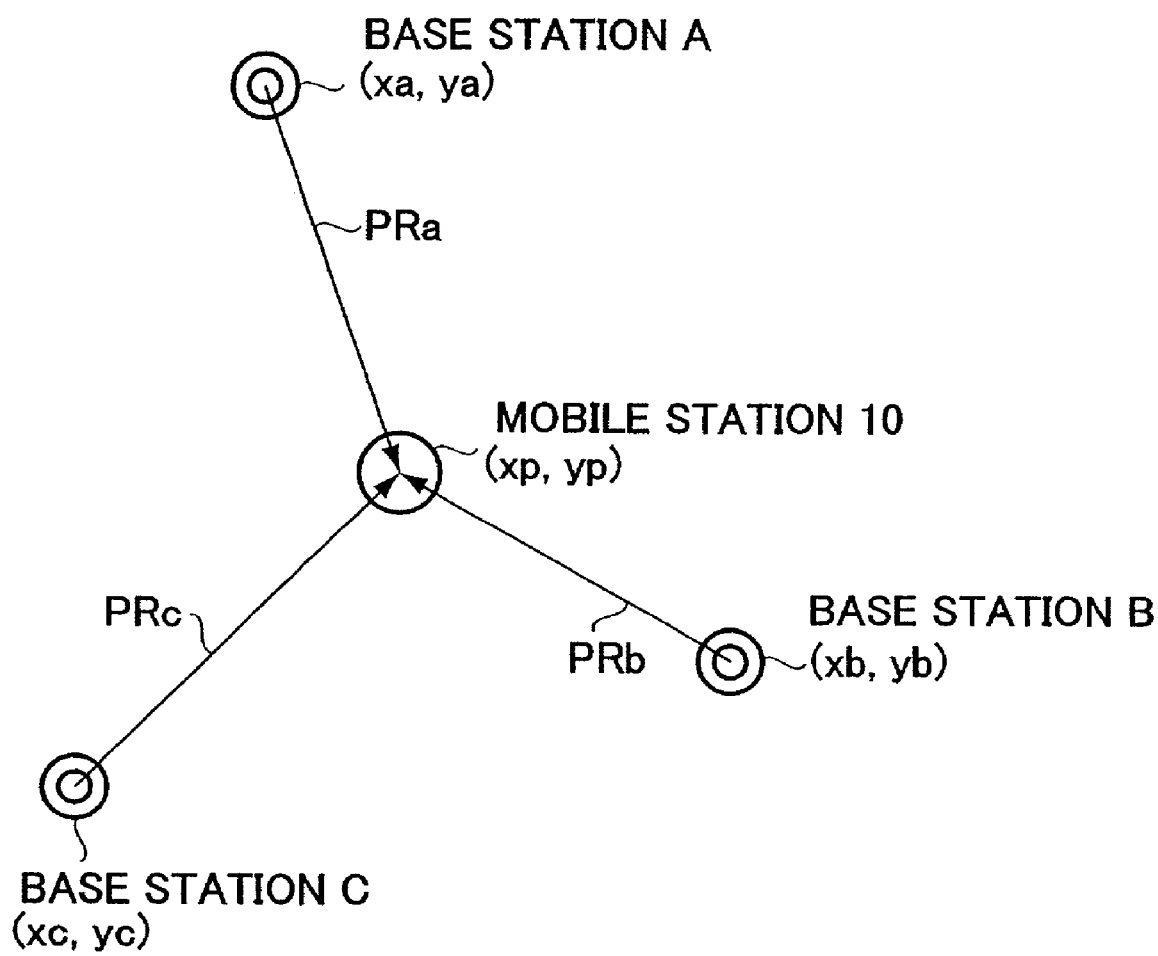
FIG. 6 is a diagram for explaining the definitions of terms employed in the description of the present embodiment and the principle of positioning.

FIG. 6 shows a typical case in which the positioning apparatus 10 lies at a position where it can receive the incoming waves from the base stations A, B, and C. The positions (xa,ya), (xb,yb), and (xc,yc) of the respective base stations A, B, and C are known. The actual propagation ranges of the radio waves coming from the base stations A, B, and C to the positioning apparatus 10 are shown in pseudo ranges PRa, PRb, and PRc, respectively.

Here, the three base stations A, B, and C shall be represented by a variable t (=a, b, c). The positions (xa,ya), (xb,yb), and (xc,yc) of the respective base stations A, B, and C shall be referred to collectively as (xt,yt), and the pseudo ranges PRa, PRb, and PRc as PRt.

As shown in FIGS. 5(a)–5(c), in the present embodiment, the pseudo ranges PRa, PRb, and PRc are detected in threes. Thus, the three pseudo ranges corresponding to the pseudo range PRa will be represented respectively by PRa1, PRa2, and PRa3, and collectively PRa1 (where i=1, 2, 3). The three pseudo ranges corresponding to the pseudo range PRb will be represented by PRb1, PRb2, and PRb3, and collectively PRbj (where j=1, 2, 3). The three pseudo ranges corresponding to the pseudo range PRc will be represented by PRc1, PRc2, and PRc3, and collectively PRck (where k=1, 2, 3).

In the present embodiment, a plurality of approximate positions POSI are obtained through successive approximations. For the sake of distinction, the approximate positions POSI will be expressed as POSIa, POSIb, and POSIc, being given suffixes a, b, and c which indicate the relation with the base stations A, B, and C, respectively.

As stated previously, the approximate positions POSIa, POSIb, POSIc are calculated from three pseudo ranges each. Thus, expressions shall be added to distinguish which approximate position is calculated from what combination of three pseudo ranges out of the pseudo ranges: PRa1, PRa2, and PRa3; PRb1, PRb2, and PRb3; and PRc1, PRc2, and PRc3. For example, if the pseudo ranges PRb1 and PRc1 resulting from the incoming waves from the base stations B and C are fixed, the approximate positions which are obtained by applying the three pseudo ranges PRa1, PRa2, and PRa3 resulting from the incoming waves from the base station A to the variables will be expressed as POSIa[a1,b1,c1], POSIa[a2,b1,c1], and POSIa[a3,b1,c1].

Similarly, when the pseudo ranges PRa1 and PRc1 resulting from the incoming waves from the base stations A and C are fixed, the approximate positions which are obtained by applying the three pseudo ranges PRb1, PRb2, and PRb3 resulting from the incoming waves from the base station B to the variables will be expressed as POSIb[a1,b1,c1], POSIb[a1,b2,c1], and POSIb[a1,b3,c1].

When the pseudo ranges PRa1 and PRb1 resulting from the incoming waves from the base stations A and B are fixed, the approximate positions which are obtained by applying the three pseudo ranges PRc1, PRc2, and PRc3 resulting from the incoming waves from the base station C to the variables will be expressed as POSIc[a1,b1,c1], POSIc[a1,b1,c2], and POSIc[a1,b1,c3]. The approximate positions obtained from the other combinations shall be expressed similarly.

The position computing unit 13 and the direct wave detecting unit 14 calculate approximate positions POSI based on the principle of positioning to be described below, and determine the position of the positioning apparatus 10 out of the approximate positions POSI calculated.

That is, according to triangulation, the pseudo ranges PRt determined by the range measuring unit 12, the known positions (xt,yt) of the base stations A, B, and C, and the present position (xp,yp) of the positioning apparatus 10 have relationship given by the following equation (1). This equation (1) can be expanded to determine the present position (xp,yp) as follows.

$$PR_t = \sqrt{(x_p - x_t)^2 + (y_p - y_t)^2} \quad (1)$$

(where t is a, b, c . . . . )

The pseudo ranges PRt, however, are parameters which undergo the influence of multipath fading, noise, and the like. Besides, in determining the pseudo ranges PRt, the time bases (time measuring circuits) implemented in the base stations A, B, and C, and the mobile station 10 may have some errors. Therefore, the present position (xp,yp) will not necessarily show the true position of the positioning apparatus 10.

The amounts of influence which the deviations between the time measurements of the respective time bases in the base stations and the positioning apparatus 10 have on the pseudo ranges PRt when the receiving unit 11rx receives the incoming waves shall be represented by s. Then, the latitude component xp and the longitude component yp of the present position (xp,yp) are given by the following equation (2). That is, variables x', y', and s' are approximate values, and variables Δx, Δy, and Δs are correction values. The latitude component xp will be expressed as the sum of the approximate value x' and the correction value Δx, the longitude component yp the sum of the approximate value y' and the correction value Δy, and the amount of influence s the sum of the approximate value s' and the correction value Δs.

$$x_p = x' + \Delta x$$
$$y_p = y' + \Delta y \quad (2)$$
$$s = s' + \Delta s$$

Applying the foregoing equation (2) to the equation (1), the present position (xp,yp) of the positioning apparatus 10 will be given by the following equation (3) which is closer to the reality than the foregoing equation (1) is.

$$PR'_t = \sqrt{(x' - x_t)^2 + (y' - y_t)^2} + s \quad (3)$$

(where t is a, b, c . . . . )

The position computing unit 13 repeats computing by successive approximations until these correction values Δx, Δy, and Δs converge to the level of calculation errors (that is, they converge to 0 on and on) The position (x',y') consisting of the approximate value x' of the latitude component and the approximate value y' of the longitude component obtained through the computing is an approximate position POSI.

Take an example where the approximate position POSIa [a1,b1,c1] is determined through successive approximations using the combination of the pseudo ranges PRa1, PRb1, PRc1, obtained from the incoming waves from the base stations A, B, and C, and the positions (xa,ya), (xb,yb), and (xc,yc) of the base stations A, B, and C. Initially, the correction values mentioned above are set at appropriate values to determine the first latitude and longitude components xp and yp. The correction values at that point are added to the approximate values to obtain solutions temporarily. Next, to determine new latitude and longitude components xp and yp, the new latitude and longitude components xp and yp are replaced with the sums of the temporarily-obtained solutions and the new correction values, and subjected to the same processing as the first. The correction values determined at that point are added to the approximate values to obtain the next solutions. Unless the correction values Δx, Δy, and Δs have converged to the level of calculation errors, the same processing is repeated at the third time and later. As the computing is repeated thus, the correction values Δx, Δy, and Δs gradually converge to the level of calculation errors, and when they no longer converge (having converged to the level of calculation errors) the computing is stopped. The position (x',y') consisting of the approximate values x' and y' of the latitude component and the longitude component obtained finally is regarded as the approximate position POSIa [a1,b1,c1].

The plurality of approximate positions POSI determined through the successive approximations may include various errors (i.e., positioning errors which can affect the positioning precision) depending on the communication environment between the base stations A, B, and C, and the positioning apparatus 10.

For this reason, the following algorithm is applied to determine an approximate position of minimum positioning error out of the plurality of approximate positions POSI.

The present position which coincides with the true position of the positioning apparatus 10 is actually unknown at first. Then, the equation (3) is expressed in the form of a partial differential equation given by the following equation (4):

$$PR_t = R_t + s + \frac{\partial PR_t}{\partial x_p} \cdot \Delta x + \frac{\partial PR_t}{\partial y_p} \cdot \Delta y \quad (4)$$

The foregoing equation (4) translates into a matrix equation, or the following equation (5):

$$\begin{bmatrix} \alpha_a & \beta_a & 1 \\ \alpha_b & \beta_b & 1 \\ \alpha_c & \beta_c & 1 \end{bmatrix} \begin{bmatrix} \Delta x \\ \Delta y \\ s \end{bmatrix} = \begin{bmatrix} \Delta PR_a \\ \Delta PR_b \\ \Delta PR_c \end{bmatrix} \quad (5)$$

Here, the terms αa–αc and βa–βc in the matrix equation have the properties of being direction cosines when the positioning apparatus 10 is seen from the base stations A, B, and C, respectively. The terms Δx and Δy are the correction values stated in the equation (2) above, and the terms is the amount of influence. The terms ΔPRa–ΔPRc, as shown in relation to the following equation (6), are the differences between the pseudo ranges PRt determined through the peak detection of the correlation values described above and the pseudo ranges closest to the true ranges Rt obtained in the process of successive approximations.

$$PR_t - R_t = \Delta PR_t \quad (6)$$

(where t is a, b, c . . . . )

Next, the equation (5) shall be expressed as the following equation (7) for convenience's sake. The following equation (7) is then modified into the following equation (8), a matrix equation for determining the terms Δx, Δy, and s:

$$A \cdot \delta X = \delta R \quad (7)$$

$$\delta X = A^{-1} \cdot \delta R \quad (8)$$

As shown in the following equation (9), a covariance matrix $(A^T \cdot A)^{-1}$ is derived from the foregoing equation (8). The covariance matrix $(A^T \cdot A)^{-1}$ can be expressed as the following equation (10):

$$COV(\delta X) = A^{-1} \cdot COV(\delta R) \cdot (A^{-1})^T \quad (9)$$
$$\cong (A^T \cdot A)^{-1}$$

$$(A^T \cdot A)^{-1} = \begin{bmatrix} \sigma^2_{xx} & \sigma^2_{xy} & \sigma^2_{xs} \\ \sigma^2_{yx} & \sigma^2_{yy} & \sigma^2_{ys} \\ \sigma^2_{sx} & \sigma^2_{sy} & \sigma^2_{ss} \end{bmatrix} \quad (10)$$

With the covariance matrix $(A^T \cdot A)^{-1}$ derived thus, the terms $\sigma^2_{xx}$, $\sigma^2_{xy}$, $\sigma^2_{yx}$, and $\sigma^2_{yy}$ which constitute the matrix of the foregoing equation (10) show variances having the properties of weighting factors which affect the positioning precision depending on the communication environment between the base stations A, B, and C, and the positioning apparatus 10. Therefore, the smaller the terms $\sigma^2_{xx}$, $\sigma^2_{xy}$, $\sigma^2_{yx}$, and $\sigma^2_{yy}$ are, the smaller positioning errors and the higher positioning precisions the approximate positions POSI determined have.

Then, as shown in the following equation (11), a root-sum-square value HDOP (Horizontal Dilution of Precision) of the terms $\sigma^2_{xx}$ and $\sigma^2_{yy}$ is determined. The value HDOP shall be regarded as the positioning error quantified on the plane in the horizon system of coordinates.

$$HDOP = \sqrt{\sigma^2_{xx} + \sigma^2_{yy}} \quad (11)$$

The direct wave detecting unit 14 checks the plurality of obtained pseudo ranges PRt for a pseudo range corresponding to the base station A, one corresponding to the base station B, and one corresponding to the base station C which minimize the value HDOP. Those three pseudo ranges checked out are determined to be of the direct waves coming to the positioning apparatus 10 from the base stations A, B, and C, respectively.

In addition, the position computing unit 13 determines that the approximate position POSI obtained from the pseudo ranges determined to be of the direct waves described above is the present position (xp,yp) of the positioning apparatus 10. Then, the position computing unit 13 supplies positioning data Dps indicating the present position (xp,yp) to the control unit 18.

Incidentally, the covariance matrix $(A^T \cdot A)^{-1}$ will be referred to as a "weighting factor matrix." The value HDOP will be called "positioning error" as mentioned above. The positioning error HDOP is obtained with respect to each of the approximate positions POSIa, POSIb, and POSIc. Hence, the positioning errors shall be represented by HDOPa, HDOPb, and HDOPc corresponding to those approximate positions, respectively.

The positioning errors HDOPa, HDOPb, and HDOPc stated above are determined by using combinations of the pseudo ranges PRa1–PRa3, PRb1–PRb3, and PRc1–PRc3, obtained from the incoming waves from the base stations A, B, and C, and the positions (xa,ya), (xb,yb), and (xc,yc) of the base stations A, B, and C. Thus, expressions as to pseudo ranges used in computing shall be added like HDOPa[a1, b1,c1), for example.

The terms $\sigma^2_{xx}$, $\sigma^2_{xy}$, $\sigma^2_{yx}$, and $\sigma^2_{yy}$, and so on in the foregoing covariance matrix $(A^T \cdot A)^{-1}$ shall be called "position error calculating parameters" and represented by a symbol PARA. The position error calculating parameters PARA are also determined by using combinations of the pseudo ranges PRa1–PRa3, PRb1–PRb3, and PRc1–PRc3, obtained from the incoming waves from the base stations A, B, and C, and the positions (xa,ya), (xb,yb), and (xc,yc) of the base stations A, B, and C. Thus, expressions as to pseudo ranges used in computing shall be added like PARAa[a1, b1,c1], for example.

Now, with reference to the flowcharts shown in FIGS. 7–14, detailed description will be given of the positioning operation.

Figure 7:
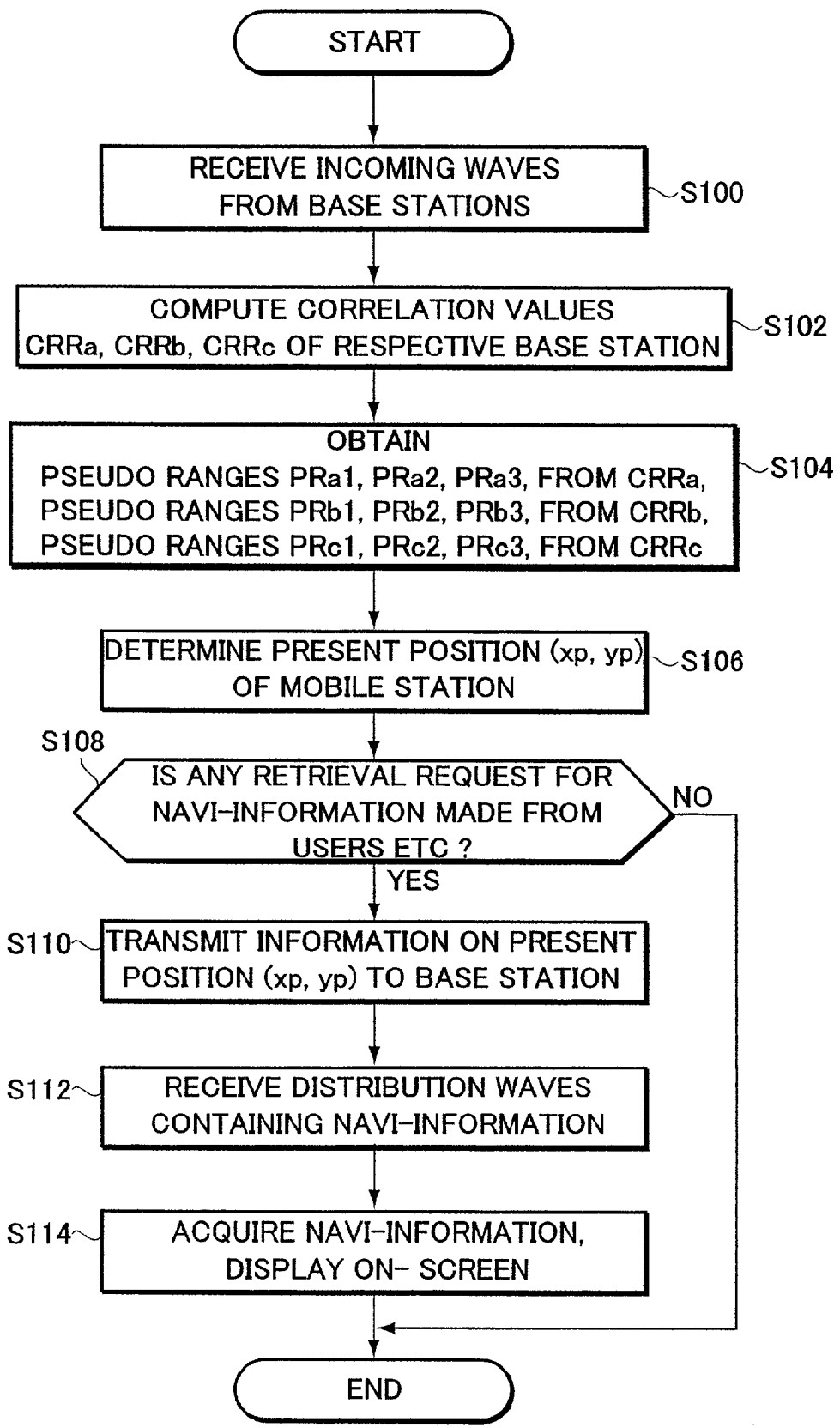
FIG. 7 is a flowchart for explaining the positioning operation of the mobile station.

FIG. 7 is a flowchart showing the general operation of the positioning apparatus 10 in a positioning operation. In the chart, the positioning operation is started under an instruction from users or others, and the incoming waves from base stations are received at step S100. For example, in the case where the radio waves emitted from the base stations A, B, and C arrive as shown in FIG. 6, those incoming waves are received.

Next, at step S102, the range measuring unit 12 performs correlation operations between the output data Dd on the base stations A, B, and C, obtained through the reception of the incoming waves, and correlating data Da, Db, and Dc, respectively. This determines correlation values CRRa, CRRb, and CRRc.

Next, at step S104, the correlation values CRRa, CRRb, and CRRc are individually subjected to peak detection to obtain pseudo ranges in threes: PRa1, PRa2, and PRa3; PRb1, PRb2, and PRb3; and PRc1, PRc2, and PRc3.

Next, at step S106, the foregoing pseudo ranges PRa1, PRa2, and PRa3, PRb1, PRb2, and PRb3, and PRc1, PRc2, and PRc3 are used to determine the present position (xp,yp) of the positioning apparatus 10. This positioning processing is performed according to the processes shown in FIGS. 8–14. At the completion of the positioning processing, go to step S108.

At step S108, the control unit 18 determines if a request for navigation information (referred to simply as "navi-information") is made under an instruction from users or others. If the request is made (if "YES"), go to step S110.

At step S110, positioning data Dps which indicates the result of the positioning, or the present position (xp,yp) of the positioning apparatus 10, is transmitted to the nearest base station, thereby requesting the distribution of the navi-information designated by the users or others. For example, when map information as to around the present position (xp,yp) is requested as the navi-information by users or others, the distribution of the map information is requested to the nearest base station. Distribution requests to base stations can also be made for various navi-information including information necessary for shopping, such as restaurants and shops around the present position (xp,yp), as well as amusement facilities, public facilities, sight spots and so on.

Next, at step S112, when distribution waves containing the navi-information are sent from the base station, the distribution waves are received to acquire the navi-information.

Then, as step S114, the foregoing navi-information acquired and the result of the positioning, or the present position (xp,yp), are displayed on-screen on the display unit 16 and presented to the users or others.

Figure 15:
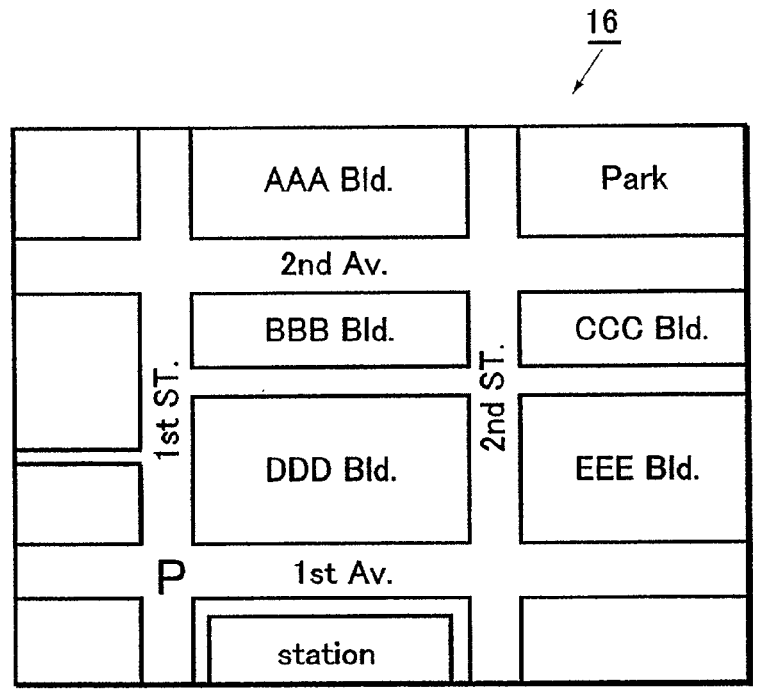
FIGS. 15(a) and 15(b) are diagrams showing examples of display on the display unit.
Figure 15:
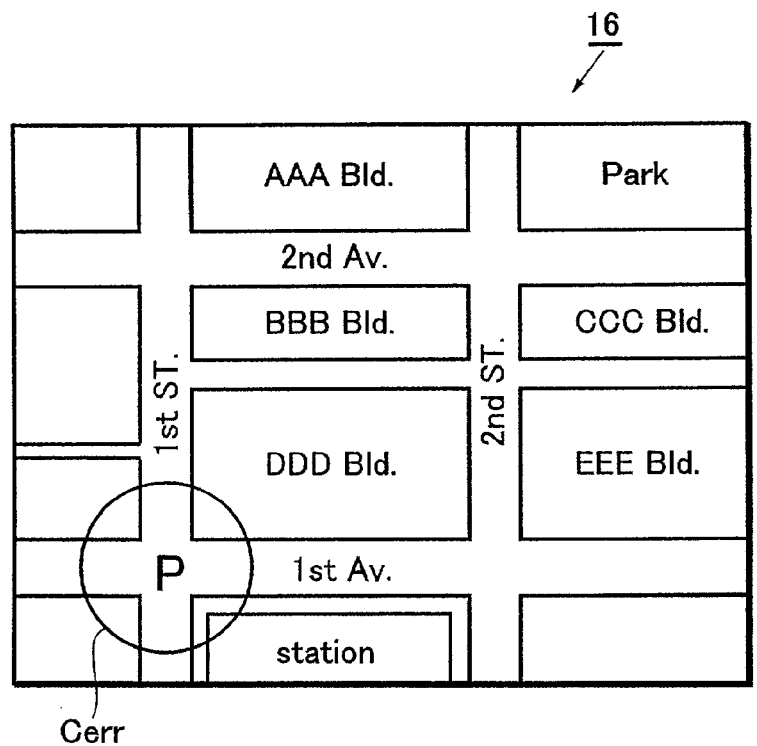

For example, as illustrated in FIG. 15(*a*), the display unit 16 displays the map information distributed and blinks a symbol "P," which indicates the present position (xp,yp), on the map for the sake of enhanced convenience of the users or others.

If the positioning error HDOP corresponding to the present position (xp,yp), obtained upon the determination of the present position (xp,yp), has a value greater than a predetermined value, the positioning error HDOP is converted into a range. Then, as illustrated in FIG. 15(*b*), a circle Cerr is displayed around the present position (xp,yp) with the range converted from the positioning error HDOP as the radius. This provides measures such as making the users or others check for the degree of precision the present position (xp,yp) has.

If no request for navi-information is made by users or others at step S108 above (if "NO"), skip the processing of steps S110–114 to end. Here, instead of terminating the processing simply, it is possible to put the present position (xp,yp) determined by the positioning into applications other than requesting navi-information. For example, the position-ing data Dps of the present position (xp,yp) can be transmitted to base stations for care-giving applications such that the base-station side checks the users or others for unusualness.

Next, description will be given in detail of the positioning processing of step S106 above.

Figure 8:
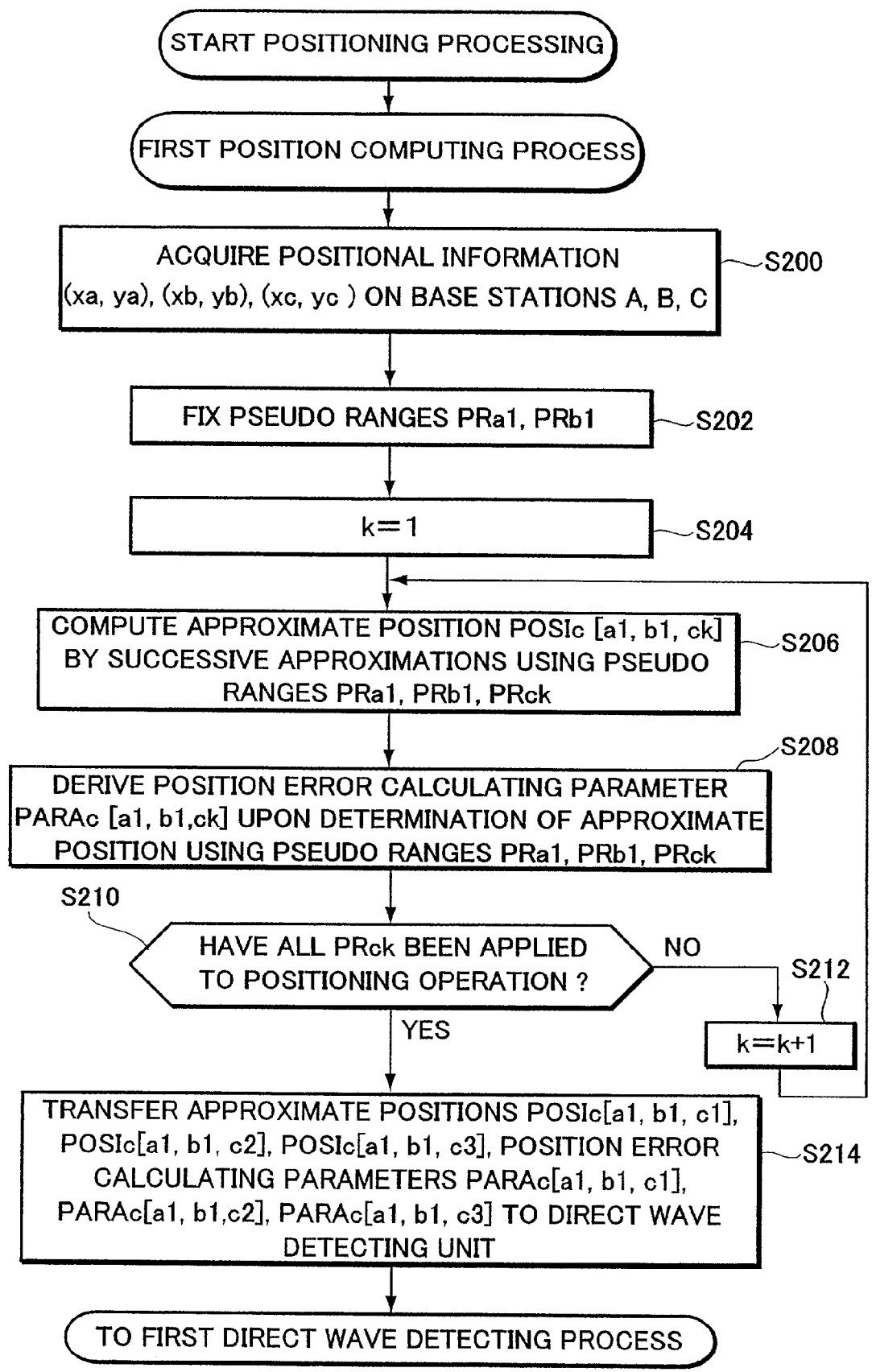
FIG. 8 is a flowchart for explaining the positioning operation of the mobile station, or the operation of the first position computing process in particular.

When the processing of steps S100–S104 described above is performed to enter step S106, the "positioning operation processing" of FIG. 8 is started.

Then, with the start of the "positioning operation processing," the position computing unit 13 initially performs the first "position computing process."

At step S200 in FIG. 8, information on the positions (xa,ya), (xb,yb), and (xc,yc) of the base stations A, B, and C is acquired from the reception data Drx which is reproduced upon the reception of the incoming waves from the respective base stations A, B, and C.

Next, at step S202, the first pseudo ranges PRa1 and PRb1 corresponding to the incoming waves from the base stations A and B, and the three pseudo ranges PRc1, PRc2, and PRc3 corresponding to the incoming waves from the base station C are selected as first combination candidates out of the nine pseudo ranges PRa1–PRa3, PRb1–PRb3, and PRc1–PRc3 obtained in step S104 above. With the pseudo ranges PRa1 and PRb1 fixed, the positioning operation using triangulation and successive approximations is started.

In the present embodiment, the pseudo ranges PRa1 and PRb1 pertaining to the base stations A and B are fixed, and the three pseudo ranges PRc1, PRc2, and PRc3 pertaining to the base station C are selected as first candidates. However, other combinations are acceptable as well. That is, the pseudo ranges PRa1 and PRc1 pertaining to the base stations A and C may be fixed while the three pseudo ranges PRb1, PRb2, and PRb3 pertaining to the base station B are selected as the first candidates. The pseudo ranges PRb1 and PRc1 pertaining to the base stations B and C may be fixed while the three pseudo ranges PRa1, PRa2, and PRa3 pertaining to the base station A are selected as the first candidates.

In short, it is essential only that the pseudo ranges pertaining to two of the base stations A, B, and C be fixed and the three pseudo ranges pertaining to the remaining base station be selected as so-called variables.

Thus, in the present embodiment, as mentioned above, the pseudo ranges PRa1 and PRb1 pertaining to the base stations A and B shall be fixed and the three pseudo ranges PRc1, PRc2, and PRc3 pertaining to the base station C be selected as the first candidates.

Moreover, while the pseudo ranges to be fixed are the first pseudo ranges PRa1 and PRb1 of the incoming waves from the base stations A and B, they need not be the first pseudo ranges PRa1 and PRb1. To obtain the present position (xp,yp) of the positioning apparatus 10 requires only the processing of determining the present position (xp,yp) from a plurality of combinations, or the combinations of pseudo ranges in threes pertaining to the base stations A, B, and C. Hence, the order of those combinations is not limited in particular.

Accordingly, in the present embodiment, the combinations shall be processed in order taking account of the speedup of the positioning operation processing etc.

Next, at step S204, the first (k=1) pseudo range PRck (=PRc1) is selected as an operand out of the three pseudo ranges PRc1, PRc2, and PRc3 corresponding to the incoming waves from the base station C. Then, go to step S206.

At step S206, the positions (xa,ya), (xb,yb), and (xc,yc) of the base stations A, B, and C, the fixed pseudo ranges PRa1 and PRb1, and the kth (k=1) pseudo range PRck (=PRc1) are used to compute the approximate position POSIc[a1,b1,c1] of the positioning apparatus 10. This computing involves the processing using successive approximations.

Next, at step S208, the position error calculating parameter PARAc[a1,b1,c1] obtained upon the determination of the foregoing approximate position POSIc[a1,b1,c1] is derived. Equivalently, the position error calculating parameter PARAc[a1,b1,c1] on the occasion when the approximate position POSIc[a1,b1,c1] is finally determined by the successive approximations is derived.

Next, at step S210, it is determined if all the three pseudo ranges PRc1, PRc2, and PRc3 corresponding to the incoming waves from the base station C have been applied to compute the approximate positions POSIc. If not yet ("NO"), then the next pseudo range PRck is selected as the operand at step S212 before the processing is repeated from step S206.

Consequently, as the processing of steps S204–S212 is performed, the pseudo ranges PRc1, PRc2, and PRc3, designated by the variable k, and the fixed pseudo ranges PRa1 and PRb1 are combined for computing. As a result, the three approximate positions POSIc[a1,b1,c1], POSIc[a1,b1,c2], and POSIc[a1,b1,c3] are determined. In addition, the position error calculating parameters PARAc [a1,b1,c1], PARAc [a1,b1,c2], and PARAc [a1,b1,c3] corresponding to the respective approximate positions are obtained.

Next, having completed the computing of the three approximate positions POSIc and the three position error calculating parameters PARAc, go to step S214. These approximate positions POSIc[a1,b1,c1], POSIc[a1,b1,c2], and POSIc[a1,b1,c3] and position error calculating parameters PARAc[a1,b1,c1], PARAc[a1,b1,c2], and PARAc[a1,b1,c3] are transferred to the direct wave detecting unit 14. Then, enter the processing of FIG. 9 so that the direct wave detecting unit 14 performs the first "direct wave detecting process."

Figure 9:
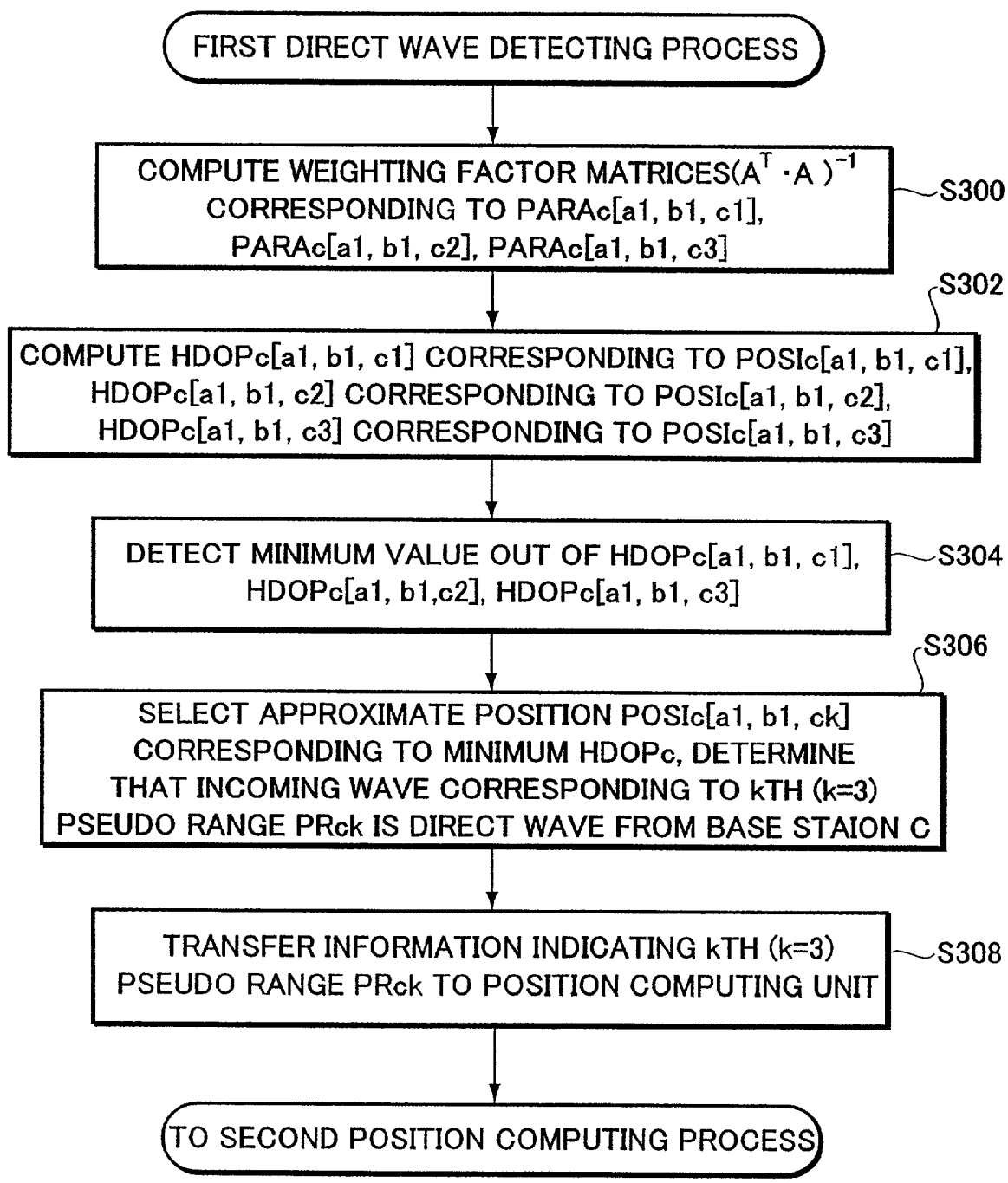
FIG. 9 is a flowchart for explaining the positioning operation of the mobile station, or the operation of the first direct wave detecting process in particular.

At step S300 of FIG. 9, weighting factor matrices (see equations (9) and (10)) corresponding to the position error calculating parameters PARAc[a1,b1,c1], PARAc[a1,b1,c2], and PARAc[a1,b1,c3] are computed. At step S302, positioning errors HDOPc are computed from the respective weighting factor matrices. More specifically, the operations described in the equation (11) are performed to compute the positioning error HDOPc[a1,b1,c1] corresponding to the approximate position POSIc[a1,b1,c1], the positioning error HDOPc[a1,b1,c2] corresponding to the approximate position POSIc[a1,b1,c2], and the positioning error HDOPc[a1,b1,c3] corresponding to the approximate position POSIc[a1,b1,c3].

Next, at step S304, one having the minimum value is detected out of the positioning errors HDOPc[a1,b1,c1], HDOPc[a1,b1,c2], and HDOPc[a1,b1,c3].

Next, at step S306, the approximate position corresponding to the minimum HDOPc (i.e., the positioning error of minimum value) is selected from among the above-mentioned approximate positions POSIc[a1,b1,c1], POSIc[a1,b1,c2], and POSIc[a1,b1,c3]. Given that the kth (k=3) positioning error HDOPc[a1,b1,c3] is the minimum, the corresponding approximate position POSIc[a1,b1,c3] is selected. In addition, the incoming wave corresponding to the kth (k=3) pseudo range PRck (=PRc3) is determined to be the direct wave from the base station C.

Next, at step S308, determination information determined to be of the direct wave, or equivalently, determination information indicating that the kth (k=3) pseudo range PRc3 out of the pseudo ranges PRc1, PRc2, and PRc3 is of the direct wave from the base station C is transferred to the position computing unit 13. Then, enter the processing of FIG. 10 so that the position computing unit 13 performs the second "position computing process."

Figure 10:
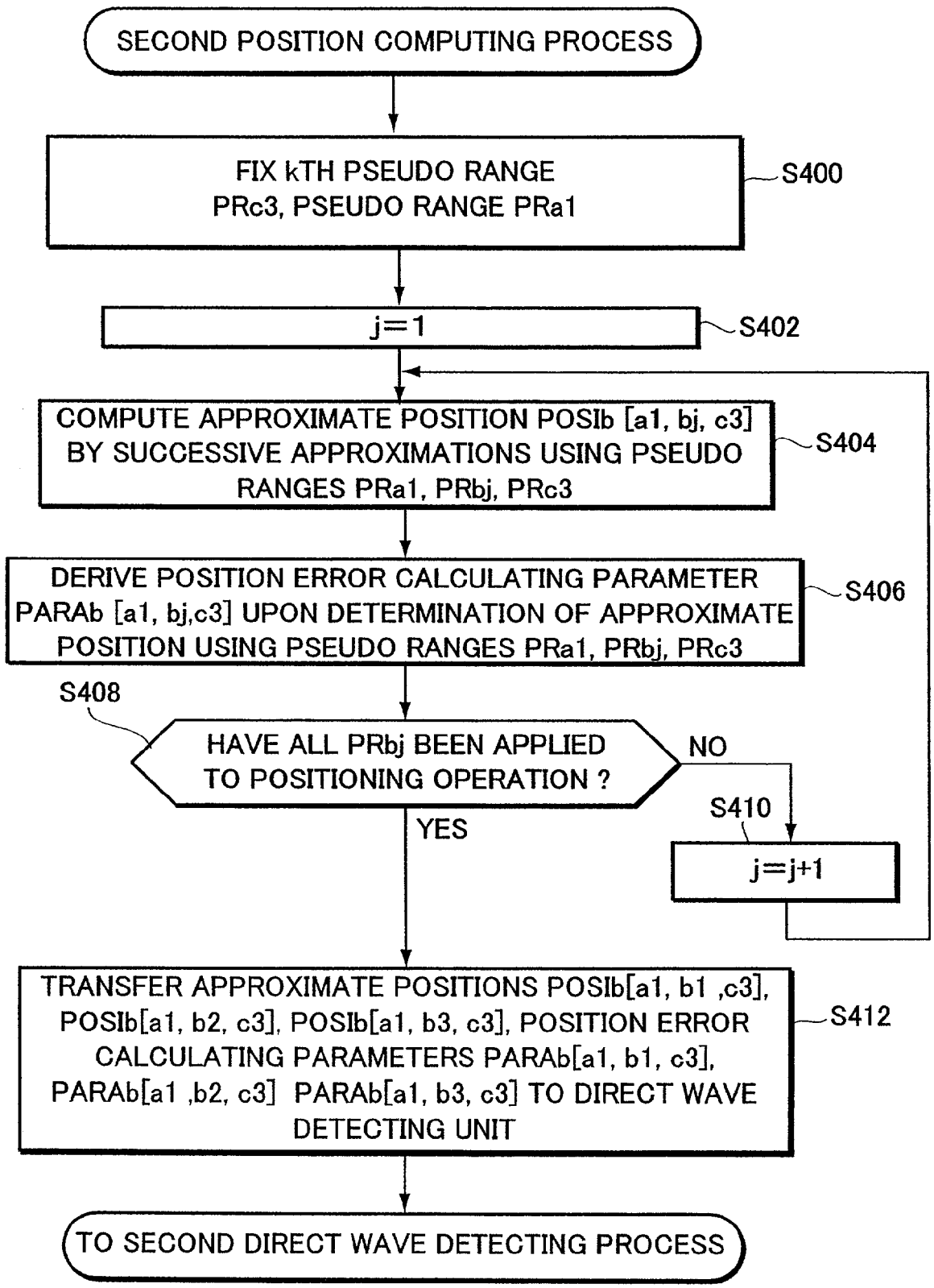
FIG. 10 is a flowchart for further explaining the positioning operation of the mobile station, or the operation of the second position computing process in particular.

In FIG. 10, at step S400, the foregoing kth (k=3) pseudo range PRc3 corresponding to the base station C is fixed according to the determination information that the kth (k=3) pseudo range PRc3 is of the direct wave from the base station C. The pseudo range PRa1 corresponding to the base station A is also fixed, and the three pseudo ranges PRb1, PRb2, and PRb3 corresponding to the incoming waves from the base station B are selected to make combination candidates for the second "position computing process."

More specifically, in the first "position computing process" described in FIG. 8, the pseudo ranges PRa1 and PRb1 obtained from the incoming waves from the base stations A and B are fixed, with the pseudo ranges PRc1, PRc2, and PRc3 obtained from the incoming waves from the base station C as variables, to obtain the approximate positions POSIc. As a result, the kth (k=3) pseudo range PRc3 is determined to be of the direct wave from the base station C.

Then, at step S400 in the second "position computing process," the kth (k=3) pseudo range PRc3 resulting from the direct wave from the base station C is fixed while either the pseudo ranges resulting from the incoming waves from the base station A or those resulting from the incoming waves from the base station B are fixed as well.

Here, any of the pseudo ranges pertaining to the base stations A and B may be fixed. In the present embodiment, the pseudo range PRa1 resulting from an incoming wave from the base station A shall be fixed in the second "position computing process."

Next, at step S402, the first (j=1) pseudo range PRbj (=PRb1) is selected as an operand out of the three pseudo ranges PRb1, PRb2, and PRb3 corresponding to the incoming waves from the base station B. Then, go to step S404.

At step S404, the positions (xa,ya), (xb,yb), and (xc,yc) of the base stations A, B, and C, the fixed pseudo ranges PRa1 and PRc3, and the jth (j=1) pseudo range PRbj (=PRb1) are used to compute the approximate position POSIb[a1,b1,c3] of the positioning apparatus 10. This computing involves the processing using successive approximations.

Next, at step S406, the position error calculating parameter PARAb[a1,b1,c3] obtained upon the determination of the foregoing approximate position POSIb[a1,b1,c3] is derived. Equivalently, the position error calculating parameter PARAb[a1,b1,c3] on the occasion when the approximate position POSIb[a1,b1,c3] is finally determined by the successive approximations is derived.

Next, at step S408, it is determined if all the three pseudo ranges PRb1, PRb2, and PRb3 corresponding to the incoming waves from the base station B have been applied to compute the approximate positions POSIb. If not yet ("NO"), then the next pseudo range PRbj is selected as the operand at step S410 before the processing is repeated from step S404.

Consequently, as the processing of steps S402–S410 is repeated, the pseudo ranges PRb1, PRb2, and PRb3, designated by the variable j, and the fixed pseudo ranges PRa1 and PRc3 are combined for computing. As a result, the three approximate positions POSIb[a1,b1,c3], POSIb[a1,b2,c3], and POSIb[a1,b3,c3] are determined. In addition, the position error calculating parameters PARAb[a1,b1,c3], PARAb[a1,b2,c3], and PARAb[a1,b3,c3] corresponding to the respective approximate positions are obtained.

Next, go to step S412. These approximate positions POSIb[a1,b1,c3], POSIb[a1,b2,c3], and POSIb[a1,b3,c3] and position error calculating parameters PARAb[a1,b1,c3], PARAb[a1,b2,c3], and PARAb[a1,b3,c3] are transferred to the direct wave detecting unit 14. Then, enter the processing of FIG. 11 so that the direct wave detecting unit 14 performs the second "direct wave detecting process."

Figure 11:
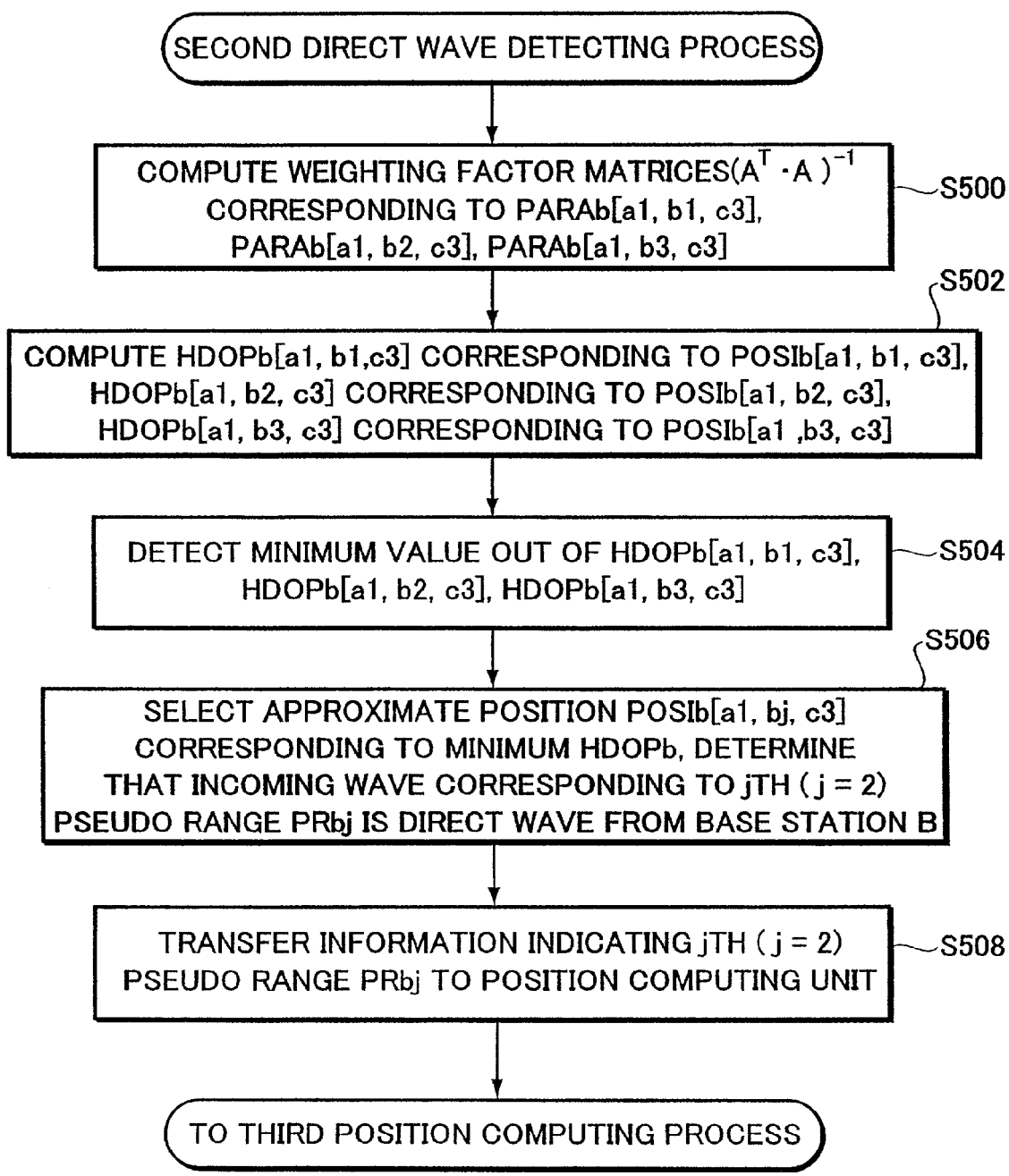
FIG. 11 is a flowchart for further explaining the positioning operation of the mobile station, or the operation of the second direct wave detecting process in particular.

At step S500 of FIG. 11, weighting factor matrices corresponding to the position error calculating parameters PARAb[a1,b1,c3], PARAb[a1,b2,c3], and PARAb[a1,b3,c3] are computed. At step S502, positioning errors HDOPb are computed from the respective weighting factor matrices. More specifically, the operations described in the equation (11) are performed to compute the positioning error HDOPb[a1,b1,c3] corresponding to the approximate position POSIb[a1,b1,c3], the positioning error HDOPb[a1,b2,c3] corresponding to the approximate position POSIb[a1,b2,c3], and the positioning error HDOPb[a1,b3,c3] corresponding to the approximate position POSIb[a1,b3,c3].

Next, at step S504, one having the minimum value is detected out of the positioning errors HDOPb[a1,b1,c3], HDOPb[a1,b2,c3] and HDOPb[a1,b3,c3].

Next, at step S506, the approximate position corresponding to the minimum HDOPb (i.e., the positioning error of minimum value) is selected from among the above-mentioned approximate positions POSIb[a1,b1,c3], POSIb[a1,b2,c3], and POSIb[a1,b3,c3]. Given that the jth (j=2) positioning error HDOPb[a1,b2,c3] is the minimum, the corresponding approximate position POSIb[a1,b2,c3] is selected. In addition, the incoming wave corresponding to the jth (j=2) pseudo range PRbj (=PRb2) is determined to be the direct wave from the base station B.

Next, at step S508, determination information indicating that the jth (j=2) pseudo range PRb2 out of the pseudo ranges PRb1, PRb2, and PRb3 is of the direct wave from the base station B is transferred to the position computing unit 13. Then, enter the processing of FIG. 12 so that the position computing unit 13 performs the third "position computing process."

Figure 12:
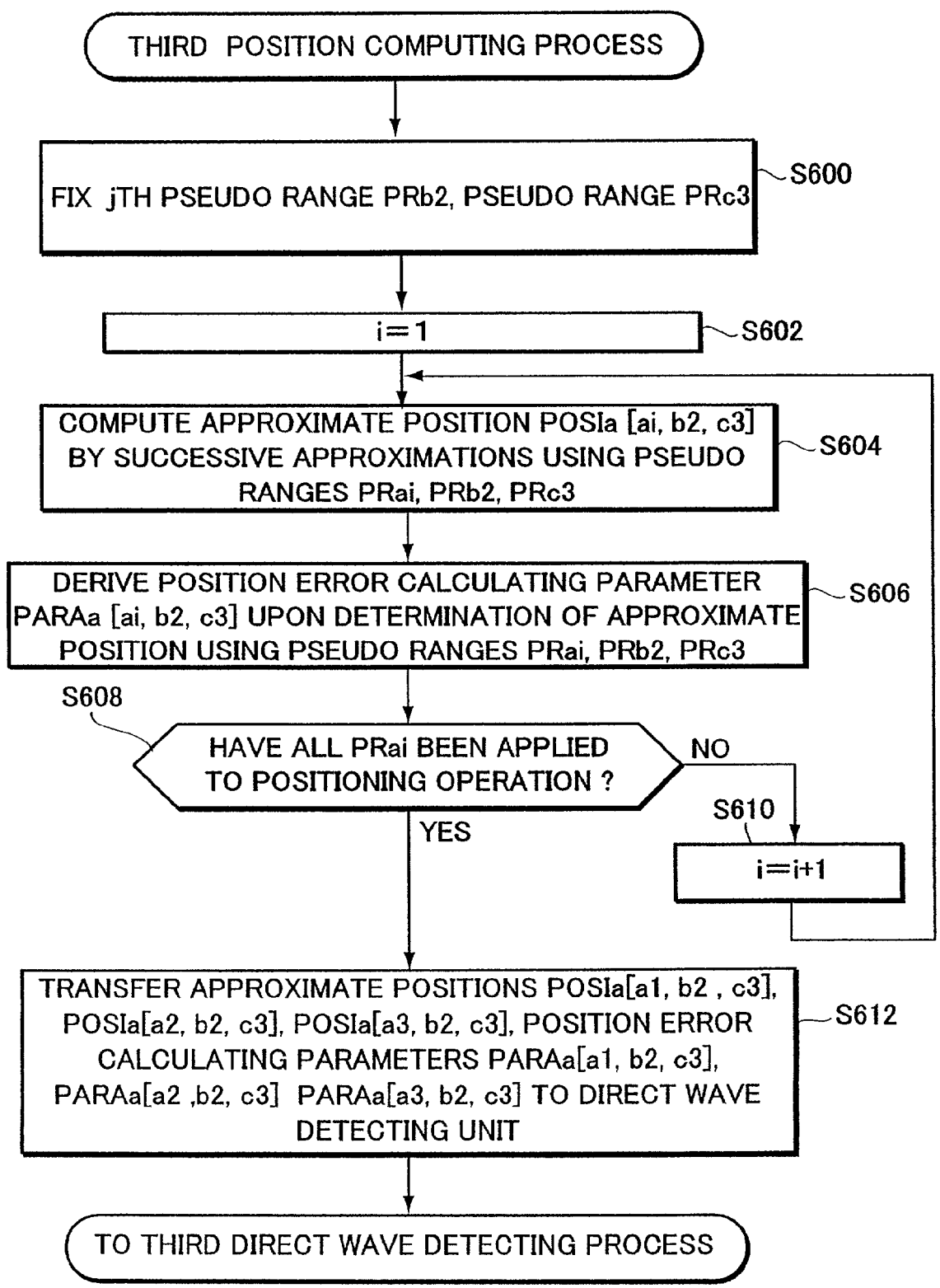
FIG. 12 is a flowchart for further explaining the positioning operation of the mobile station, or the operation of the third position computing process in particular.

In the third "position computing process" shown in FIG. 12, at step S600, the kth (k=3) pseudo range PRc3 and the jth (j=2) pseudo range PRb2 are initially fixed according to the determination information that the kth (k=3) pseudo range PRc3 is of the direct wave from the base station C and the jth (j=2) pseudo range PRb2 is of the direct wave from the base station B. The three pseudo ranges PRa1, PRa2, and PRa3 corresponding to the incoming waves from the base station A are selected as combination candidates for the third "position computing process."

Next, at step S602, the first (i=1) pseudo range PRai (= PRa1) is selected as an operand out of the three pseudo ranges PRa1, PRa2, and PRa3 corresponding to the incoming waves from the base station A. Then, go to step S604.

At step S604, the positions (xa,ya), (xb,yb), and (xc,yc) of the base stations A, B, and C, the fixed pseudo ranges PRb2 and PRc3, and the ith (i=1) pseudo range PRai (=PRa1) are used to compute the approximate position POSIa[a1,b2,c3] of the positioning apparatus 10. This computing involves the processing using successive approximations.

Next, at step S606, the position error calculating parameter PARAa[a1,b2,c3] obtained upon the determination of the foregoing approximate position POSIa[a1,b2,c3] is derived. Equivalently, the position error calculating parameter PARAa[a1,b2,c3] on the occasion when the approximate position POSIa[a1,b2,c3] is finally determined by the successive approximations is derived.

Next, at step S608, it is determined if all the three pseudo ranges PRa1, PRa2, and PRa3 corresponding to the incoming waves from the base station A have been applied to compute the approximate positions POSIa. If not yet ("NO"), then the next pseudo range PRbj is selected as the operand at step S610 before the processing is repeated from step S604.

Consequently, as the processing of steps S602–S610 is repeated, the pseudo ranges PRa1, PRa2, and PRa3, designated by the variable i, and the fixed pseudo ranges PRb2 and PRc3 are combined for computing. As a result, the three approximate positions POSIa[a1,b2,c3], POSIa[a2,b2,c3], and POSIa[a3,b2,c3] are determined. In addition, the position error calculating parameters PARAa[a1,b2,c3], PARAa[a2,b2,c3], and PARAa [a3,b2,c3] corresponding to the respective approximate positions are obtained.

Next, go to step S612. These approximate positions POSIa[a1,b2,c3], POSIa[a2,b2,c3], and POSIa[a3,b2,c3] and position error calculating parameters PARAa[a1,b2,c3], PARAa[a2,b2,c3], and PARAa[a3,b2,c3] are transferred to the direct wave detecting unit 14. Then, enter the processing of FIG. 13 so that the direct wave detecting unit 14 performs the third "direct wave detecting process."

Figure 13:
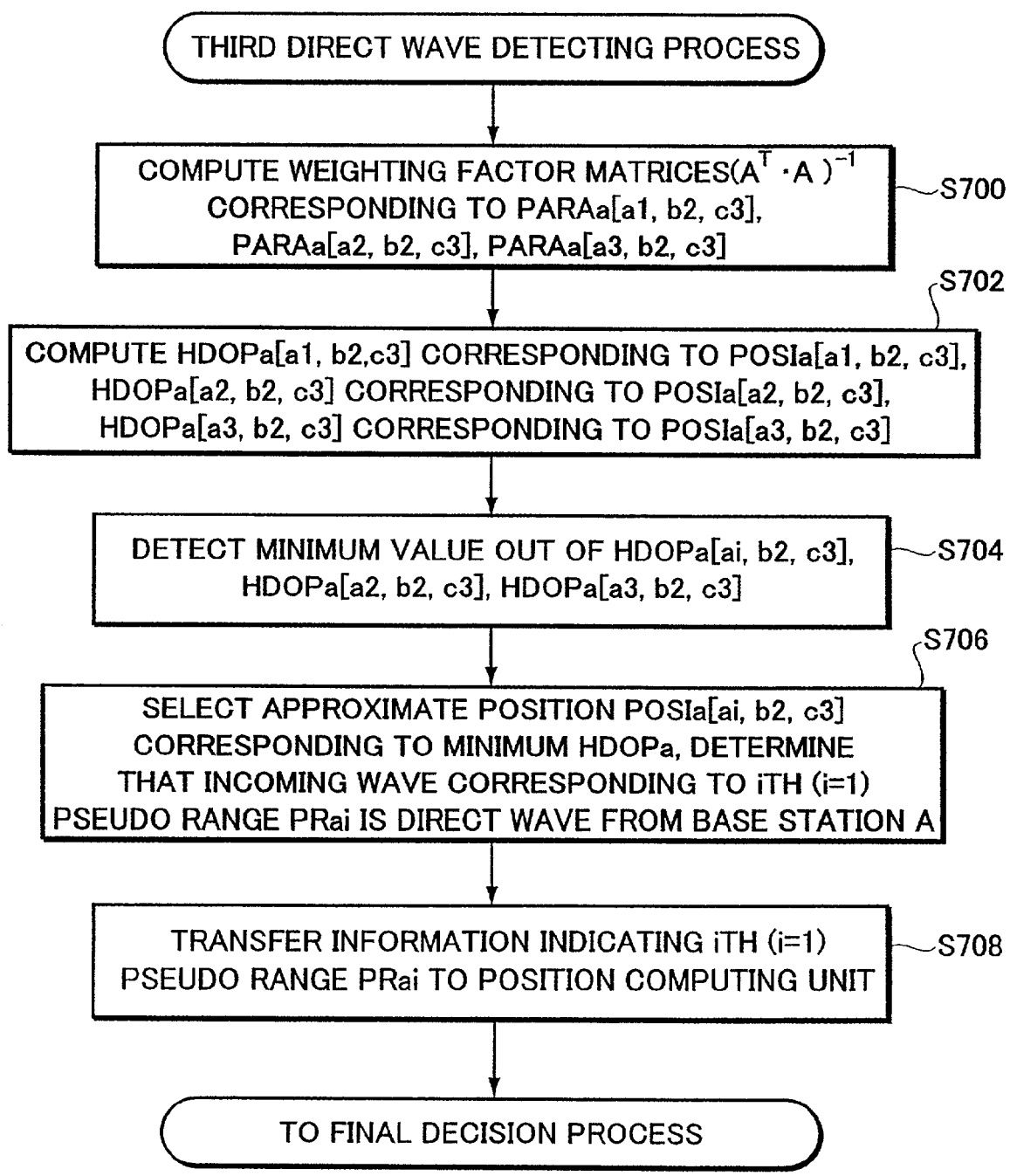
FIG. 13 is a flowchart for further explaining the positioning operation of the mobile station, or the operation of the third direct wave detecting process in particular.

At step S700 of FIG. 13, weighting factor matrices corresponding to the position error calculating parameters PARAa[a1,b2,c3], PARAa[a2,b2,c3], and PARAa[a3,b2,c3] are computed. At step S702, positioning errors HDOPa are computed from the respective weighting factor matrices. More specifically, the operations described in the equation (11) are performed to compute the positioning error HDOPa[a1,b2,c3] corresponding to the approximate position POSIa[a1,b2,c3], the positioning error HDOPa[a2,b2,c3] corresponding to the approximate position POSIa[a2,b2,c3], and the positioning error HDOPa[a3,b2,c3] corresponding to the approximate position POSIa[a3,b2,c3].

Next, at step S704, one having the minimum value is detected out of the positioning errors HDOPa[a1,b2,c3], HDOPa[a2,b2,c3], and HDOPa[a3,b2,c3].

Next, at step S706, the approximate position corresponding to the minimum HDOPa (i.e., the positioning error of minimum value) is selected from among the above-mentioned approximate positions POSIA a1,b2,c3], POSIa[a2,b2,c3], and POSIa[a3,b2,c3]. Given that the ith (i =1) positioning error HDOPa[a1,b2,c3] is the minimum, the corresponding approximate position POSIa[a1,b2,c3] is selected. In addition, the incoming wave corresponding to the ith (i=1) pseudo range PRai (=PRa1) is determined to be the direct wave from the base station A.

Next, at step S708, determination information indicating that the ith (i=1) pseudo range PRa1 out of the pseudo ranges PRa1, PRa2, and PRa3 is of the direct wave from the base station A is transferred to the position computing unit 13. Then, enter the processing of FIG. 14 to perform the "final decision process" by the position computing unit 13.

Figure 14:
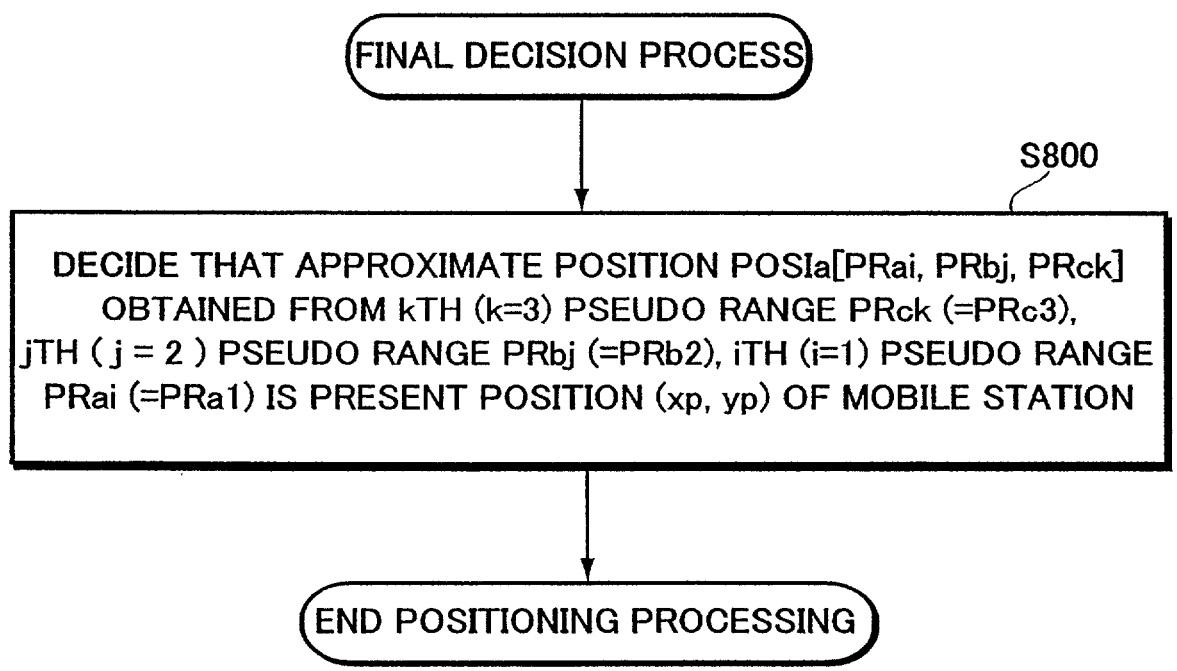
FIG. 14 is a flowchart for further explaining the positioning operation of the mobile station, or the operation of the final decision process in particular.

In the "final decision process" of FIG. 14, at step S800, the approximate position POSIa[a1,b2,c3] obtained from the pseudo range PRck determined to be of the direct wave from the base station C (i.e., the kth (k=3) pseudo range PRc3), the pseudo range PRbj determined to be of the direct wave from the base station B (i.e., the jth (j=2) pseudo range PRb2), and the pseudo range PRai determined to be of the direct wave from the base station A (i.e., the ith (i=1) pseudo range PRa1) is decided to be the present position (xp,yp) of the positioning apparatus 10.

Then, positioning data Dps indicating this present position (xp,yp) is supplied from the position computing unit 13 to the control unit 18 to end the positioning processing. That is, the processing of step S106 shown in FIG. 7 is completed to proceed to the processing of the aforementioned steps S108 and later.

As described above, according to the present embodiment, incoming waves from at least three base stations, e.g., A, B, and C lying around the positioning apparatus 10 are received. Correlation operations are performed between output data Dd obtained from those incoming waves and predetermined correlation data Da, Db, and Dc of the respective base stations A, B, and C, to determine correlation values CRRa, CRRb, and CRRC. These correlation values CRRa, CRRb, and CRRc are subjected to peak detection to detect pseudo ranges in threes: PRa1, PRa1, and PRa3; PRb1, PRb2, and PRb3; and PRc1, PRc2, and PRc3. It should be noted that these pseudo ranges in threes are detected from peak values which appear in the regions of smaller phase differences with respect to the positions of appearance of the maximum peak values as shown in FIGS. 5(a), 5(b), and 5(c), respectively. In each case, phase differences at the positions of appearance are detected on a total of three peak values including the maximum peak value.

Besides, the detection shall cover pseudo ranges which occur within the limits of time according to the communication areas of the respective base stations A, B, and C.

This offers an excellent effect that the pseudo ranges of the direct waves coming to the positioning apparatus 10 from the respective base stations A, B, and C can be detected properly.

The pseudo ranges detected in threes PRa1, PRa2, and PRa3, PRb1, PRb2, and PRb3, and PRc1, PRc2, and PRc3 are associated with the base stations A, B, and C, and approximate positions POSI are determined by triangulation with combinations of three pseudo ranges as candidates. The determination of the approximate positions POSI by triangulation also involves the processing using successive approximations, so that the approximate positions POSI can be determined with yet higher precision.

While the plurality of approximate positions POSI are determined in accordance with the combinations of pseudo ranges in threes mentioned above, position error calculating parameters PARA and positioning errors HDOP for showing the positioning precisions of the individual approximate positions POSI are obtained. The approximate positions POSI are narrowed down based on the positioning errors HDOP of minimum value, and the approximate position POSI obtained finally is determined to be the present position (xp,yp) of the positioning apparatus 10.

When the above-described narrowing is performed thus, the direct waves less susceptible to the influence of multipath fading and noise and a variety of adverse effects occurring in the communication environment are selected from the pseudo ranges. As a result, the approximate position POSI obtained from the direct waves selected is determined to be the present position (xp,yp) of the positioning apparatus 10. This allows high precision positioning while suppressing the influence of multipath fading and noise and a variety of adverse effects occurring in the communication environment.

As shown in FIG. 15(b), when the positioning error HDOP is greater than a predetermined value, the display unit 16 makes on-screen display such as the circle Cerr equivalent to the magnitude of the positioning error HDOP, along with the display "P" which indicates the present position (xp,yp). Therefore, it is possible to notify users or others of how precise the result of the positioning is or of the quality of the positioning environment and the like, achieving improved convenience and the like.

Second Embodiment

Now, description will be given of a second embodiment of the present invention. This embodiment relates to a modified example of the positioning apparatus 10 described in the first embodiment.

Incidentally, the mobile station of the present embodiment has the same configuration as that of the mobile station 10 of the first embodiment shown in FIGS. 2–4, and performs positioning based on the same principle as the principle of positioning described with reference to FIGS. 4 and 5. Therefore, description will be omitted of the configuration and positioning principle of the mobile station in the present embodiment.

Figure 16:
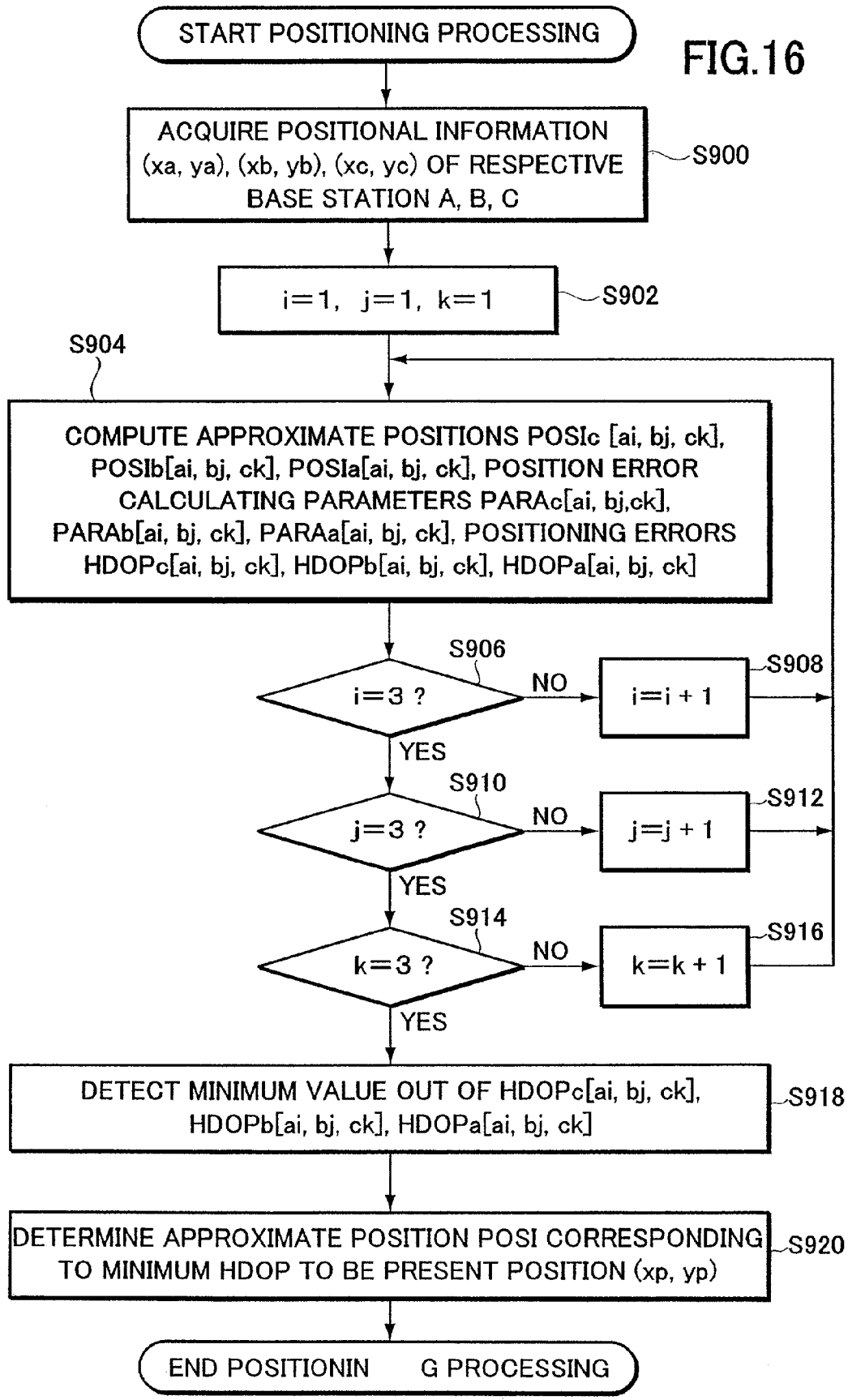
FIG. 16 is a flowchart for explaining the operation of a second embodiment.

The mobile station of the present invention operates along the positioning processing steps of the positioning apparatus 10 of the first embodiment described in conjunction with FIGS. 7–15, whereas the positioning processing shown in FIGS. 8–14 is replaced with the positioning processing shown in FIG. 16.

More specifically, the positioning apparatus 10 of the first embodiment described before performs the detection processing of the pseudo ranges PRa1–PRa3, PRb1–PRb3, and PRc1–PRc3 by the range measuring unit 12 at steps S100–S104 shown in FIG. 7, and then performs the positioning processing of step S106 along the flowcharts shown in FIGS. 8–14. In this positioning processing, the computing of approximate positions POSI and position error calculating parameters PARA by the position computing unit 13 and the determination of the direct wave by the direct wave detecting unit 14 are repeated a plurality of times (three times). The approximate positions POSI are thereby narrowed down based on the positioning errors HDOP of minimum value, and the approximate position POSI obtained finally is determined to be the present position (xp,yp) of the positioning apparatus 10.

In contrast, the mobile station of the present embodiment skips the process of narrowing down approximate positions POSI based on the positioning errors HDOP of minimum value as in the first embodiment. The positioning processing of step S106 shown in FIG. 7 is performed along the flowchart of FIG. 16 instead.

In FIG. 16, the mobile station of the present embodiment performs the detection process of the pseudo ranges PRa1–PRa3, PRb1–PRb3, and PRc1–PRc3 by the range measuring unit 12. Then, enter the processing of step S900 in the chart so that the position computing unit 13 acquires information indicating the positions (xa,ya), (xb,yb), and (xc,yc) of the base stations A, B, and C from the reception data Drx.

Next, at steps S902–S916, the position computing unit 13 changes the variables i, j, and k corresponding to the base stations A, B, and C in succession. A combination of three pseudo ranges PRai, PRbj, and PRck corresponding to the base stations A, B, and C is thus selected from among the pseudo ranges PRa1–PRa3, PRb1–PRb3, and PRc1–PRc3. According to those three pseudo ranges PRai, PRbj, and PRck selected and the positions (xa,ya), (xb,yb), and (xc,yc) of the base stations A, B, and C, the position computing unit 13 computes the approximate positions POSIc[ai,bj,ck], POSIb[ai,bj,ck], and POSIa[ai,bj,ck], the position error calculating parameters PARAc[ai,bj,ck], PARAb[ai,bj,ck], and PARAa[ai,bj,ck], and the positioning errors HDOPc[ai,bj,ck], HDOPb[ai,bj,ck], and HDOPa[ai,bj,ck] by successive approximations.

To be more specific, at step S902, the variables i, j, and k are set at initial values. Then, at step S904, the combination of three pseudo ranges PRai, PRbj, and PRck and the positions (xa,ya), (xb,yb), and (xc,yc) of the base stations A, B, and C are used to compute the first approximate positions POSI, position error calculating parameters PARA, and positioning errors HDOP. Subsequently, at steps S906–S916, the variables i, j, and k are incremented in succession so that the computing process of step S904 is repeated until all the variables i, j, and k become 3. Consequently, according to the entire combinations of pseudo ranges PRai, PRbj, and PRck in threes corresponding to the respective base stations A, B, and C (i.e., 27combinations), there are computed 27 approximate positions POSIc[ai,bj, ck], POSIb[ai,bj,ck], and POSIa[ai,bj,ck], 27 position error calculating parameters PARAc[ai,bj,ck], PARAb[ai,bj,ck], and PARAa[ai,bj,ck], and 27 positioning errors HDOPc[ai, bj,ck], HDOPb[ai,bj,ck], and HDOPa[ai,bj,ck].

When the approximate positions POSI, the position error calculating parameters PARA, and the positioning errors HDOP in twenty-sevens have been computed thus, the direct wave detecting unit 14 detects a positioning error HDOP of minimum value out of the 27 positioning errors HDOPc[ai, bj,ck], HDOPb[ai,bj,ck], and HDOPa[ai,bj,ck]. The direct wave detecting unit 14 notifies the position computing unit 13 of the information on the approximate position POSI corresponding to the positioning error HDOP detected.

Next, at step S920, the position computing unit 13 determines that the approximate position POSI corresponding to the positioning error HDOP of minimum value is the present position (xp,yp) of the mobile station, based on the information notified by the direct wave detecting unit 14, and supplies positioning data Dps indicating the present position (xp,yp) to the control unit 18. Then, enter the processing of step S108 shown in FIG. 7.

Although the 27 approximate positions POSIc[ai,bj,ck], POSIb[ai,bj,ck], and POSIa[ai,bj,ck], the 27 position error calculating parameters PARAc[ai,bj,ck], PARAb[ai,bj,ck], and PARAa [ai,bj,ck], and the 27 positioning errors HDOPc [ai,bj,ck], HDOPb[ai,bj,ck], and HDOPa[ai,bj,ck] are thus computed in advance based on the entire combinations (27 combinations) of the pseudo ranges PRa1–PRa3, PRb1–PRb3, and PRc1–PRc3 in threes obtained through the reception of the radio waves coming from the base stations A, B, and C, and then the approximate position POSI having the positioning error HDOP of minimum value is determined to be the present position (xp,yp), it is possible to suppress the influence of multipath fading and noise and to suppress a variety of adverse effects occurring in the communication environment for high precision positioning.

Third Embodiment

Next, a third embodiment will be described with reference to FIGS. 17–20.

In the foregoing first and second embodiments, the positioning apparatus 10 receives radio waves coming from base stations, and then the positioning apparatus 10 determines the present position (xp,yp) by itself. In this third embodiment, on the contrary, the present position (xp,yp) of the mobile station is determined by the base-station side so that the influence of multipath fading and noise is suppressed and a variety of adverse effects occurring in the communication environments are suppressed for high precision positioning.

Figure 17:
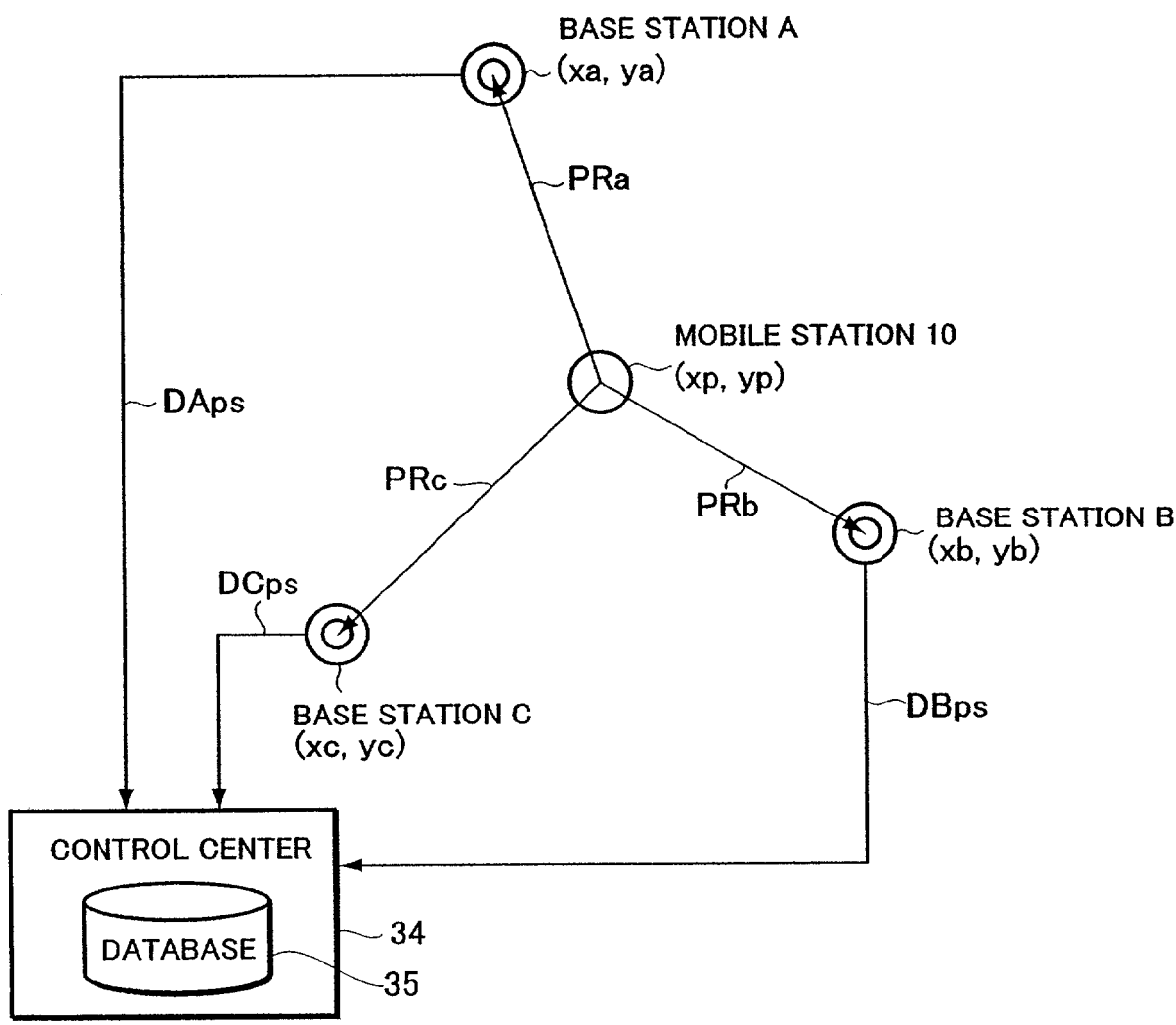
FIG. 17 is a diagram for explaining the principle of positioning in a third embodiment.

To be more specific, as schematically shown in FIG. 17, the positioning apparatus 10 transmits a radio wave for requesting positioning (hereinafter, referred to as "positioning wave") at an arbitrary position within the communication area. Base stations, for example, A, B, and C which lie around the positioning apparatus 10 receive the positioning wave. Then, the base stations A, B, and C, and a control center 34 for controlling the base stations A, B, and C determine the present position (xp,yp) of the positioning apparatus 10. When a request for map or other navi-information is made by the positioning apparatus 10, the navi-information pertaining to the present position (xp,yp) is retrieved from a database 35 installed in the control center 34. The present position (xp,yp) determined and the navi-information retrieved are transmitted toward the positioning apparatus 10 from any one of the base stations A, B, and C, or another base station.

Figure 18:
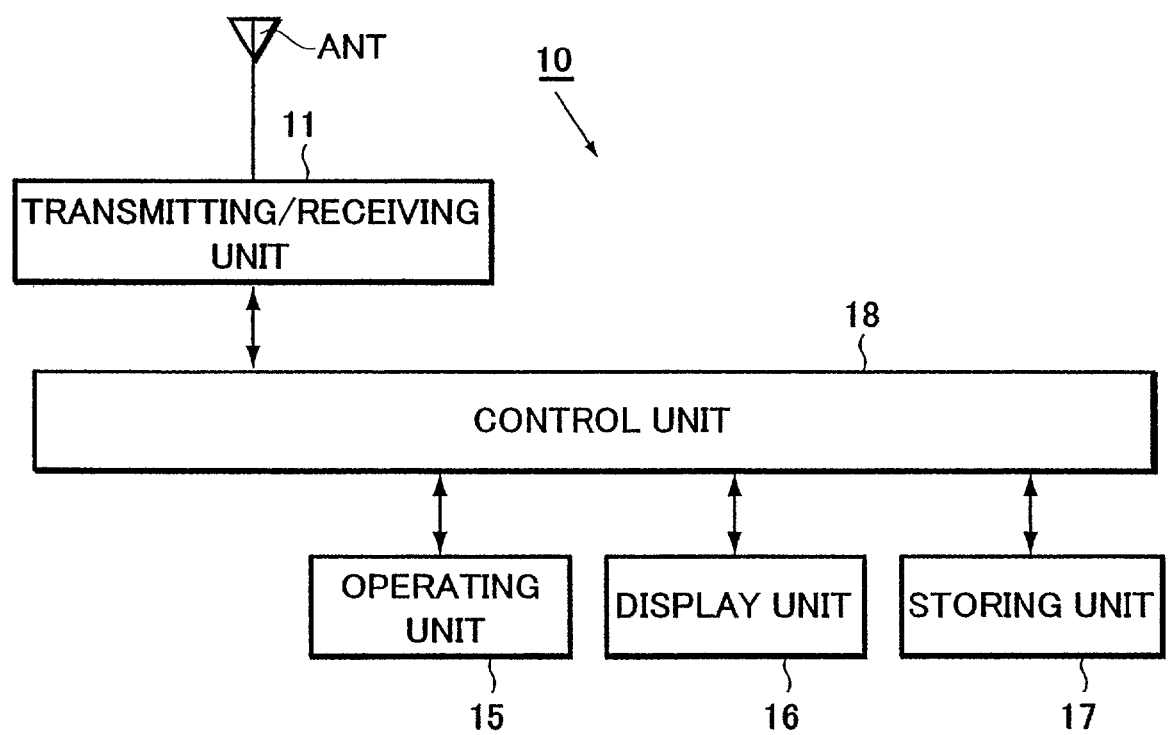
FIG. 18 is a block diagram showing the configuration of a mobile station in the third embodiment.
Figure 19:
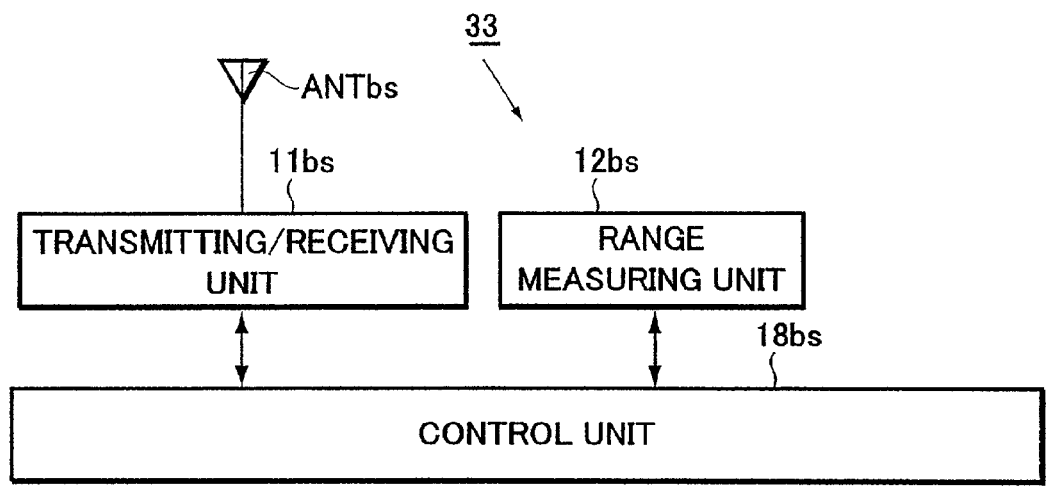
FIGS. 19(a) and 19(b) are block diagrams showing the configuration of a positioning apparatus arranged in a base station and of a control center in the third embodiment, respectively.
Figure 19:
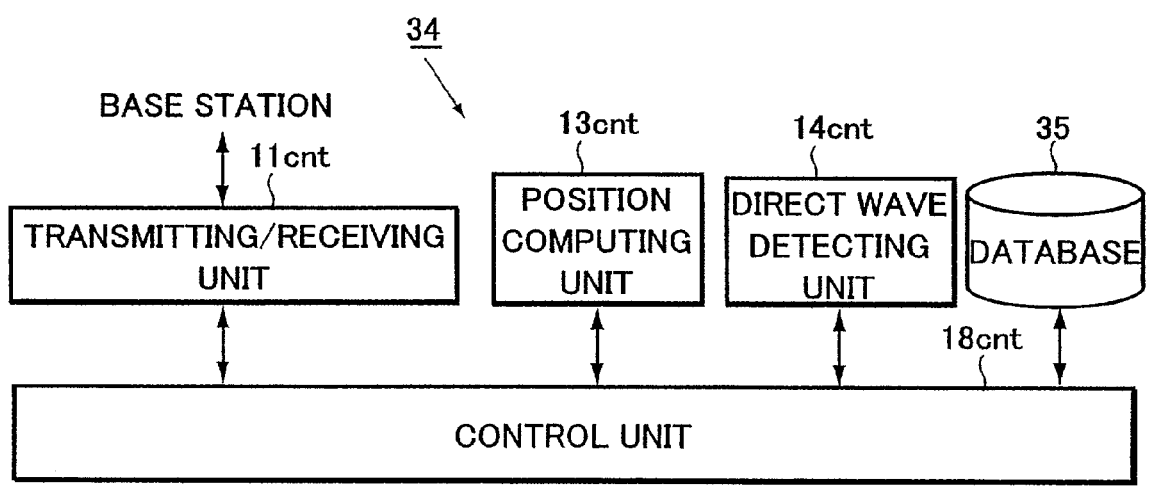

FIG. 18 is a block diagram showing the configuration of the essential parts of the positioning apparatus 10. FIGS. 19(a) and 19(b) are block diagrams showing the configuration of the essential parts of a positioning apparatus 33 to be arranged in each base station and of the control center 34, respectively.

Referring to FIG. 18, compare the configuration of the positioning apparatus 10 of the present embodiment to that of the positioning apparatus 10 of the first embodiment shown in FIG. 2. The positioning apparatus 10 of the present embodiment has a transmitting/receiving antenna ANT and a transmitting/receiving unit 11 for conducting communications with base stations, an operating unit 15, a display unit 16, a storing unit 17, and a control unit 18, but none of the range measuring unit 12, the position computing unit 13, and the direct wave detecting unit 14 described previously in the first embodiment.

Therefore, when users or others want to have the present position of the positioning apparatus 10 determined, the operating unit 15 is supposed to be operated to make a positioning request to the base-station side.

Meanwhile, each base station is provided with a positioning apparatus 33 which is configured as shown in FIG. 19(a). This positioning apparatus 33 comprises a transmitting/receiving antenna ANTbs and a transmitting/receiving unit 11bs for conducting communications with the positioning apparatus 10, a range measuring unit 12bs, and a control unit 18bs for exercising central control over the operation of the entire positioning apparatus 33.

The transmitting/receiving unit 11bs basically has the same configuration as that of the transmitting/receiving unit 11 shown in FIG. 3, including the receiving unit 11rx and the transmitting unit 11tx. When incoming waves (i.e., positioning wave) from the positioning apparatus 10 are received, the despread code sequence generator 24 arranged in the transmitting/receiving unit 11bs generates a despread code sequence CODErx corresponding to the positioning apparatus 10. The despreading unit 22 performs a cross-correlation operation between the despread code sequence CODErx and output data Dd output from the roll-off filter 21. To transmit radio waves to the positioning apparatus 10, the spread code sequence generator 28 arranged in the transmitting/receiving unit 11bs generates a spread code sequence CODEtx corresponding to the positioning apparatus 10. The spreading unit 27 performs a cross-correlation operation between the spread code sequence CODEtx and transmission data Dtx to be transmitted, and supplies the resultant to the roll-off filter 26.

The range measuring unit 12bs has a configuration similar to that of the range measuring unit 12 shown in FIGS. 2 and 4.

Note that the range measuring unit 12 of the first embodiment shown in FIG. 4 includes at least three signal processing systems or even more, in order to compute correlation values corresponding to at least three base stations based on the incoming waves from the respective base stations. In contrast, the range measuring unit 12bs shown in FIG. 19(a) has at least one signal processing system, or more, in order to determine a correlation value resulting from the positioning wave from the positioning apparatus 10 at the time of positioning. That is, at the minimum number of signal processing systems, the configuration requires one signal processing system alone.

Therefore, for convenience's sake, the present embodiment will be described on the following assumption. That is, the positioning apparatus 33 in the base station A is provided with a range measuring unit 12bs which has one signal processing system consisting of the correlator 29a, the correlating data generator 31a, the range computing unit 30a, and the threshold generating unit 32a shown in FIG. 4. The positioning apparatus 33 in the base station B is provided with a range measuring unit 12bs which has one signal processing system consisting of the correlator 29b, the correlating data generator 31b, the range computing unit 30b, and the threshold generating unit 32b shown in FIG. 4. The positioning apparatus 33 in the base station C is provided with a range measuring unit 12bs which has one signal processing system consisting of the correlator 29c, the correlating data generator 31c, the range computing unit 30c, and the threshold generating unit 32c shown in FIG. 4.

The correlating data generators 31a, 31b, and 31c generate correlating data Da, Db, and Dc which corresponds to mobile station identification data contained in the positioning wave from the positioning apparatus 10, and supply the same to the correlators 29a, 29b, and 29c, respectively.

Figure 5:
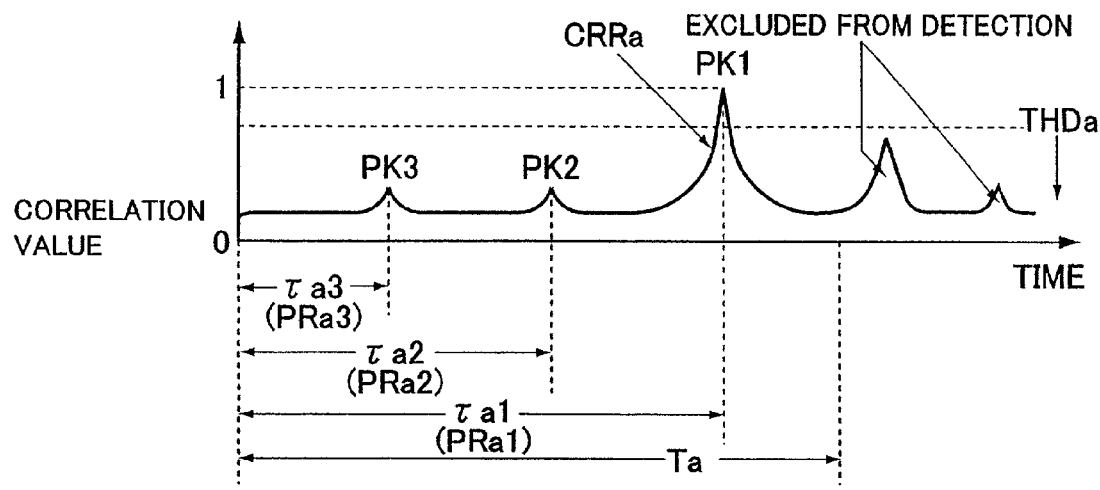
FIGS. 5(a)–5(c) are diagrams for explaining the operations of measuring pseudo ranges by the range measuring unit.
Figure 5:
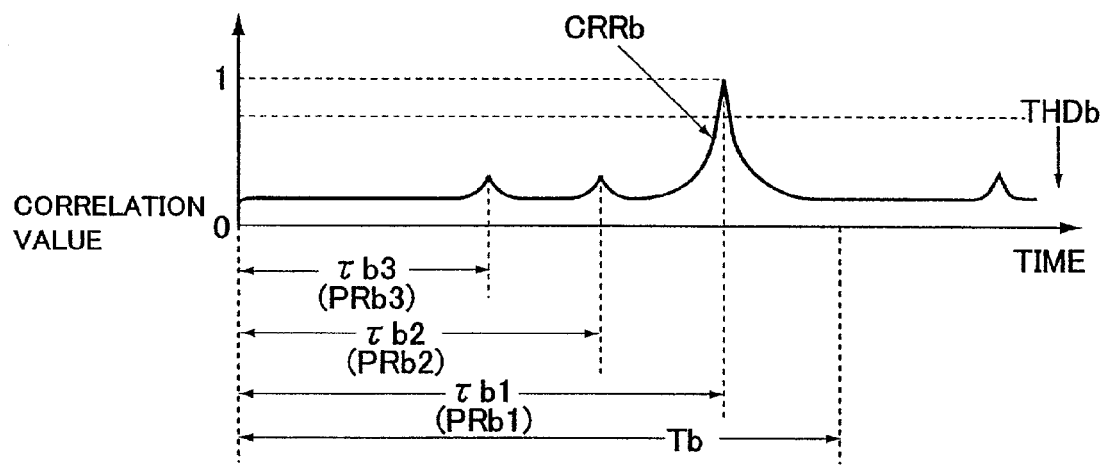
Figure 5:
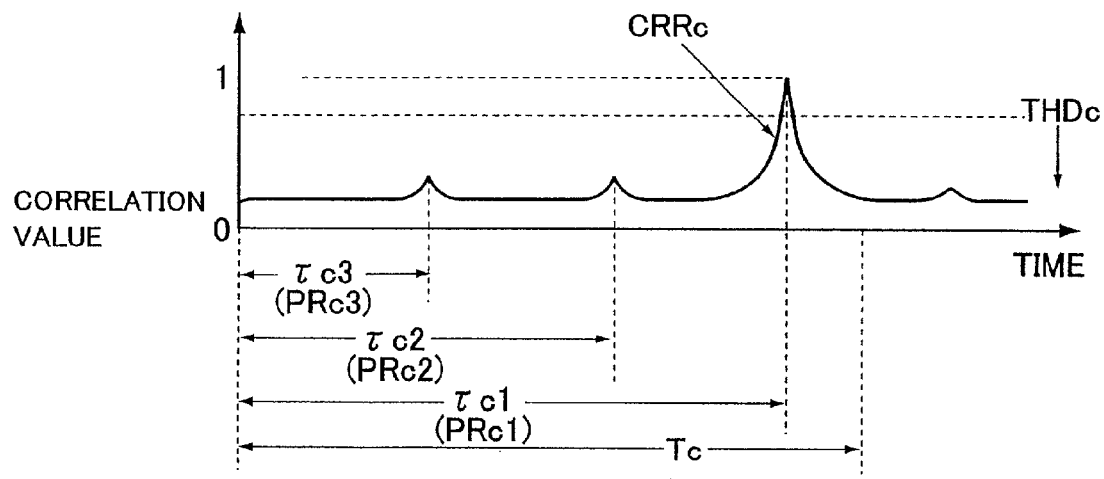

The positioning apparatus 33 in the base station A performs the same peak-detection processing as shown in FIG. 5, and detects three pseudo ranges PRa1, PRa2, and PRa3 from the correlation value CRRa. These pseudo ranges PRa1, PRa2, and PRa3 detected are transferred to the control center 34 as detection data DAps. The positioning apparatus 33 in the base station B similarly detects three pseudo ranges PRb1, PRb2, and PRb3 from the correlation value CRRb, and transfers these pseudo ranges PRb1, PRb2, and PRb3 detected to the control center 34 as detection data DBps. The positioning apparatus 33 in the base station C also similarly detects three pseudo ranges PRc1, PRc2, and PRc3 from the correlation value CRRc, and transfers these pseudo ranges PRc1, PRc2, and PRc3 detected to the control center 34 as detection data DCps. When the positioning wave contains navi-information requesting information which indicates a request for navi-information, the navi-information requesting information is also transferred to the control center 34 from the base stations A, B, and C.

As shown in FIG. 19(b), the control center 34 comprises a transmitting/receiving unit 11cnt for conducting communications with base stations in the communication area, a position computing unit 13cnt, a direct wave detecting unit 14cnt, the database 35, and a control unit 18cnt for exercising central control over the entire control center 34.

Here, the transmitting/receiving unit 11cnt conducts high speed communications through optical fiber channels laid to the individual base stations. It receives the detection data DAps, DBps, and DCps and the navi-information requesting information for indicating a request for navi-information, transferred from the base stations A, B, and C, over the optical fiber channels.

The position computing unit 13cnt and the direct wave detecting unit 14cnt arranged in the control center 34 perform positioning processing based on triangulation and successive approximations, using the detection data DAps, DBps, and DCps transferred from the base stations A, B, and C, and the positions (xa,ya), (xb,yb), and (xc,yc) of the respective base stations A, B, and C which are known.

That is, the position computing unit 13cnt and the direct wave detecting unit 14cnt perform the same positioning processing as in the flowcharts of the first embodiment shown in FIGS. 8–14, or perform the same positioning processing as in the flowchart of the second embodiment shown in FIG. 16.

The database 35 consists of a so-called mass database server, and contains a variety of information including information on maps and various facilities, various kinds of entertainment (event) information, and shopping information. When a request for navi-information is made, the control unit 18cnt retrieves the information related to the positional information (xp,yp) of the positioning apparatus 10 obtained through the positioning processing by the position computing unit 13cnt and the direct wave detecting unit 14cnt. The information retrieved, or the navi-information, and the positional information (xp,yp) are transferred (sent back) to any one of the base stations A, B, and C, or another base station which lies in favorable communication environment with the positioning apparatus 10. The navi-information and the positional information (xp,yp) are transmitted (distributed) to the positioning apparatus 10 from the transferred base station.

Now, with reference to the flowchart shown in FIG. 20, description will be given of the positioning operation to be made among the positioning apparatus 10, the base stations A, B, and C, and the control center 34 having such configurations.

Figure 20:
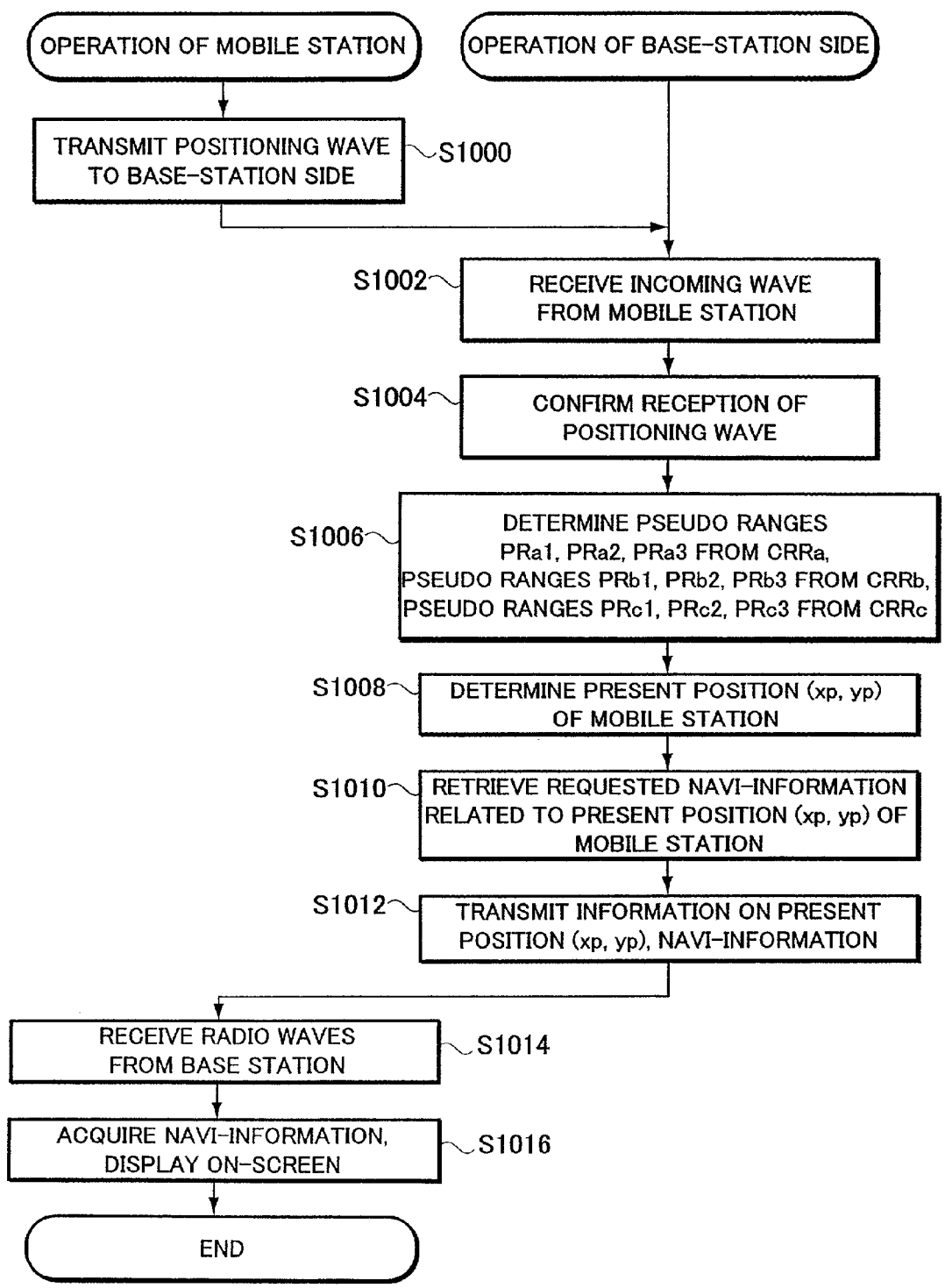
FIG. 20 is a flowchart for explaining the operation of the third embodiment.

In FIG. 20, at step S1000, when users or others operate the operating unit 15 arranged on the positioning apparatus 10 (see FIG. 18) to instruct to start positioning, the control unit 18 commands the transmitting/receiving unit 11 to transmit (originate) the positioning wave. If the users or others instruct a request for navi-information along with the start of positioning, the control unit 18 commands that navi-information requesting information for instructing the request for navi-information be included in the positioning wave for transmission.

When the positioning wave is transmitted thus, the base stations A, B, and C illustrated above, lying around the positioning apparatus 10, individually receive the positioning wave at step S1002.

At step S1004, if the transmitting/receiving unit 11bs of the positioning apparatus 33 in the base station A confirms the reception of the positioning wave, the transmitting/receiving unit 11bs of the positioning apparatus 33 in the base station B confirms the reception of the positioning wave, and the transmitting/receiving unit 11bs of the positioning apparatus 33 in the base station C confirms the reception of the positioning wave, then confirmation information is transferred from the respective positioning apparatuses 33 to the control center 34. In addition, the positioning apparatuses 33 enter the processing of step S1006 to detect pseudo ranges separately.

At step S1006, the positioning apparatus 33 in the base station A computes the correlation value CRRa corresponding to the positioning wave by using the range measuring unit 12bs arranged in the positioning apparatus 33. Besides, the positioning apparatus 33 performs peak detection on the correlation value CRRa to determine the three pseudo ranges PRa1, PRa2, and PRa3.

The positioning apparatus 33 in the base station B similarly computes the correlation value CRRb corresponding to the positioning wave by using the range measuring unit 12bs arranged in the positioning apparatus 33, and performs peak detection on the correlation value CRRb to determine the three pseudo ranges PRb1, PRb2, and PRb3. The positioning apparatus 33 in the base station C similarly computes the correlation value CRRc corresponding to the positioning wave by using the range measuring unit 12bs arranged in the positioning apparatus 33, and performs peak detection on the correlation value CRRc to determine the three pseudo ranges PRc1, PRc2, and PRc3.

As already described with reference to FIG. 5, at the time of determining these pseudo ranges PRa1, PRa2, and PRa3, PRb1, PRb2, and PRb3, and PRc1, PRc2, and PRc3, the peak detection covers the maximum peak values and peak values in the regions of smaller phase differences with respect to the phase differences at the positions of appearance of the maximum peak values. This ensures that all the pseudo ranges corresponding to the direct waves from the positioning apparatus 10 are detected without fail.

Then, the pseudo ranges PRa1, PRa2, and PRa3, PRb1, PRb2, and PRb3, and PRc1, PRc2, and PRc3 determined are transferred from the base stations A, B, and C to the control center 34 as detection data DAps, DBps, and DCps, respectively.

Next, at step S1008, the position computing unit 13 cnt and the direct wave detecting unit 14 cnt in the control center 34 determine the present position (xp,yp) of the positioning apparatus 10 by triangulation and successive approximation, using the foregoing pseudo ranges PRa1, PRa2, and PRa3, PRb1, PRb2, and PRb3, and PRc1, PRc2, and PRc3 transferred and the known positions (xa,ya), (xb,yb), and (xc,yc) of the base stations A, B, and C.

Here, the position computing unit 13 cnt and the direct wave detecting unit 14 cnt determine the present position (xp,yp) of the positioning apparatus 10 by performing the same positioning processing as that of the first embodiment shown in FIGS. 8–14 or the same positioning processing as that of the second embodiment shown in FIG. 16.

Next, at step S1010, if there is any request for navi-information from the positioning apparatus 10, the control unit 18cnt in the control center 14 retrieves the information in the database 35 based on the result of the positioning, i.e., the present position (xp,yp), and acquires the navi-information related to the present position (xp,yp). Then, go to step S1012. In the absence of any request for navi-information from the positioning apparatus 10, the foregoing retrieval is skipped to enter step S1012.

Next, at step S1012, the control unit 18cnt transmits (sends back) the information on the present position (xp,yp) and the navi-information retrieved to any one of the base stations A, B, and C, or another base station which lies in favorable communication environment with the positioning apparatus 10. In the absence of a request for navi-information from the positioning apparatus 10, the information on the present position (xp,yp) is transferred to the base-station side.

The information on the present position (xp,yp), or the information on the present position (xp,yp) and the navi-information, transferred are transmitted (distributed) from the base station toward the positioning apparatus 10 in the form of radio waves.

When the transmission (distribution) to the positioning apparatus 10 is conducted, the positioning apparatus 10 receives the incoming waves from the base station at step S1014. The transmitting/receiving unit 11 shown in FIG. 18 reproduces the reception data, and the control unit 18 acquires the information on the present position (xp,yp), or the present position (xp,yp) and the navi-information, from the reception data.

Then, at step S1016, the information on the present position (xp,yp), or the present position (xp,yp) and the navi-information, acquired is stored into the storing unit 17. The information is also supplied to the display unit 16 to make on-screen display such as illustrated in FIG. 15(a). Then, the processing is ended.

Although not described in the flowchart of FIG. 20, when the control center 34 performs the positioning processing of step S1008, the positioning error HDOP corresponding to the present position (xp,yp) determined is converted into a range. The information on the converted range is also transmitted (distributed) toward the mobile station 10 from the base station. Thereby, as shown in FIG. 15(b), the display unit 16 of the positioning apparatus 10 can make a display such as the circle Cerr for informing of the positioning precision.

Consequently, according to the present embodiment, the positioning is performed on the base-station side. It is therefore unnecessary to equip the positioning apparatus 10 with devices for positioning. As a result, the positioning apparatus 10 can be simplified in configuration and reduced in weight. In addition, there are provided other effects such that existing cellular phones and navigation systems can be used to determine the present position.

In the present embodiment, as shown in FIGS. 19(a) and 19(b), the positioning apparatuses 33 in the base stations are provided with the range measuring units 12bs to detect the pseudo ranges, and the control center 34 is provided with the position computing unit 13cnt and the direct wave detecting unit 14cnt to determine the present position (xp,yp). Alternatively, it is possible to equip the control center 34 with the range measuring unit 12 having a plurality of signal processing systems, the position computing unit 13, and the direct wave detecting unit 14 shown in FIG. 4 while omitting the range measuring units 12bs in the respective base stations.

According to such a system configuration, the base stations A, B, and C illustrated above receive the positioning waves from the positioning apparatus 10, and transfer output data Dd output from the roll-off filters of their respective transmitting/receiving units 11bs to the control center 34. As a result, the control center 34 can perform the processing from the detection of the pseudo ranges to the determination of the present position (xp,yp) of the positioning apparatus 10 collectively, by using the range measuring unit 12, the position computing unit 13, and the direct wave detecting unit 14 mentioned above. Besides, each base station need not be equipped with devices for positioning. Therefore, a system capable of positioning can be constructed with the aid of existing base stations.

Upon receiving the positioning waves from the positioning apparatus 10, the individual base stations may transfer the positioning waves as-is to the control center 34 so that the control center 34 receives the positioning waves and determines the present position (xp,yp) of the positioning apparatus 10 by using the range measuring unit 12 having a plurality of signal processing systems, the position computing unit 13, and the direct wave detecting unit shown in FIG. 4 above. According to such a system configuration, a system capable of positioning can also be constructed with the aid of existing base stations.

As already described in the first embodiment, in detecting the pseudo ranges based on the radio waves coming from the mobile-station side to the base stations A, B, and C, the detection may cover pseudo ranges resulting from the radio waves which come from the mobile-station side within the limits of time depending on the communication areas of the respective base stations A, B, and C.

Fourth Embodiment

Next, a fourth embodiment will be described with reference to FIG. 21.

In the foregoing first and second embodiments, the present position of the mobile station is determined by using the radio waves coming from the base stations to the positioning apparatus 10. In the third embodiment, the present position of the mobile station is determined by using the radio waves transmitted from the mobile station to the base stations. In contrast, according to this fourth embodiment, the present position of a mobile station is determined by using both radio waves coming from base stations to the mobile station and radio waves transmitted from the mobile station to the base stations.

In the present embodiment, the positioning apparatus 10 has the same configuration as that shown in FIG. 2. Meanwhile, the base stations A, B, and C and the control center 34 illustrated have the same configurations as those shown in FIGS. 19(a) and 19(b).

Figure 21:
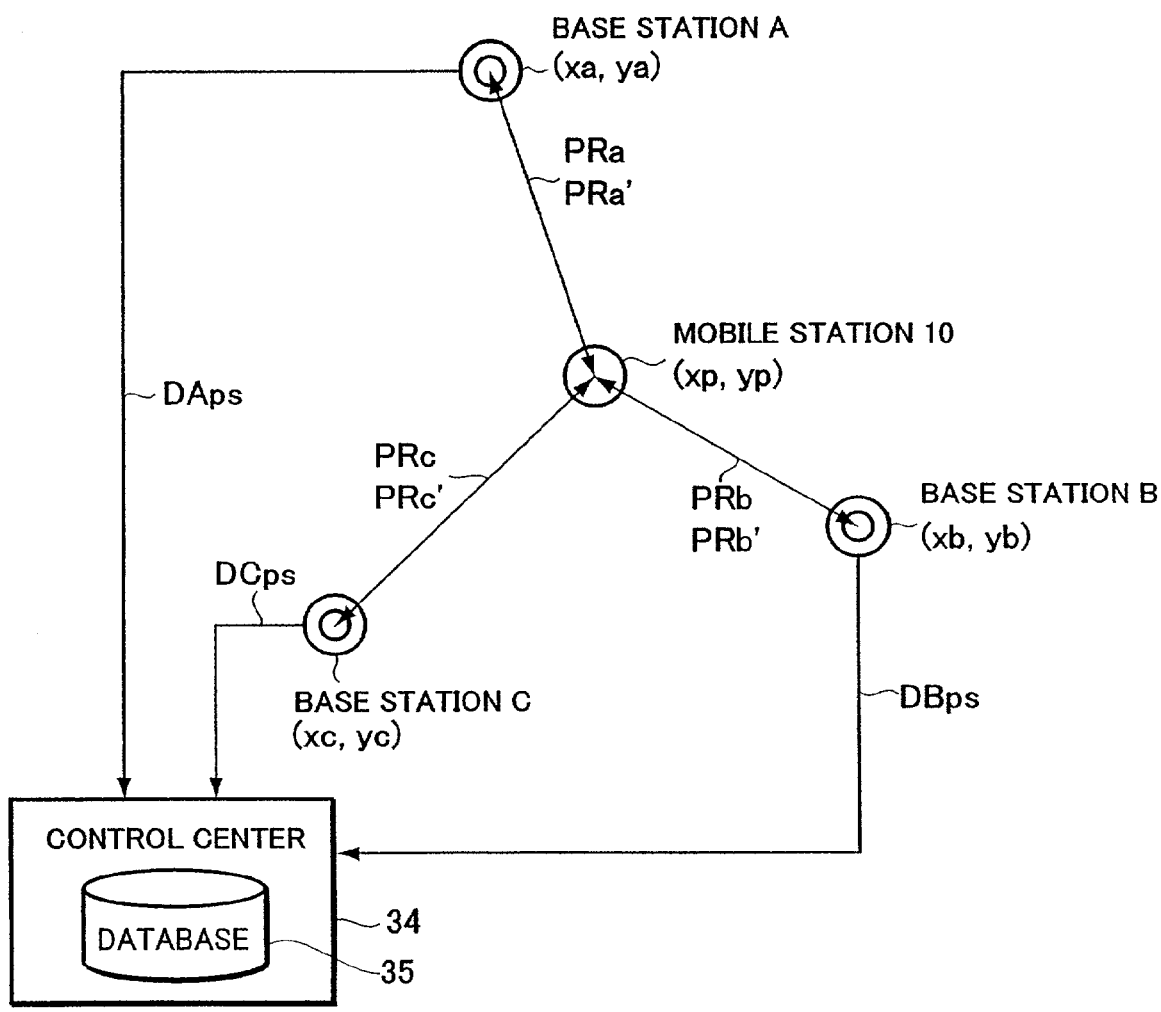
FIG. 21 is a diagram for explaining the principle of positioning in a fourth embodiment.

That is, as schematically shown in FIG. 21, the positioning apparatus 10, having the same configuration as that shown in FIG. 2, receives the incoming waves from the base stations A, B, and C within its periphery at the time of positioning, and performs the same processing as in the first or second embodiment already described in conjunction with the flowcharts of FIGS. 7–14 (or the flowchart of FIG. 16). Thereby, the detection of the pseudo ranges PRa, PRb, and PRc and the positioning processing are performed to determine a present position (xp,yp).

In the meantime, the base stations A, B, and C and the control center 34, having the same configurations as those shown in FIGS. 19(a) and 19(b), receive the positioning waves coming from the positioning apparatus 10 individually, and perform the same processing as described previously in conjunction with the flowchart of FIG. 20. Thereby, the detection of pseudo ranges PRa', PRb', and PRc' and the positioning processing are performed to determine a present position (xp,yp)'.

When the positioning apparatus 10 determines the foregoing present position (xp,yp), it transmits information on the present position (xp,yp) and navi-information requesting information for requesting navi-information toward the nearest base station such as the base stations A, B, and C, so that the information is transferred through the nearest base station to the control center 34.

The control center 34 finally determines an appropriate present position (hereinafter, referred to as "optimum present position OPT(xp,yp)") from the two present positions, i.e., from the present position (xp,yp) I obtained through the reception of the positioning waves from the positioning apparatus 10 by the base stations A, B, and C and the present position (xp,yp) determined and sent by the positioning apparatus 10. The control center 34 retrieves the database 35 according to the optimum present position OPT(xp,yp), and acquires the navi-information related to the optimum present position OPT(xp,yp). Then, the information on the optimum present position OPT(xp,yp) and the navi-information related thereto is distributed to the positioning apparatus 10 through the nearest base station.

To determine the optimum present position OPT(xp,yp) from the two present positions (xp,yp) and (xp,yp)', the positioning error HDOP obtained upon the determination of the present position (xp,yp) and the positioning error HDOP' obtained upon the determination of the present position (xp,yp)' are compared with each other. If the positioning error HDOP is smaller than the positioning error HDOP', the present position (xp,yp) is determined to be the optimum present position OPT (xp,yp). On the contrary, if the positioning error HDOP' is smaller than the positioning error HDOP, the present position (xp,yp)' is determined to be the optimum present position OPT(xp,yp).

An intermediate position between the present position (xp,yp) and the present position (xp,yp)' (for example, the position of barycenter) maybe determined to be the optimum present position OPT(xp,yp).

Upon the determination of the foregoing intermediate position between the present position (xp,yp) and the present potion (xp,yp)', the optimum present position OPT(xp,yp) need not be determined to fall simply at the center position between the present position (xp,yp) and the present position (xp,yp)'. Depending on the values of the positioning error HDOP' and the positioning error HDOP, a position closer to the present position (xp,yp) or a position closer to the present position (xp,yp)' may be determined to be the optimum present position OPT(xp,yp) to perform the positioning with yet higher precision.

Next, the steps up to the determination of the optimum present position OPT(xp,yp) of the positioning apparatus 10 will be described in more concrete terms.

Initially, the positioning apparatus 10 receives the incoming waves from the base stations A, B, and C within its periphery, and determines a present position (xp,yp) by itself through the same processing as described previously in the first or second embodiment. Then, it transmits toward the base stations A, B, and C a positioning wave which contains information on the result of the positioning, i.e., the present position (xp,yp), information on the positioning error HDOP, and navi-information requesting information depending on an instruction from users or others. In response to this, the base stations A, B, and C receive the positioning wave individually. The base stations A, B, and C and the control center 34 detect pseudo ranges from the positioning waves and determine a present position (xp,yp) of the positioning apparatus 10 from the pseudo ranges detected. Then, as described above, the control center 34 determines the optimum present position OPT (xp,yp) from the two present positions (xp,yp) and (xp,yp)'. The control center 34 distributes the optimum present position OPT(xp,yp) and the related navi-information to the positioning apparatus 10 through the nearest base station. The positioning apparatus 10 receives the optimum present position OPT(xp,yp) and the related navi-information, and makes on-screen display and the like for the sake of presentation to users or others.

Note that in these steps, the positioning apparatus 10 initially determines the present position (xp,yp), and then the positioning apparatus 10 transmits the positioning wave to the base stations A, B, and C so that the base stations A, B, and C and the control center 34 start the processing of determining the present position (xp,yp)'. In contrast to this, the base stations A, B, and C and the control center 34 may determine the present position (xp,yp)' first. Here, the information on the present position (xp,yp)' determined is transmitted to the positioning apparatus 10 through the base stations A, B, and C so that the positioning apparatus 10 determines its own present position (xp,yp) and further determines the optimum present position OPT(xp,yp) from the two present positions (xp,yp) and (xp,yp)' obtained.

In other words, as a modified example, the positioning may be performed along the steps to be described below.

Initially, according to an instruction from users or others, a positioning wave containing instruction information that positioning be started is transmitted from the positioning apparatus 10 toward the base stations A, B, and C. When the base stations A, B, and C receive this positioning wave, the positioning apparatuses 33 in the respective base stations A, B, and C and the control center 34 shown in FIGS. 19(a) and 19(b) detect pseudo ranges PRa', PRb' and PRc' based on the positioning waves received. Besides, a present position (xp,yp)' of the positioning apparatus 10 is determined by triangulation and successive approximations using these pseudo ranges PRa', PRb', and PRc'. Next, information on the present position (xp,yp)' is transmitted from the base stations A, B, and C toward the positioning apparatus 10 in the form of radio waves. The positioning apparatus 10 receives the incoming waves transmitted from the base stations A, B, and C to acquire the information on the present position (xp,yp)' that is determined by the positioning processing in the control center 34. At the same time, the positioning apparatus 10 detects the pseudo ranges PRa, PRb, and PRc of the incoming waves. The positioning apparatus 10 determines its own present position (xp,yp) by triangulation and successive approximations using those pseudo ranges PRa, PRb, and PRc. Next, the positioning apparatus 10 determines the optimum present position OPT (xp,yp) from the two present positions (xp,yp) and (xp,yp)'. When the optimum present position OPT(xp,yp) is determined thus, the positioning apparatus 10 transmits, according to an instruction from users or others, a radio wave which contains both navi-information requesting information for indicating a request for navi-information and the optimum present position OPT(xp,yp) to the nearest base station such as the base stations A, B, and C. This notifies the control center 34 of the request from the users or others. The control center 34 retrieves the database 35 according to the optimum present position OPT(xp,yp), and distributes the navi-information acquired by the retrieval toward the positioning apparatus 10 through the nearest base station such as the base stations A, B, and C. As a result, the positioning apparatus 10 acquires the navi-information distributed and makes on-screen display and the like along with the optimum present position OPT(xp,yp) for the sake of presentation to the users or others.

Consequently, according to the present embodiment, the present position (xp,yp) of the positioning apparatus 10 is determined based on the radio waves coming from the base stations to the positioning apparatus 10. The present position (xp,yp)' of the positioning apparatus 10 is determined from the radio waves coming from the positioning apparatus 10 to the base stations. From these present positions (xp,yp) and (xp,yp)', a more proper optimum present position OPT(xp,yp) is determined. Therefore, the influence of multipath fading and noise and a variety of adverse effects occurring in the communication environment can be suppressed for high precision positioning.

According to the present embodiment, a single present position (xp,yp) of the positioning apparatus 10 is determined based on the radio waves coming from the base stations to the positioning apparatus 10, and a single present position (xp,yp)' of the positioning apparatus 10 is determined from the radio waves coming from the positioning apparatus 10 to the base stations. The more proper optimum present position OPT (xp,yp) is determined from these two present positions (xp,yp) and (xp,yp)'.

The present invention is not limited thereto, however. The radio waves coming from the base stations to the mobile station may be received a plurality of times to obtain a plurality of present positions (xp,yp), and the radio waves coming from the mobile station to the base stations may be received a plurality of times to obtain a plurality of present positions (xp,yp)' of the mobile station. Then, from the plurality of present positions (xp,yp) and the plurality of present positions (xp,yp)', a yet more proper optimum present position OPT (xp,yp) maybe determined. The positioning precision can be improved by determining the optimum present position OPT(xp,yp) to fall at the position of barycenter of the plurality of present positions (xp,yp) and the plurality of present positions (xp,yp)', or by determining the optimum present position OPT(xp,yp), as stated previously, with consideration given to the positioning errors HDOP which are obtained corresponding to the respective present positions (xp,yp) and (xp,yp)'.

In the present embodiment described above, the optimum present position OPT(xp,yp) is determined by the positioning apparatus 10. However, the control center 34 may determine the optimum present position OPT(xp,yp).

The foregoing embodiment has dealt with the case where the optimum present position OPT (xp,yp) is determined from the present position (xp,yp) determined by the positioning apparatus 10 and the present position (xp,yp)' determined by the base stations and the control center 34. Alternatively, the base stations and the control center 34 may determine the present positions (xp,yp) and (xp,yp)' and determine the optimum present position OPT(xp,yp). The mobile-station side may determine the present positions (xp,yp) and (xp,yp)' and determine the optimum present position OPT(xp,yp).

To be more specific, in the case where the base stations and the control center 34 determine the present positions (xp,yp) and (xp,yp)' to determine the optimum present position OPT(xp,yp), the positioning apparatus 10, on receiving the incoming waves from the base stations A, B, and C, detects the pseudo ranges PRa, PRb, and PRc of those incoming waves and transmits the detected pseudo ranges PRa, PRb, and PRc to the base stations A, B, and C in the form of radio waves. Thereby, the control center 34 determines the present position (xp,yp) of the positioning apparatus 10 from those pseudo ranges PRa, PRb, and PRc.

In the case where the positioning apparatus 10 determines the present positions (xp,yp) and (xp,yp)' to determine the optimum present position OPT(xp,yp), the control center 34 determines the pseudo ranges PRa', PRb', and PRc' of the radio waves coming from the positioning apparatus 10 to the base stations A, B, and C, and transmits those pseudo ranges PRa', PRb', and PRc' to the positioning apparatus 10 through any of the base stations A, B, and C. Thereby, the positioning apparatus 10 determines the present position (xp,yp)' of the positioning apparatus 10 from those pseudo ranges PRa', PRb', and PRc'.

As described above, the present embodiment is to determine the present position of a mobile station by using both the radio waves coming from base stations to the mobile station and the radio waves transmitted from the mobile station to the base stations. This allows a variety of modes such that the positioning apparatus 10 determines the present positions (xp,yp), (xp,yp)' and the optimum present position OPT(xp,yp), that the base-station side determines the present positions (xp,yp), (xp,yp)' and the optimum present position OPT(xp,yp), and that the mobile-station side determines the present positions (xp,yp), (xp,yp)' while the optimum present position OPT(xp,yp) is determined by the base-station side.

Fifth Embodiment

Now, a fifth embodiment will be described with reference to FIG. 22.

The present embodiment is one in which a mobile station, such as a cellular phone and a navigation system, is equipped with a GPS (Global Positioning System) receiving unit so that the GPS can be used to detect the present position of the mobile station.

Figure 22:
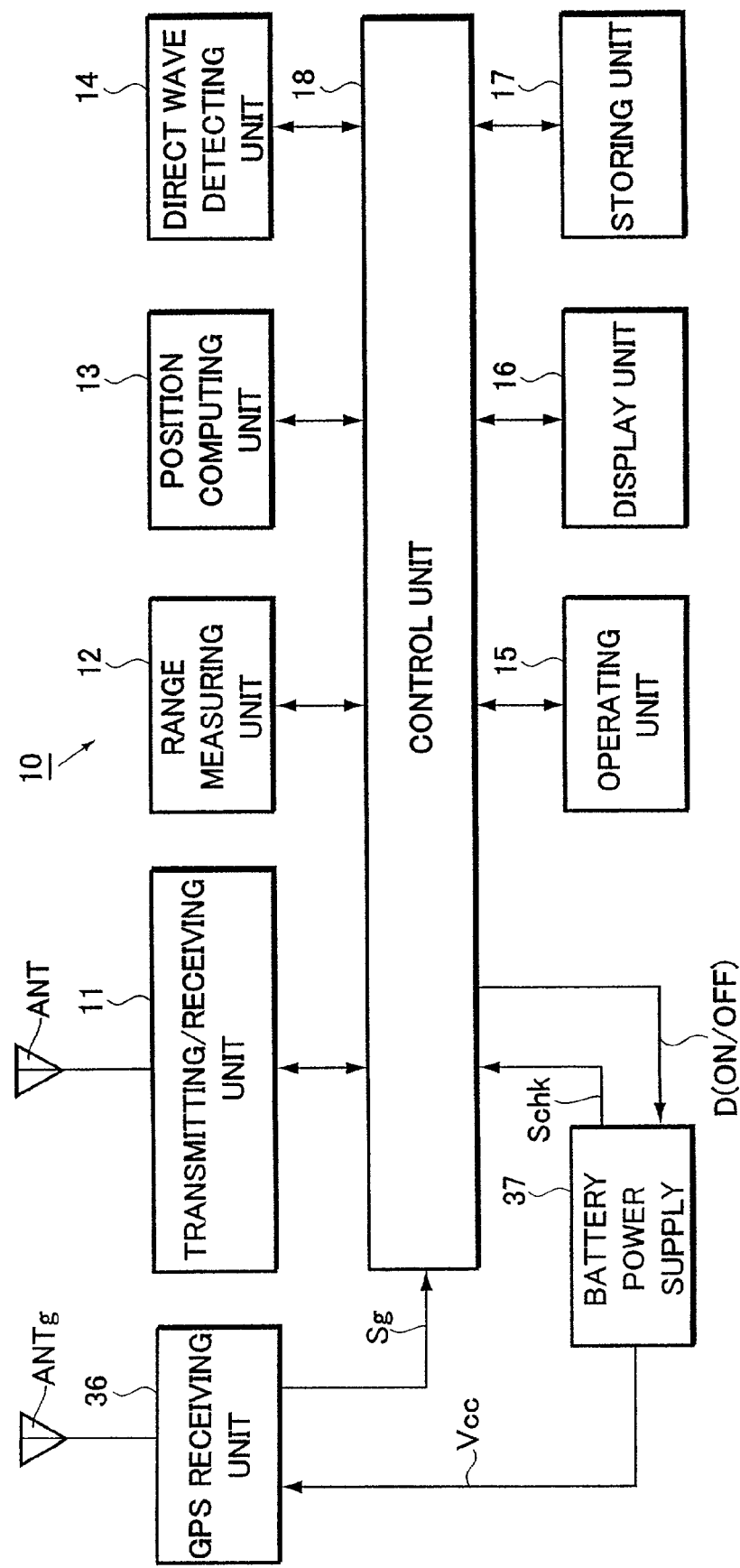
FIG. 22 is a block diagram showing the configuration of a mobile station in a fifth embodiment.

FIG. 22 is a block diagram showing the configuration of a positioning apparatus 10 of the present embodiment. Component parts identical or equivalent to those of FIG. 2 are designated by the same reference numerals.

In the diagram, this positioning apparatus 10 has a receiving antenna ANTg for receiving radio waves sent from GPS satellites, and a GPS receiving unit 36 for generating a GPS signal Sg from the radio waves received at the receiving antenna ANTg. Here, the GPS receiving unit 36 is built in and fixed to the positioning apparatus 10, or unitized into a structure detachably attachable to the casing of the positioning apparatus 10.

The positioning apparatus 10 also includes the components already described in the first embodiment: that is, a transmitting/receiving antenna ANT and a transmitting/receiving unit 11 for conducting communications with base stations; a range measuring unit 12, a position computing unit 13, and a direct wave detecting unit 14 for performing positioning; an operating unit 15; a display unit 16; a control unit 17; and a control unit 18 for exercising central control over the entire mobile station 10.

In the diagram, the battery power supply designated by a numeral 37 contains built-in or detachable rechargeable cells, dry cells, or the like. The battery power supply 37 is arranged in order to operate the positioning apparatus 10 with those cells as a power supply. The output voltage of the foregoing rechargeable cells, dry cells, or the like is stabilized through a constant voltage circuit (not shown) so that the positioning apparatus 10 operates on the voltage-stabilized power. The battery power supply 37 also outputs a predetermined supply voltage Vcc to operate the GPS receiving unit 36.

The control unit 18 checks the output Schk of the rechargeable cells, dry cells, or the like in the battery power supply 37 to detect the remaining amount of charge consecutively, and makes the display unit 16 display the remaining amount of charge detected. When the control unit 18 determines from the result of the foregoing detection that the battery power supply 37 falls short of the remaining amount of charge, it supplies a control signal D(ON/OFF) to the battery power supply 37. This initiates such processing as suspends supplying the supply voltage Vcc to the GPS receiving unit 36 for the sake of a reduction in power consumption. This processing by the control unit 18 will be detailed later.

The range measuring unit 12, the position computing unit 13, and the direct wave detecting unit 14, as described previously in the first embodiment, determine the present position (xp,yp) of the positioning apparatus 10 based on the radio waves coming from the base stations A, B, and C. Besides, they also have the function of determining the present position (xp,yp) of the positioning apparatus 10 based on the GPS signal Sg supplied from the GPS receiving unit 36 through the control unit 18.

More specifically, radio waves coming from four GPS satellites in the GPS are received at the GPS antenna ANTg, whereby the GPS receiving unit 36 supplies the GPS signal Sg to the range measuring unit 12, the position computing unit 13, and the direct wave detecting unit 14. The range measuring unit 12 first detects the pseudo ranges of the respective incoming waves from the four GPS satellites based on correlation values of the GPS signal Sg. Then, the position computing unit 13 and the direct wave detecting unit 14 determine the present position (xp,yp) of the positioning apparatus 10 by performing positioning processing through triangulation and successive approximations, using the known positions of the four GPS satellites and the pseudo ranges detected by the range measuring unit 12.

Now, the operation of the positioning apparatus 10 having such a configuration will be described with reference to FIG. 23. Incidentally, the description will deal with typical cases, namely, the operation of determining the present position (xp,yp) of the positioning apparatus 10 by using the radio waves coming from the base stations A, B, and C lying within the periphery of the positioning apparatus 10 as already described in the first and second embodiments, and the operation of determining the present position (xp,yp) of the positioning apparatus 10 by using the GPS.

Figure 23:
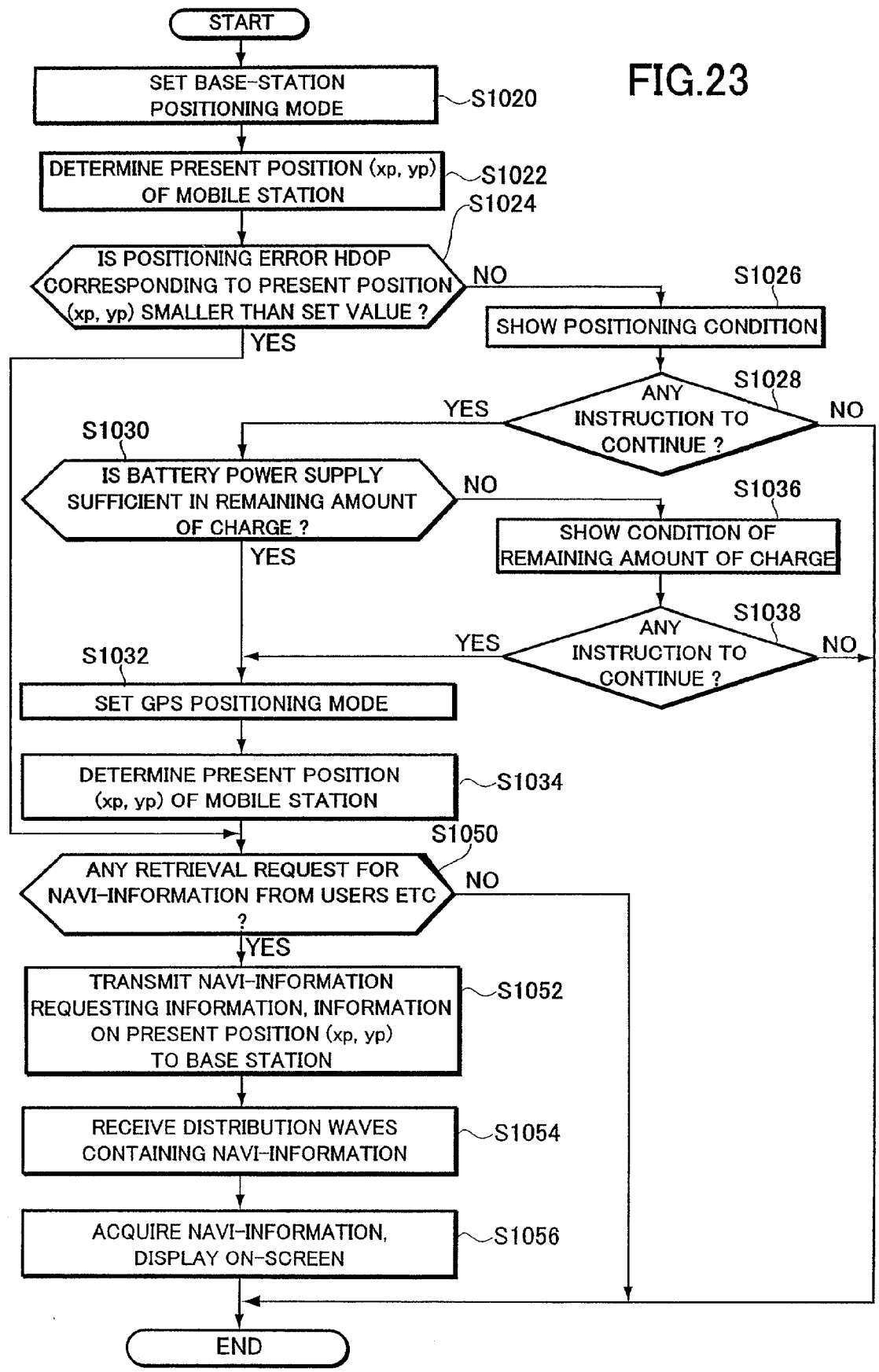
FIG. 23 is a flowchart for explaining the operation of the fifth embodiment.

In FIG. 23, users or others operate the operating unit 15 arranged on the positioning apparatus 10 to instruct to start positioning. Then, the operation for positioning is started under the control of the control unit 18. Here, immediately after the instruction to start positioning, the GPS receiving unit 36 is not supplied with the supply voltage Vcc for activation. Instead, so-called battery check to be described later is performed before whether or not to activate the GPS receiving unit 36 is decided.

Initially, at step S1020, the control unit 18 sets a positioning mode of using incoming waves from base stations for positioning (hereinafter, referred to as "base-station positioning mode") At step S1022, the present position (xp,yp) of the positioning apparatus 10 is determined in the base-station positioning mode.

That is, when the base-station positioning mode is set, the transmitting/receiving unit 11 for conducting communications with base stations is activated at step S1022, while the GPS receiving unit 36 is not supplied with the supply voltage Vcc.

Then, as described previously in the first and second embodiments, the transmitting/receiving unit 11 receives the incoming waves from the base stations A, B, and C which lie around the positioning apparatus 10. The range measuring unit 12, the position computing unit 13, and the direct wave detecting unit 14 determine the present position (xp,yp) of the positioning apparatus 10 from the pseudo ranges of the incoming waves and the positions (xa,ya), (xb,yb), and (xc,yc) of the respective base stations A, B, and C.

Next, at step S1024, it is determined if the positioning error HDOP obtained upon the determination of the present position (xp,yp) of the positioning apparatus 10 is smaller than a predetermined set value. If the positioning error HDOP is smaller than the set value (if "YES"), the present position (xp,yp) is decided to have high positioning precision, and the positioning operation in the base-station positioning mode is ended. Then, go to step S1050.

Moving from step S1024 to step S1050, it is checked if a retrieval request for navi-information is instructed by users or others. If so instructed, go to step S1052 so that navi-information requesting information and the present position (xp,yp) determined in the base-station positioning mode are transmitted to the nearest base station in the form of radio waves.

Next, at step S1054, radio waves containing the navi-information are distributed from the base station, and are received. At step S1056, the result of the positioning, or the present position (xp,yp), and the navi-information are displayed on the display unit 16 as illustrated in FIGS. 15(*a*) and 15(*b*), ending a series of positioning operations.

At step S1024 above, if the positioning error HDOP corresponding to the present position (xp,yp) determined in the base-station positioning mode is greater than the predetermined set value (if "NO"), go to step S1026. Here, the display unit 16 displays that favorable positioning precision has not been obtained, thereby presenting the positioning condition to the users or others.

Next, at step S1028, it is checked if the users or others instruct to continue the positioning operations in response to the presentation of the positioning information mentioned above. If an instruction to continue the positioning operations is given, go to step S1030. If an instruction not to continue the positioning operations is given, end a series of positioning operations.

Next, at step S1030, the battery power supply 37 undergoes battery check for the remaining amount of charge, to determine if the remaining amount of charge is sufficient as compared to a predetermined set value. If the remaining amount of charge is sufficient (if "YES"), enter step S1032 to set a positioning mode of using the GPS for positioning (hereinafter, referred to as "GPS positioning mode"). At step S1034, the present position (xp,yp) of the positioning apparatus 10 is determined in the GPS positioning mode.

On the other hand, at step S1030, if the battery power supply 37 is short of the remaining amount of charge (if "NO"), then enter step S1036 to present the condition of the remaining amount of charge on the display unit 16. For example, the remaining amount of charge detected is displayed along with displays such as prompting a choice whether or not to continue the positioning operations.

Next, at step S1038, if an instruction not to continue the positioning operations is given in response to the presentation of the condition of the remaining amount of charge, end a series of positioning operations. On the other hand, if an instruction to continue the positioning operations is given, enter step S1032 to set the GPS positioning mode. Then, at step S1034, the present position (xp,yp) of the positioning apparatus 10 is determined in the GPS positioning mode.

To be more specific, when the GPS positioning mode is set at step S1032, the control unit 18 supplies the battery power supply 37 with the control signal D(ON/OFF) and thereby instructs that the supply voltage Vcc of the battery power supply 37 be supplied to the GPS receiving unit 36. Then, at step S1034, the incoming waves from the GPS satellites are received, and the present position (xp,yp) of the positioning apparatus 10 is determined based on the GPS signal Sg output from the GPS receiving unit 36. After the foregoing present position (xp,yp) of the positioning apparatus 10 has been determined in the GPS mode, the supply of the supply voltage Vcc to the GPS receiving unit 36 is suspended immediately for the sake of a reduction in power consumption. This terminates the GPS positioning mode, entering step S1050.

Moving from step S1034 to step S1050, it is checked if a retrieval request for navi-information is instructed by users or others. If so instructed, go to step S1052 so that navi-information requesting information and the present position (xp,yp) determined in the GPS positioning mode are transmitted to the nearest base station in the form of radio waves.

Next, at step S1054, radio waves containing the navi-information are distributed from the base station, and are received. At step S1056, the result of the positioning, or the present position (xp,yp), and the navi-information are displayed on the display unit 16 as illustrated in FIGS. 15(*a*) and 15(*b*), ending a series of positioning operations.

Consequently, according to the present embodiment, there is provided the base-station positioning mode of determining the present position of the positioning apparatus 10 based on the incoming waves from base stations, in other words, the base-station positioning mode capable of positioning with smaller power consumption. Therefore, it is possible to reduce the power consumption of the battery power supply 37 significantly. This decreases a chance of requiring users or others to make such troublesome operations as frequent charging of rechargeable cells and frequent replacement with new dry cells, and thus contributes to improved convenience.

When the positioning in the base-station positioning mode results in an unfavorable positioning precision, the positioning is switched to the GPS positioning mode which is capable of high precision positioning. When results in a favorable positioning precision, the positioning is carried on in the base-station positioning mode which is low in power consumption. Therefore, the number of times of the positioning in the GPS positioning mode can be decreased for the sake of a reduction in so-called battery consumption. In addition, favorable positioning precisions can be maintained to provide the proper present position to users or others.

Incidentally, the foregoing description has dealt with the case where a higher priority is given to the positioning in the base-station positioning mode. Alternatively, the positioning in the GPS positioning mode may be given a higher priority when the battery power supply 37 has a sufficient amount of charge remaining, or when using the battery power supply 37 loaded with rechargeable cells or dry cells of large capacities. That is, as a modified example of the present embodiment, the positioning operations shown in FIG. 24 may be performed.

Figure 24:
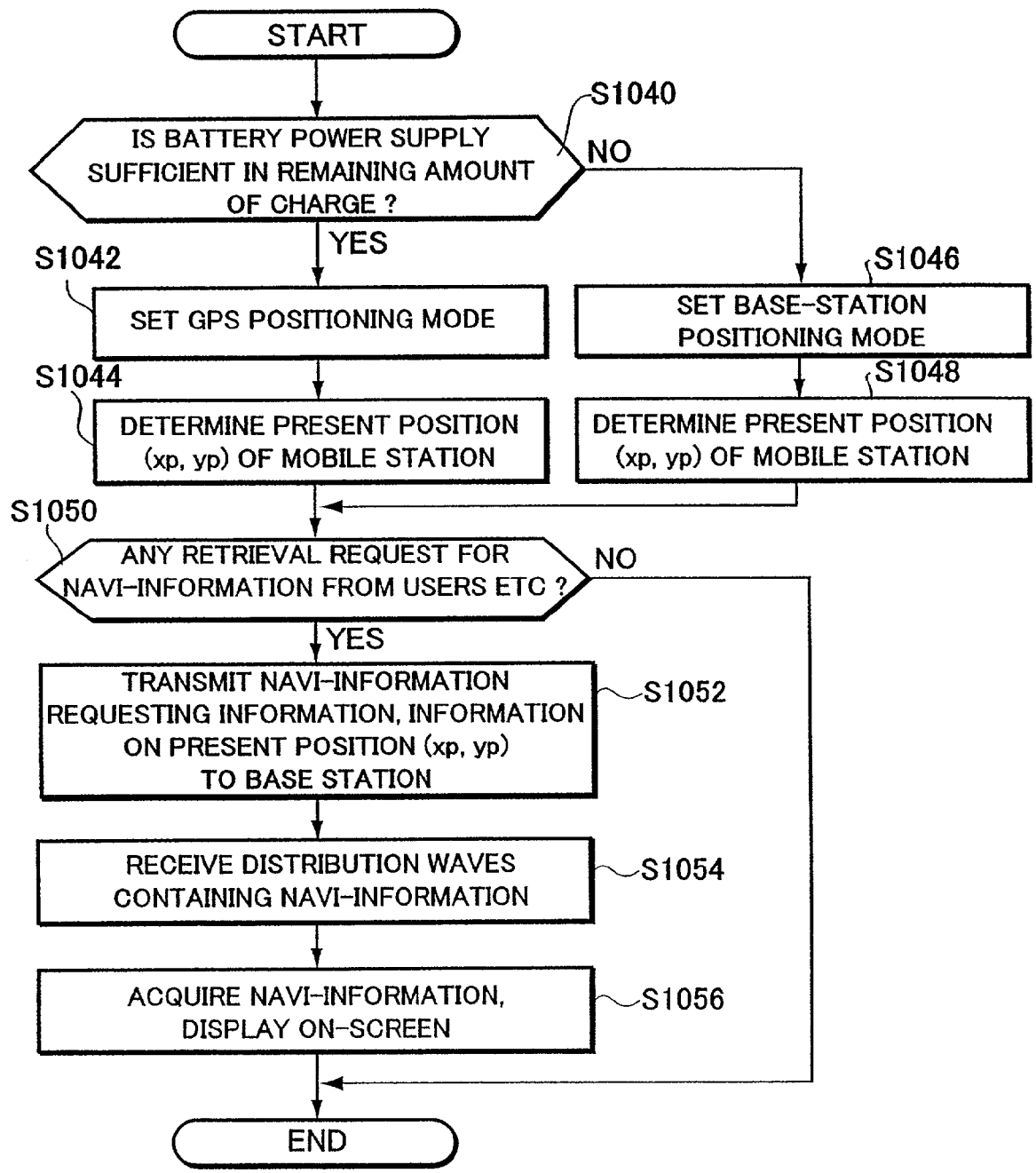
FIG. 24 is a flowchart for explaining the operation of a modified example of the fifth embodiment.
Figure 25:
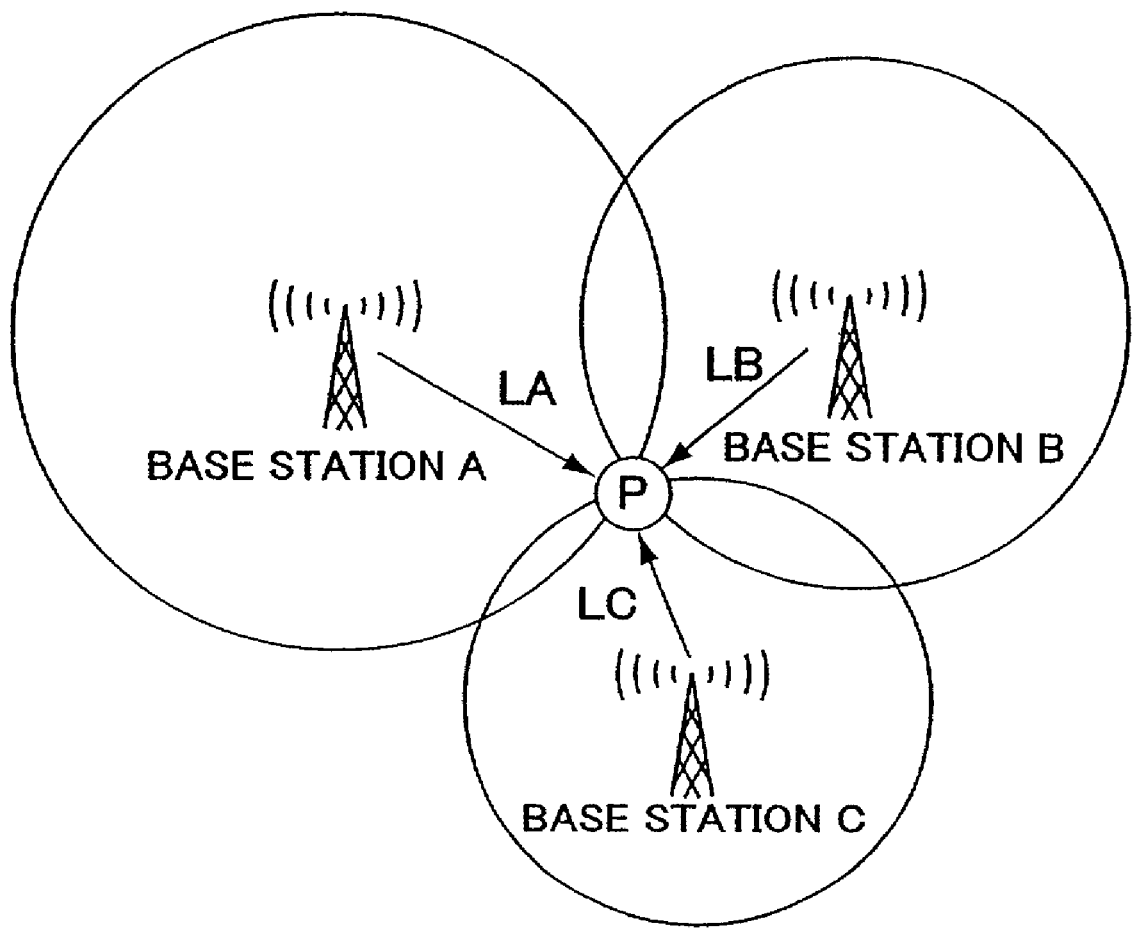
FIG. 25 is a diagram showing the configuration of a conventional mobile communications system.
Figure 26:
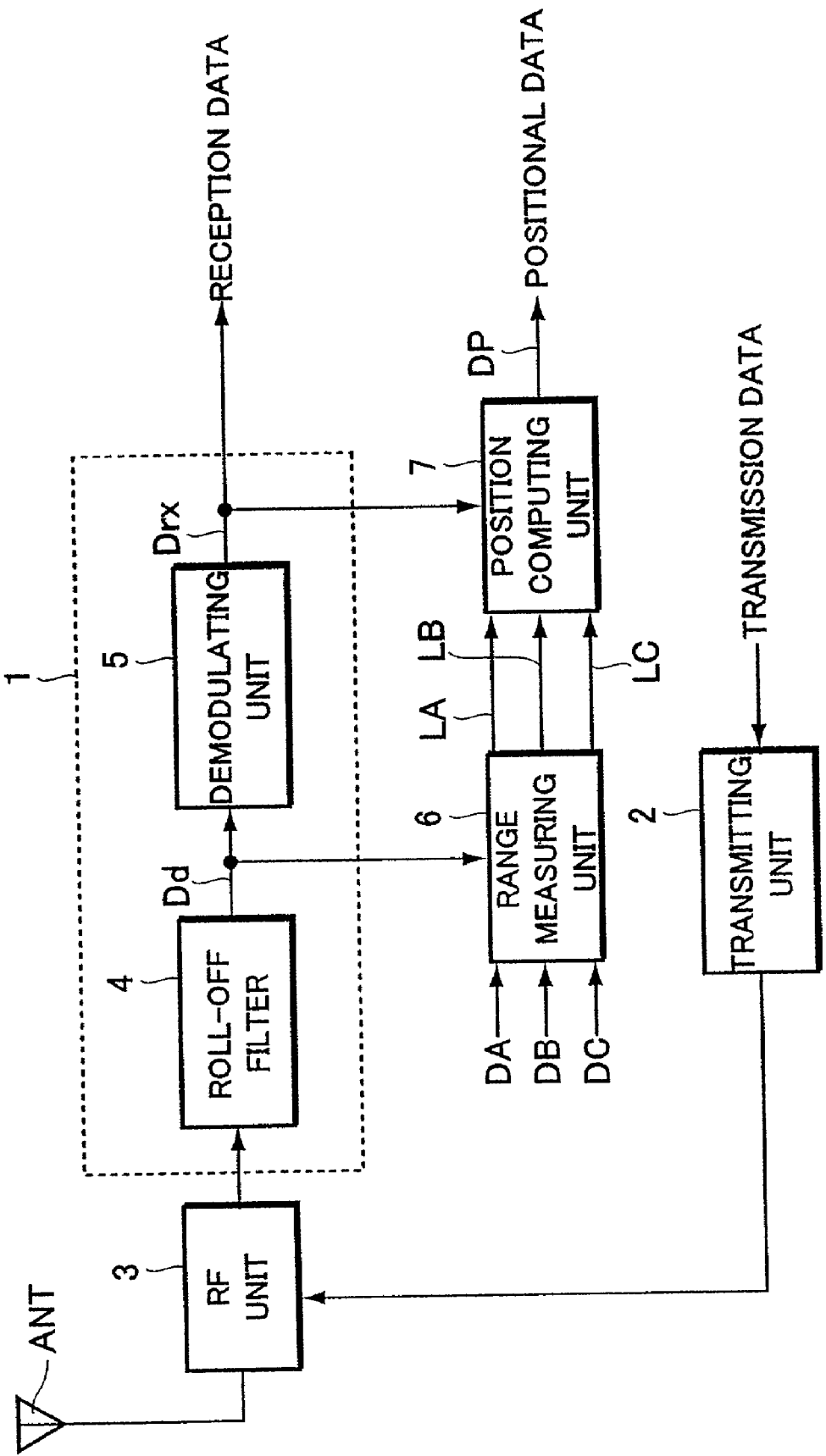
FIG. 26 is a block diagram showing the configuration of a conventional cellular phone.
Figure 27:
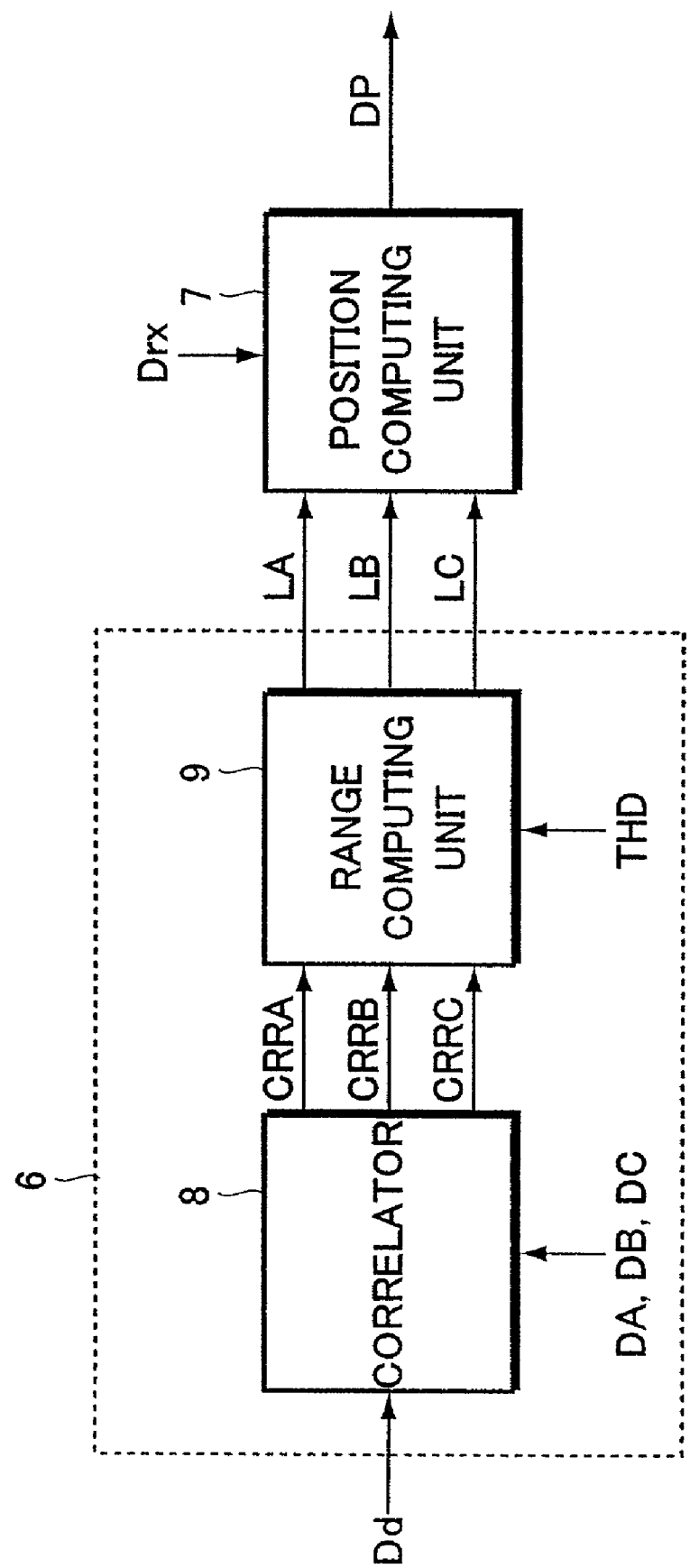
FIG. 27 is a block diagram showing the configuration of a range measuring unit and a position computing unit arranged in the conventional cellular phone.
Figure 28:
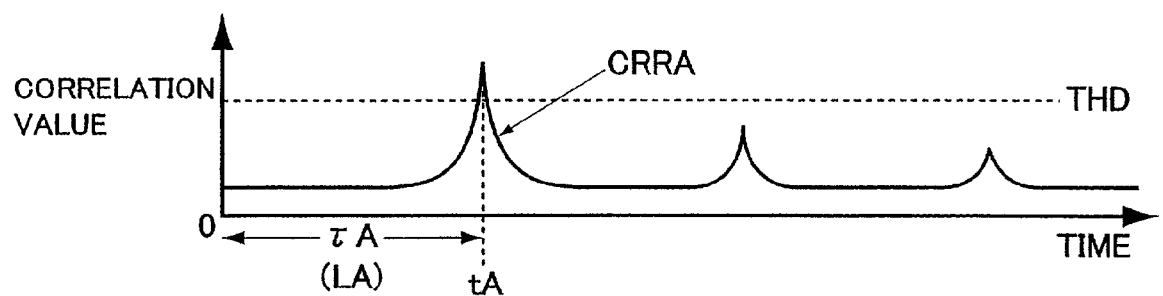
FIGS. 28(a)–28(c) are diagrams for explaining a conventional technique for detecting propagation ranges.
Figure 28:
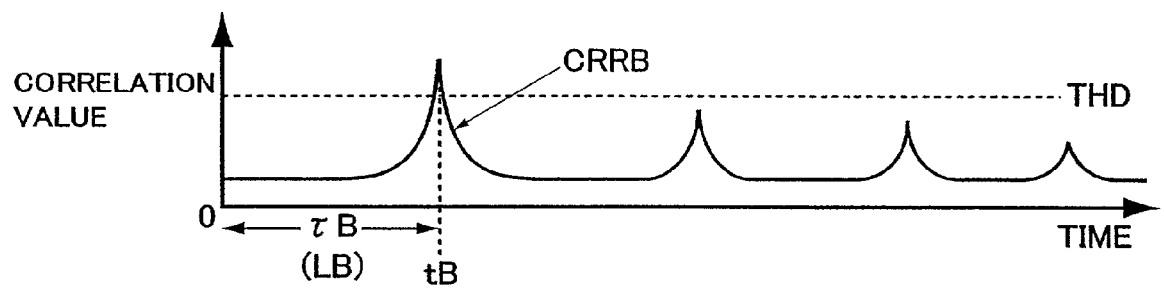
Figure 28:
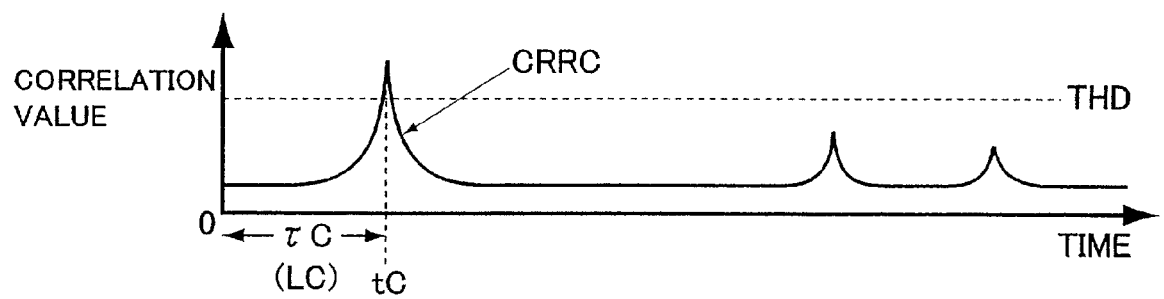
Figure 29:
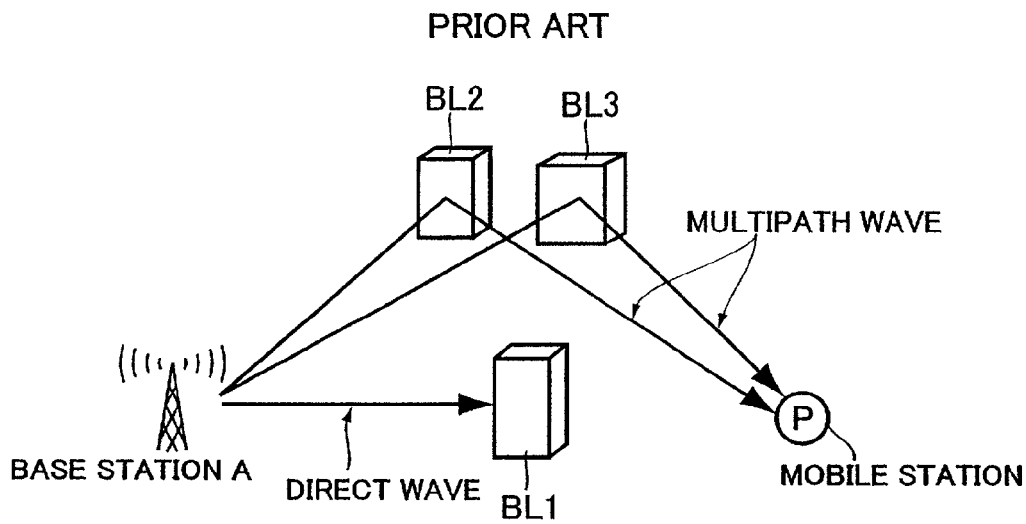
Figure 30:
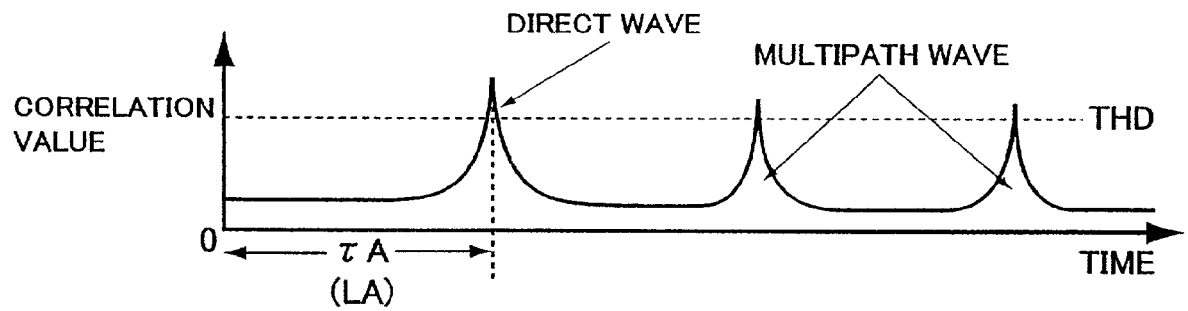
FIGS. 30(a) and 30(b) are diagrams for explaining problems in the conventional technique for detecting propagation ranges.
Figure 30:
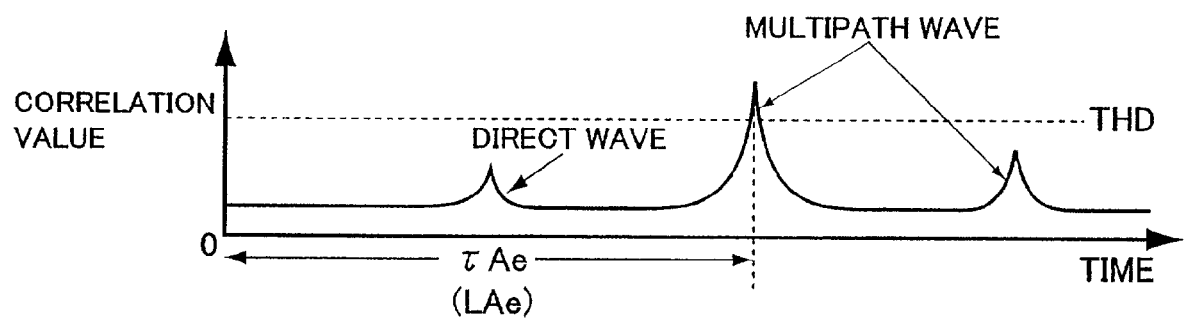
Figure 31:
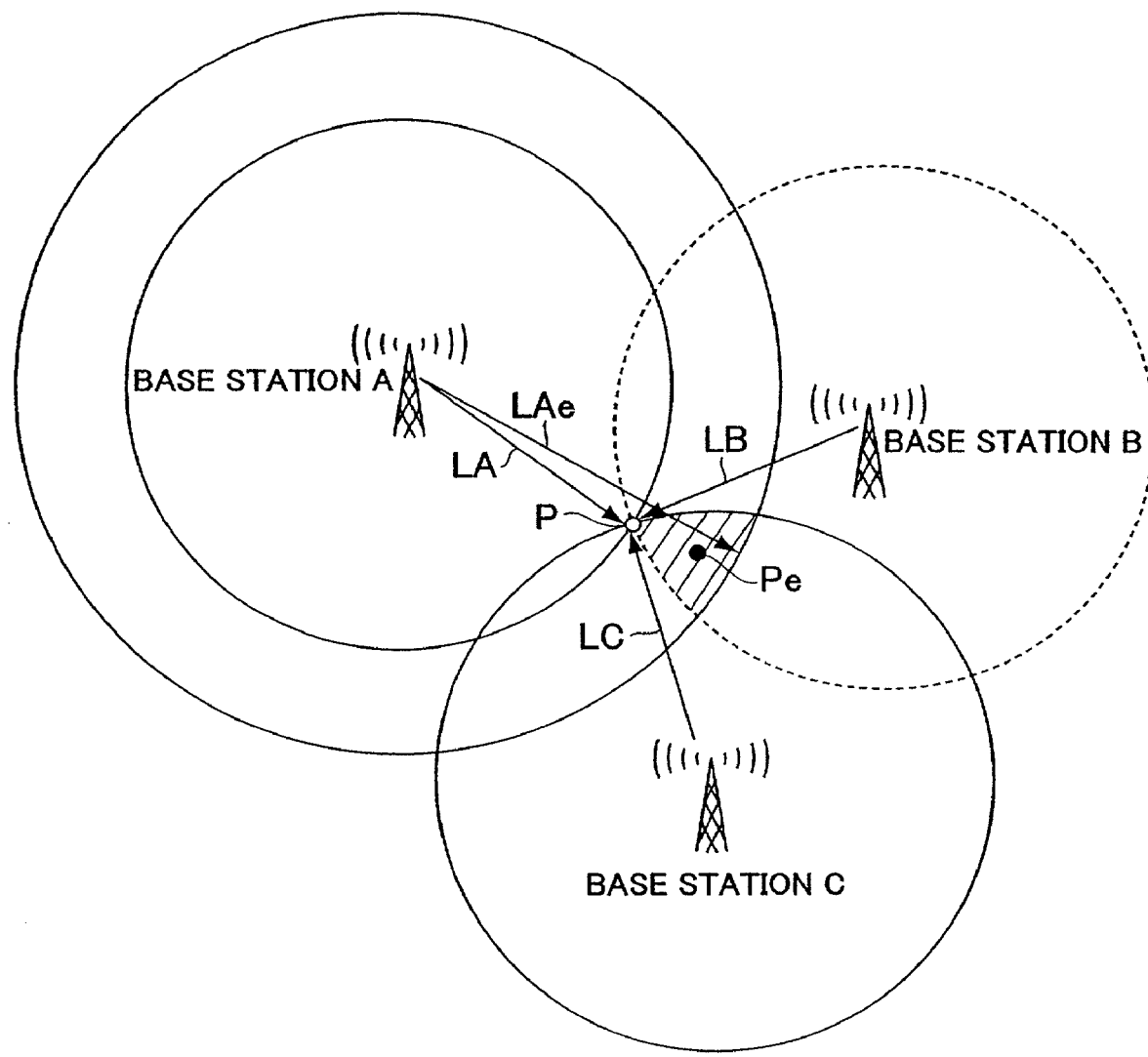
FIG. 31 is a diagram for explaining a problem in the conventional positioning method.

In FIG. 24, users or others operate the operating unit 15 arranged on the positioning apparatus 10 to instruct to start positioning. The operation for positioning is started under the control of the control unit 18.

Initially, at step S1040, the control unit 18 checks the battery power supply 37 for the remaining amount of charge, and determines if the remaining amount of charge is sufficient as compared to a predetermined set value. If the remaining amount of charge is sufficient (if "YES"), go to step S1042 to set the GPS positioning mode. Then, at step S1044, the present position (xp,yp) of the positioning apparatus 10 is determined in the GPS positioning mode.

At step S1040, if the control unit 18 determines that the battery power supply 37 is short of the remaining amount of charge (if "NO"), go to step S1046 to set the base-station positioning mode. Then, at step S1048, the present position (xp,yp) of the positioning apparatus 10 is determined in the base-station positioning mode.

After the present position (xp,yp) of the positioning apparatus 10 is thus determined in the GPS positioning mode or in the base-station positioning mode, the processing of steps S1050–S1056 is performed. Consequently, the result of the positioning, or the present position (xp,yp), the navi-information, and the like are displayed on the display unit 16 as illustrated in FIGS. 15(*a*) and 15(*b*), ending a series of positioning operations.

According to this modified example, there is provided the base-station positioning mode which is capable of positioning with lower power consumption. Therefore, it is possible to reduce the power consumption of the battery power supply 37 significantly. In addition, when the battery power supply 37 has a sufficient amount of charge remaining, the positioning is performed in the GPS positioning mode which is capable of high precision positioning. Therefore, it is possible to provide the present position to users or others with yet higher precision.

Incidentally, the foregoing embodiment and its modified example have been described on the assumption that the positioning in the base-station positioning mode is performed by the positioning method which is described previously in the first and second embodiments. That is, the description has dealt with the cases where the positioning apparatus 10 receives the radio waves coming from the base stations and determines the present position (xp,yp) by itself.

In the present embodiment and its modified example, however, the positioning in the base-station positioning mode may be performed by the positioning methods of the third and fourth embodiments.

To be more specific, take a case where the positioning method already described in the third embodiment is applied to the positioning in the base-station positioning mode. At step S1022 in FIG. 23 or step S1048 in FIG. 24, the positioning apparatus 10 transmits a positioning wave to the base-station side. The present position (xp,yp) determined on the side of the base stations and the control center can be sent back to the positioning apparatus 10 to realize the positioning in the base-station positioning mode.

If the positioning method already described in the fourth embodiment is applied to the positioning in the base-station positioning mode, then at step S1022 in FIG. 23 or step S1048 in FIG. 24, the positioning apparatus 10 receives the radio waves coming from the base stations and determines the present position(s) (xp,yp) by itself. The positioning apparatus 10 also transmits a positioning wave to the base-station side to have the present position(s) (xp,yp)' determined on the side of the base stations and the control center. From the plurality of present positions (xp,yp) and (xp,yp)', an optimum present position OPT(xp,yp) can be obtained. Thus, the application of the positioning method described previously in the fourth embodiment, as combined with the GPS positioning mode, makes it possible to determine the present position with extremely high precision and offer the same to users or others.

The positioning apparatus 10 shown in FIG. 22 has the range measuring unit 12, the position computing unit 13, and the direct wave detecting unit 14 which can perform both the positioning described in the first through fourth embodiments and the GPS-based positioning. In the case of performing the positioning described in the third embodiment and the GPS-based positioning, however, these range measuring unit 12, position computing unit 13, and direct wave detecting unit 14 may be replaced with ones having the function of performing the GPS-based positioning alone.

That is, in the positioning method described in the third embodiment, the radio waves output from the positioning apparatus 10 are received by the base-station side to determine the present position (xp,yp) of the positioning system. Therefore, the range measuring unit 12, the position computing unit 13, and the direct wave detecting unit 14 can be replaced with a range measuring unit, a position computing unit, and a direct wave detecting unit which are tailored to the function of performing the GPS-based positioning.

When the range measuring unit 12, the position computing unit 13, and the direct wave detecting unit 14 are replaced with the range measuring unit, the position computing unit, and the direct wave detecting unit tailored to the function of performing the GPS-based positioning, the positioning apparatus 10 can be simplified in configuration and reduced in weight.

Moreover, the range measuring unit, the position computing unit, and the direct wave detecting unit tailored to the function of performing the GPS-based positioning may be unitized with the GPS receiving unit 36 so that the resultant unit is detachably connected to the positioning apparatus 10 or the casing of the mobile station. Such unitization allows existing cellular phones navigation systems to be used to realize mobile stations which have both the GPS positioning mode and the base-station positioning mode stated above, for the sake of improved convenience of users and others. The base-station positioning mode can be used more heavily to reduce the power consumption of the battery power supply 37.

While the foregoing first through fifth embodiments have dealt with the cases where the mobile station is a cellular phone or a vehicle-mounted navigation system, the present invention is not limited thereto. Electronic equipment such as a personal digital assistant (PDA) and a personal computer is also applicable as the mobile station.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A positioning apparatus for determining a present position of a mobile station by using radio waves coming from a plurality of base stations arranged within a communication area, the positioning apparatus being arranged in said mobile station, the positioning apparatus comprising:

receiving means for receiving the radio waves coming from said plurality of base stations to generate reception signals corresponding to the respective radio waves;

direct wave candidate extracting means for extracting a plurality of direct wave candidates of the radio waves coming from said respective base stations, out of said reception signals generated by said receiving means;

deriving means for deriving reception signals equivalent to direct waves from said plurality of direct wave candidates extracted by said direct wave candidate extracting means; and positioning operation means for determining the present position of said mobile station from said reception signals derived by said deriving means;

wherein said direct wave candidate extracting means extracts said direct wave candidates out of reception signals generated from radio waves coming to said receiving means within a predetermined time since the point of start of positioning.

2. A positioning apparatus for determining a present position of a mobile station by using radio waves coming from said mobile station to a plurality of base stations arranged within a communication area, the positioning apparatus being arranged on the base-station side, the positioning apparatus comprising:

receiving means for receiving the radio waves coming from said mobile station to generate reception signals corresponding to the respective radio waves, said receiving means being arranged in each of said plurality of base stations;

direct wave candidate extracting means for extracting a plurality of direct wave candidates of the radio waves coming to said respective base stations, out of said reception signals generated by said receiving means;

deriving means for deriving reception signals equivalent to direct waves from said plurality of direct wave candidates extracted by said direct wave candidate extracting means; and positioning operation means for determining the present position of said mobile station from said reception signals derived by said deriving means, wherein said direct wave candidate extracting means extracts said direct wave candidates out of reception signals generated from radio waves coming to said receiving means within a predetermined time since the point of start of positioning.

3. The positioning apparatus according to claim 1 or 2, wherein said direct wave candidate extracting means extracts as said direct wave candidates a plurality of signals of greater reception intensities out of said reception signals generated from the radio waves coming to said receiving means within said predetermined time.

4. The positioning apparatus according to claim 1 or 2, wherein said predetermined time is set in accordance with sizes of communication areas of said respective base stations.

5. The positioning apparatus according to claim 1 or 2, wherein reception signals reaching predetermined reception intensities occur within said predetermined time.

6. The positioning apparatus according to claim 1, wherein:

said direct wave candidate extracting means extracts a plurality of direct wave candidates with respect to each of the radio waves coming from three base stations to said mobile station;

said deriving means performs a first direct wave deriving process of performing positioning operations on combinations of direct wave candidates to determine approximate positions of said mobile station and positioning errors in said approximate positions for said respective combinations and deriving said direct wave candidate corresponding to a positioning error of minimum value among said positioning errors determined for said respective combinations as said reception signal corresponding to the direct wave coming from a third base station out of said three base stations to said mobile station, said combinations being obtained by fixing two direct wave candidates selected in ones from among direct wave candidates corresponding to said first and second base stations while using direct wave candidates corresponding to said third base station as variables, a second direct wave deriving process of performing positioning operations on combinations of direct wave candidates to determine approximate positions of said mobile station for a second time and positioning errors in said approximate positions for a second time and deriving said direct wave candidate corresponding to a positioning error of minimum value among said positioning errors determined for the second time as said reception signal corresponding to the direct wave coming from said second base station to said mobile station, said combinations being obtained by fixing said direct wave candidate derived as said reception signal resulting from the direct wave coming from said third base station in said first direct wave deriving process and a direct wave candidate selected from among direct wave candidates corresponding to said first base station while using direct wave candidates corresponding to said second base station as variables, and a third direct wave deriving process of performing positioning operations on combinations of direct wave candidates to determine approximate positions of said mobile station for a third time and positioning errors in said approximate positions for a third time and deriving said direct wave candidate corresponding to a positioning error of minimum value among said positioning errors determined for the third time as said reception signal corresponding to the direct wave coming from said first base station to said mobile station, said combinations being obtained by fixing said direct wave candidate derived as said reception signal resulting from the direct wave coming from said third base station in said first direct wave deriving process and said direct wave candidate derived as said reception signal resulting from the direct wave coming from said second base station in said second direct wave deriving process while using direct wave candidates corresponding to said first base station as variables; and said positioning operation means determines the present position of said mobile station from three reception signals corresponding to the three direct waves from said first, second, and third base stations, said reception signals being obtained in said first, second, and third direct wave deriving processes.

7. The positioning apparatus according to claim 1, wherein:

said direct wave candidate extracting means extracts a plurality of direct wave candidates with respect to each of the radio waves coming from a plurality of base stations to said mobile station;

said deriving means obtains a plurality of combinations of direct wave candidates by combining direct wave candidates selected in ones from among those of said respective base stations extracted by said direct wave candidate extracting means, determines approximate positions of said mobile station and positioning errors in said approximate positions from said plurality of combinations, respectively, and derives said direct wave candidates contained in a combination corresponding to said positioning error of minimum value as said reception signals corresponding to the direct waves respectively coming from said plurality of base stations to said mobile station; and said positioning operation means determines the present position of said mobile station from said reception signals corresponding to the direct waves respectively coming from said plurality of base stations, derived by said deriving means.

8. The positioning apparatus according to claim 2, wherein:

said direct wave candidate extracting means extracts a plurality of direct wave candidates with respect to each of the radio waves coming from said mobile station to three base stations;

said deriving means performs a first direct wave deriving process of performing positioning operations on combinations of direct wave candidates to determine approximate positions of said mobile station and positioning errors in said approximate positions for said respective combinations and deriving said direct wave candidate corresponding to a positioning error of minimum value among said positioning errors determined for said respective combinations as said reception signal corresponding to the direct wave coming from said mobile station to a third base station out of said three base stations, said combinations being obtained by fixing two direct wave candidates selected in ones from among direct wave candidates corresponding to said first and second base stations while using direct wave candidates corresponding to said third base station as variables, a second direct wave deriving process of performing positioning operations on combinations of direct wave candidates to determine approximate positions of said mobile station for a second time and positioning errors in said approximate positions for a second time and deriving said direct wave candidate corresponding to a positioning error of minimum value among said positioning errors determined for the second time as said reception signal corresponding to the direct wave coming from said mobile station to said second base station, said combinations being obtained by fixing said direct wave candidate derived as said reception signal resulting from the direct wave coming to said third base station in said first direct wave deriving process and a direct wave candidate selected from among direct wave candidates corresponding to said first base station while using direct wave candidates corresponding to said second base station as variables, and a third direct wave deriving process of performing positioning operations on combinations of direct wave candidates to determine approximate positions of said mobile station for a third time and positioning errors in said approximate positions for a third time and deriving said direct wave candidate corresponding to a positioning error of minimum value among said positioning errors determined for the third time as said reception signal corresponding to the direct wave coming from said mobile station to said first base station, said combinations being obtained by fixing said direct wave candidate derived as said reception signal resulting from the direct wave coming to said third base station in said first direct wave deriving process and said direct wave candidate derived as said reception signal resulting from the direct wave coming to said second base station in said second direct wave deriving process while using direct wave candidates corresponding to said first base station as variables; and said positioning operation means determines the present position of said mobile station from reception signals corresponding to the direct waves from said mobile station to said first, second, and third base stations, said reception signals being obtained in said first, second, and third direct wave deriving processes.

9. The positioning apparatus according to claim 2, wherein:

said direct wave candidate extracting means extracts a plurality of direct wave candidates with respect to each of the radio waves coming from said mobile station to a plurality of base stations;

said deriving means obtains a plurality of combinations of direct wave candidates by combining direct wave candidates selected in ones from among those of said respective base stations extracted by said direct wave candidate extracting means, determines approximate positions of said mobile station and positioning errors in said approximate positions from said plurality of combinations, respectively, and derives said direct wave candidates contained in a combination corresponding to said positioning error of minimum value as said reception signals corresponding to the direct waves respectively coming from said mobile station to said plurality of base stations; and said positioning operation means determines the present position of said mobile station from said reception signals corresponding to the direct waves respectively coming to said plurality of base stations, derived by said deriving means.

10. A positioning apparatus comprising first positioning means including said receiving means, said direct wave candidate extracting means, said deriving means, and said positioning operation means set forth in claim 1, further comprising:

second positioning means for determining the present position of said mobile station by using the GPS; and control means for switching to the positioning by said second positioning means in cases where the present position of said mobile station determined by said first positioning means exceeds a predetermined positioning error.

11. A positioning apparatus comprising first positioning means including said receiving means, said direct wave candidate extracting means, said deriving means, and said positioning operation means set forth in claim 1, further comprising:

second positioning means for determining the present position of said mobile station by using the GPS;

power supply means for supplying driving power to said first and second positioning means; and power supply control means for detecting a remaining amount of charge of said power supply means and switching the supply of said driving power from said power supply means between said first positioning means and said second positioning means, depending on the remaining amount of charge detected.

12. A positioning method for determining a present position of a mobile station by using radio waves coming from a plurality of base stations arranged within a communication area to said mobile station, the positioning method comprising:

a first step of receiving the radio waves coming from said plurality of base stations to generate reception signals corresponding to the respective radio waves;

a second step of extracting a plurality of direct wave candidates of the radio waves coming from said respective base stations, out of said reception signals generated;

a third step of deriving reception signals equivalent to direct waves from said plurality of direct wave candidates extracted; and a fourth step of determining the present position of said mobile station from said reception signals derived, wherein said direct wave candidates are extracted from reception signals generated from radio waves received within a predetermined time since the point of start of positioning in the first step.

13. A positioning method for determining a present position of a mobile station by using radio waves coming from said mobile station to a plurality of base stations arranged within a communication area, the positioning method comprising:

a first step of receiving the radio waves coming from said mobile station to said plurality of base stations by said plurality of base stations and generating reception signals corresponding to the respective radio waves;

a second step of extracting a plurality of direct wave candidates of the radio waves coming to said respective base stations, out of said reception signals generated;

a third step of deriving reception signals equivalent to direct waves from said plurality of direct wave candidates extracted; and a fourth step of determining the present position of said mobile station from said reception signals derived, wherein said direct wave candidates are extracted from reception signals generated from radio waves received within a predetermined time since the point of start of positioning in the first step.

14. The positioning method according to claim 12, wherein a plurality of signals of greater reception intensities out of said reception signals generated from radio waves received within predetermined time in the first step are extracted as said direct wave candidates.

15. The positioning method according to claim 12, wherein said predetermined time is set in accordance with the sizes of communication areas of said respective base stations.

16. The positioning method according to claim 12, wherein reception signals reaching predetermined reception intensities occur within said predetermined time.

17. The positioning method according to claim 12, wherein:

in the second step, a plurality of direct wave candidates are extracted with respect to each of the radio waves coming from three base stations to said mobile station;

the third step includes a first direct wave deriving process of performing positioning operations on combinations of direct wave candidates to determine approximate positions of said mobile station and positioning errors in said approximate positions for said respective combinations and deriving said direct wave candidate corresponding to a positioning error of minimum value among said positioning errors determined for said respective combinations as said reception signal corresponding to the direct wave coming from a third base station out of said three base stations to said mobile station, said combinations being obtained by fixing two direct wave candidates selected in ones from among direct wave candidates corresponding to said first and second base stations while using direct wave candidates corresponding to said third base station as variables, a second direct wave deriving process of performing positioning operations on combinations of direct wave candidates to determine approximate positions of said mobile station for a second time and positioning errors in said approximate positions for a second time and deriving said direct wave candidate corresponding to a positioning error of minimum value among said positioning errors determined for the second time as said reception signal corresponding to the direct wave coming from said second base station to said mobile station, said combinations being obtained by fixing said direct wave candidate derived as said reception signal resulting from the direct wave coming from said third base station in said first direct wave deriving process and a direct wave candidate selected from among direct wave candidates corresponding to said first base station while using direct wave candidates corresponding to said second base station as variables, and a third direct wave deriving process of performing positioning operations on combinations of direct wave candidates to determine approximate positions of said mobile station for a third time and positioning errors in said approximate positions for a third time and deriving said direct wave candidate corresponding to a positioning error of minimum value among said positioning errors determined for the third time as said reception signal corresponding to the direct wave coming from said first base station to said mobile station, said combinations being obtained by fixing said direct wave candidate derived as said reception signal resulting from the direct wave coming from said third base station in said first direct wave deriving process and said direct wave candidate derived as said reception signal resulting from the direct wave coming from said second base station in said second direct wave deriving process while using direct wave candidates corresponding to said first base station as variables; and in the fourth step, the present position of said mobile station is determined from said reception signals corresponding to the direct waves from said first, second, and third base stations, said reception signals being obtained in said first, second, and third direct wave deriving processes.

18. The positioning method according to claim 12, wherein:

in the second step, a plurality of direct wave candidates are extracted with respect to each of the radio waves coming from a plurality of base stations to said mobile station;

in the third step, a plurality of combinations of direct wave candidates are obtained by combining direct wave candidates selected in ones from among those of said respective base stations extracted in the second step, approximate positions of said mobile station and positioning errors in said approximate positions are determined from said plurality of combinations, respectively, and said direct wave candidates contained in a combination corresponding to said positioning error of minimum value are derived as said reception signals corresponding to the direct waves respectively coming from said plurality of base stations to said mobile station; and in the fourth step, the present position of said mobile station is determined from said reception signals corresponding to the direct waves respectively coming from said plurality of base stations to said mobile station, derived in the third step.

19. The positioning method according to claim 13, wherein:

in the second step, a plurality of direct wave candidates are extracted with respect to each of the radio waves coming from said mobile station to three base stations;

the third step includes a first direct wave deriving process of performing positioning operations on combinations of direct wave candidates to determine approximate positions of said mobile station and positioning errors in said approximate positions for said respective combinations and deriving said direct wave candidate corresponding to a positioning error of minimum value among said positioning errors determined for said respective combinations as said reception signal corresponding to the direct wave coming from said mobile station to a third base station out of said three base stations, said combinations being obtained by fixing two direct wave candidates selected in ones from among direct wave candidates corresponding to said first and second base stations while using direct wave candidates corresponding to said third base station as variables, a second direct wave deriving process of performing positioning operations on combinations of direct wave candidates to determine approximate positions of said mobile station for a second time and positioning errors in said approximate positions for a second time and deriving said direct wave candidate corresponding to a positioning error of minimum value among said positioning errors determined for the second time as said reception signal corresponding to the direct wave coming to said second base station, said combinations being obtained by fixing said direct wave candidate derived as said reception signal resulting from the direct wave coming to said third base station in said first direct wave deriving process and a direct wave candidate selected from among direct wave candidates corresponding to said first base station while using direct wave candidates corresponding to said second base station as variables, and a third direct wave deriving process of performing positioning operations on combinations of direct wave candidates to determine approximate positions of said mobile station for a third time and positioning errors in said approximate positions for a third time and deriving said direct wave candidate corresponding to a positioning error of minimum value among said positioning errors determined for the third time as said reception signal corresponding to the direct wave coming to said first base station, said combinations being obtained by fixing said direct wave candidate derived as said reception signal resulting from the direct wave coming to said third base station in said first direct wave deriving process and said direct wave candidate derived as said reception signal resulting from the direct wave coming to said second base station in said second direct wave deriving process while using direct wave candidates corresponding to said first base station as variables; and in the fourth step, the present position of said mobile station is determined from reception signals corresponding to the direct waves from said mobile station to said first, second, and third base stations, said reception signals being obtained in said first, second, and third direct wave deriving processes.

20. The positioning method according to claim 13, wherein:

in the second step, a plurality of direct wave candidates are extracted with respect to each of the radio waves coming from said mobile station to a plurality of base stations;

in the third step, a plurality of combinations of direct wave candidates are obtained by combining direct wave candidates selected in ones from among those of said respective base stations extracted in the second step, approximate positions of said mobile station and positioning errors in said approximate positions are determined from said plurality of combinations, respectively, and said direct wave candidates contained in a combination corresponding to said positioning error of minimum value are derived as said reception signals corresponding to the direct waves respectively coming to said plurality of base stations; and in the fourth step, the present position of said mobile station is determined from said reception signals corresponding to the direct waves respectively coming to said plurality of base stations, derived in the third step.

21. A positioning system for determining a present position of a mobile station lying within a communication area, a plurality of base stations being arranged within said communication area, said mobile station comprising:

receiving means for receiving radio waves coming from said plurality of base stations to generate reception signals corresponding to the respective radio waves;

direct wave candidate extracting means for extracting a plurality of direct wave candidates of the radio waves coming from said respective base stations, out of said reception signals generated by said receiving means;

deriving means for deriving reception signals equivalent to direct waves from said plurality of direct wave candidates extracted by said direct wave candidate extracting means; and positioning operation means for determining the present position of said mobile-station from said reception signals derived by said deriving means, wherein the present position of said mobile station is determined on the mobile- station side by using the radio waves coming from a plurality of base stations arranged within said communication area to said mobile station, and wherein said direct wave candidate extracting means extracts said direct wave candidates out of reception signals generated from radio waves coming to said receiving means within a predetermined time since the point of start of positioning.

22. A positioning system for determining a present position of a mobile station lying in a communication area, a plurality of base stations being arranged within said communication area, the positioning system comprising:

receiving means for receiving radio waves coming from said mobile station to generate reception signals corresponding to the respective radio waves, said receiving means being arranged in each of said plurality of base stations;

direct wave candidate extracting means for extracting a plurality of direct wave candidates of the radio waves coming to said respective base stations, out of said reception signals generated by said receiving means;

deriving means for deriving reception signals equivalent to direct waves from said plurality of direct wave candidates extracted by said direct wave candidate extracting means; and positioning operation means for determining the present position of said mobile station from said reception signals derived by said deriving means, wherein the present position of said mobile station is determined on the mobile-station side by using radio waves coming from said mobile station to a plurality of base stations arranged within said communication area, and wherein said direct wave candidate extracting means extracts said direct wave candidates out of reception signals generated from radio waves coming to said receiving means within a predetermined time since the point of start of positioning.

23. The positioning system according to claim 21 or 22, wherein said direct wave candidate extracting means extracts as said direct wave candidates a plurality of signals of greater reception intensities out of said reception signals generated from the radio waves coming to said receiving means within said predetermined time.

24. The positioning system according to claim 21 or 22 wherein said predetermined time is set in accordance with sizes of communication areas of said respective base stations.

25. The positioning system according to claim 21 or 22 wherein reception signals reaching predetermined reception intensities occur within said predetermined time.

26. The positioning system according to claim 21, wherein:

said direct wave candidate extracting means extracts a plurality of direct wave candidates with respect to each of the radio waves coming from three base stations to said mobile station;

said deriving means performs a first direct wave deriving process of performing positioning operations on combinations of direct wave candidates to determine approximate positions of said mobile station and positioning errors in said approximate positions for said respective combinations and deriving said direct wave candidate corresponding to a positioning error of minimum value among said positioning errors determined for said respective combinations as said reception signal corresponding to the direct wave coming from a third base station out of said three base stations to said mobile station, said combinations being obtained by fixing two direct wave candidates selected in ones from among direct wave candidates corresponding to said first and second base stations while using direct wave candidates corresponding to said third base station as variables, a second direct wave deriving process of performing positioning operations on combinations of direct wave candidates to determine approximate positions of said mobile station for a second time and positioning errors in said approximate positions for a second time and deriving said direct wave candidate corresponding to a positioning error of minimum value among said positioning errors determined for the second time as said reception signal corresponding to the direct wave coming from said second base station to said mobile station, said combinations being obtained by fixing said direct wave candidate derived as said reception signal resulting from the direct wave coming from said third base station in said first direct wave deriving process and a direct wave candidate selected from among direct wave candidates corresponding to said first base station while using direct wave candidates corresponding to said second base station as variables, and a third direct wave deriving process of performing positioning operations on combinations of direct wave candidates to determine approximate positions of said mobile station for a third time and positioning errors in said approximate positions for a third time and deriving said direct wave candidate corresponding to a positioning error of minimum value among said positioning errors determined for the third time as said reception signal corresponding to the direct wave coming from said first base station to said mobile station, said combinations being obtained by fixing said direct wave candidate derived as said reception signal resulting from the direct wave coming from said third base station in said first direct wave deriving process and said direct wave candidate derived as said reception signal resulting from the direct wave coming from said second base station in said second direct wave deriving process while using direct wave candidates corresponding to said first base station as variables; and said positioning operation means determines the present position of said mobile station from reception signals corresponding to the direct waves from said first, second, and third base stations, said reception signals being obtained in said first, second, and third direct wave deriving processes.

27. The positioning system according to claim 21, wherein:

said direct wave candidate extracting means extracts a plurality of direct wave candidates with respect to each of the radio waves coming from a plurality of base stations to said mobile station;

said deriving means obtains a plurality of combinations of direct wave candidates by combining direct wave candidates selected in ones from among those of said respective base stations extracted by said direct wave candidate extracting means, determines approximate positions of said mobile station and positioning errors in said approximate positions from said plurality of combinations, respectively, and derives said direct wave candidates contained in a combination corresponding to said positioning error of minimum value as said reception signals corresponding to the direct waves respectively coming from said plurality of base stations to said mobile station; and said positioning operation means determines the present position of said mobile station from said reception signals corresponding to the direct waves respectively coming from said plurality of base stations to said mobile station, derived by said deriving means.

28. The positioning system according to claim 22, wherein:

said direct wave candidate extracting means extracts a plurality of direct wave candidates with respect to each of the radio waves coming from said mobile station to three base stations;

said deriving means performs a first direct wave deriving process of performing positioning operations on combinations of direct wave candidates to determine approximate positions of said mobile station and positioning errors in said approximate positions for said respective combinations and deriving said direct wave candidate corresponding to a positioning error of minimum value among said positioning errors determined for said respective combinations as said reception signal corresponding to the direct wave coming from said mobile station to a third base station out of said three base stations, said combinations being obtained by fixing two direct wave candidates selected in ones from among direct wave candidates corresponding to said first and second base stations while using direct wave candidates corresponding to said third base station as variables, a second direct wave deriving process of performing positioning operations on combinations of direct wave candidates to determine approximate positions of said mobile station for a second time and positioning errors in said approximate positions for a second time and deriving said direct wave candidate corresponding to a positioning error of minimum value among said positioning errors determined for the second time as said reception signal corresponding to the direct wave coming to said second base station, said combinations being obtained by fixing said direct wave candidate derived as said reception signal resulting from the direct wave coming to said third base station in said first direct wave deriving process and a direct wave candidate selected from among direct wave candidates corresponding to said first base station while using direct wave candidates corresponding to said second base station as variables, and a third direct wave deriving process of performing positioning operations on combinations of direct wave candidates to determine approximate positions of said mobile station for a third time and positioning errors in said approximate positions for a third time and deriving said direct wave candidate corresponding to a positioning error of minimum value among said positioning errors determined for the third time as said reception signal corresponding to the direct wave coming to said first base station, said combinations being obtained by fixing said direct wave candidate derived as said reception signal resulting from the direct wave coming to said third base station in said first direct wave deriving process and said direct wave candidate derived as said reception signal resulting from the direct wave coming to said second base station in said second direct wave deriving process while using direct wave candidates corresponding to said first base station as variables; and said positioning operation means determines the present position of said mobile station from reception signals corresponding to the direct waves from said mobile station to said first, second, and third base stations, said reception signals being obtained in said first, second, and third direct wave deriving processes.

29. The positioning system according to claim 22, wherein:

said direct wave candidate extracting means extract a plurality of direct wave candidates with respect to each of the radio waves coming from said mobile station to a plurality of base stations;

said deriving means obtains a plurality of combinations of direct wave candidates by combining direct wave candidates selected in ones from among those of said respective base stations extracted by said direct wave candidate extracting means, determines approximate positions of said mobile station and positioning errors in said approximate positions from said plurality of combinations, respectively, and derives said direct wave candidates contained in a combination corresponding to said positioning error of minimum value as said reception signals corresponding to the direct waves respectively coming to said plurality of base stations; and said positioning operation means determines the present position of said mobile station from said reception signals corresponding to the direct waves respectively coming to said plurality of base stations, derived by said deriving means.

30. A positioning apparatus for determining a present position of a mobile station by using radio waves coming from a plurality of base stations arranged within a communication area, the positioning apparatus being arranged in said mobile station, the positioning apparatus comprising:

a receiving unit which receives the radio waves coming from said plurality of base stations to generate reception signals corresponding to the respective radio waves;

a range measuring unit which extracts a plurality of direct wave candidates of the radio waves coming from said respective base stations, out of said reception signals generated by said receiving unit;

a direct wave detecting unit which derives reception signals equivalent to direct waves from said plurality of direct wave candidates extracted by said range measuring unit; and a position computing unit which determines the present position of said mobile station from said reception signals derived by said direct wave detecting unit, wherein said range measuring unit extracts said direct wave candidates out of reception signals generated from radio waves coming to said receiving unit within a predetermined time since the point of start of positioning.

31. A positioning apparatus for determining a present position of a mobile station by using radio waves coming from said mobile station to a plurality of base stations arranged within a communication area, the positioning apparatus being arranged on the base-station side, the positioning apparatus comprising:

a receiving unit which receives the radio waves coming from said mobile station to generate reception signals corresponding to the respective radio waves, said receiving unit being arranged in each of said plurality of base stations;

a range measuring unit which extracts a plurality of direct wave candidates of the radio waves coming to said respective base stations, out of said reception signals generated by said receiving unit;

a direct wave detecting unit which derives reception signals equivalent to direct waves from said plurality of direct wave candidates extracted by said range measuring unit; and a position computing unit which determines the present position of said mobile station from said reception signals derived by said direct wave detecting unit, wherein said range measuring unit extracts said direct wave candidates out of reception signals generated from radio waves coming to said receiving unit within predetermined time since the point of start of positioning.

32. The positioning apparatus according to claim 30 or 31, wherein said range measuring unit extracts as said direct wave candidates a plurality of signals of greater reception intensities out of said reception signals generated from the radio waves coming to said receiving unit within said predetermined time.

33. The positioning apparatus according to claim 30 or 31, wherein said predetermined time is set in accordance with respective sizes of communication areas of said respective base stations.

34. The positioning apparatus according to claim 30 or 31, wherein reception signals reaching predetermined reception intensities occur within said predetermined time.

35. The positioning apparatus according to claim 30, wherein:

said range measuring unit extracts a plurality of direct wave candidates with respect to each of the radio waves coming from three base stations to said mobile station;

said direct wave detecting unit performs a first direct wave deriving process of performing positioning operations on combinations of direct wave candidates to determine approximate positions of said mobile station and positioning errors in said approximate positions for said respective combinations and deriving said direct wave candidate corresponding to a positioning error of minimum value among said positioning errors determined for said respective combinations as said reception signal corresponding to the direct wave coming from a third base station out of said three base stations to said mobile station, said combinations being obtained by fixing two direct wave candidates selected in ones from among direct wave candidates corresponding to said first and second base stations while using direct wave candidates corresponding to said third base station as variables, a second direct wave deriving process of performing positioning operations on combinations of direct wave candidates to determine approximate positions of said mobile station for a second time and positioning errors in said approximate positions for a second time and deriving said direct wave candidate corresponding to a positioning error of minimum value among said positioning errors determined for the second time as said reception signal corresponding to the direct wave coming from said second base station to said mobile station, said combinations being obtained by fixing said direct wave candidate derived as said reception signal resulting from the direct wave coming from said third base station in said first direct wave deriving process and a direct wave candidate selected from among direct wave candidates corresponding to said first base station while using direct wave candidates corresponding to said second base station as variables, and a third direct wave deriving process of performing positioning operations on combinations of direct wave candidates to determine approximate positions of said mobile station for a third time and positioning errors in said approximate positions for a third time and deriving said direct wave candidate corresponding to a positioning error of minimum value among said positioning errors determined for the third time as said reception signal corresponding to the direct wave coming from said first base station to said mobile station, said combinations being obtained by fixing said direct wave candidate derived as said reception signal resulting from the direct wave coming from said third base station in said first direct wave deriving process and said direct wave candidate derived as said reception signal resulting from the direct wave coming from said second base station in said second direct wave deriving process while using direct wave candidates corresponding to said first base station as variables; and said position computing unit determines the present position of said mobile station from three reception signals corresponding to the three direct waves from said first, second, and third base stations, said reception signals being obtained in said first, second, and third direct wave deriving processes.

36. The positioning apparatus according to claim 30, wherein:

said range measuring unit extracts a plurality of direct wave candidates with respect to each of the radio waves coming from a plurality of base stations to said mobile station;

said direct wave detecting unit obtains a plurality of combinations of direct wave candidates by combining direct wave candidates selected in ones from among those of said respective base stations extracted by said range measuring unit, determines approximate positions of said mobile station and positioning errors in said approximate positions from said plurality of combinations, respectively, and derives said direct wave candidates contained in a combination corresponding to said positioning error of minimum value as said reception signals corresponding to the direct waves respectively coming from said plurality of base stations to said mobile station; and said position computing unit determines the present position of said mobile station from said reception signals corresponding to the direct waves respectively coming from said plurality of base stations, derived by said direct wave detecting unit.

37. The positioning apparatus according to claim 31, wherein:

said range measuring unit extracts a plurality of direct wave candidates with respect to each of the radio waves coming from said mobile station to three base stations;

said direct wave detecting unit performs a first direct wave deriving process of performing positioning operations on combinations of direct wave candidates to determine approximate positions of said mobile station and positioning errors in said approximate positions for said respective combinations and deriving said direct wave candidate corresponding to a positioning error of minimum value among said positioning errors determined for said respective combinations as said reception signal corresponding to the direct wave coming from said mobile station to a third base station out of said three base stations, said combinations being obtained by fixing two direct wave candidates selected in ones from among direct wave candidates corresponding to said first and second base stations while using direct wave candidates corresponding to said third base station as variables, a second direct wave deriving process of performing positioning operations on combinations of direct wave candidates to determine approximate positions of said mobile station for a second time and positioning errors in said approximate positions for a second time and deriving said direct wave candidate corresponding to a positioning error of minimum value among said positioning errors determined for the second time as said reception signal corresponding to the direct wave coming from said mobile station to said second base station, said combinations being obtained by fixing said direct wave candidate derived as said reception signal resulting from the direct wave coming to said third base station in said first direct wave deriving process and a direct wave candidate selected from among direct wave candidates corresponding to said first base station while using direct wave candidates corresponding to said second base station as variables, and a third direct wave deriving process of performing positioning operations on combinations of direct wave candidates to determine approximate positions of said mobile station for a third time and positioning errors in said approximate positions for a third time and deriving said direct wave candidate corresponding to a positioning error of minimum value among said positioning errors determined for the third time as said reception signal corresponding to the direct wave coming from said mobile station to said first base station, said combinations being obtained by fixing said direct wave candidate derived as said reception signal resulting from the direct wave coming to said third base station in said first direct wave deriving process and said direct wave candidate derived as said reception signal resulting from the direct wave coming to said second base station in said second direct wave deriving process while using direct wave candidates corresponding to said first base station as variables; and said position computing unit determines the present position of said mobile station from reception signals corresponding to the direct waves from said mobile station to said first, second, and third base stations, said reception signals being obtained in said first, second, and third direct wave deriving processes.

38. The positioning apparatus according to claim 31, wherein:

said range measuring unit extracts a plurality of direct wave candidates with respect to each of the radio waves coming from said mobile station to a plurality of base stations;

said direct wave detecting unit obtains a plurality of combinations of direct wave candidates by combining direct wave candidates selected in ones from among those of said respective base stations extracted by said range measuring unit, determines approximate positions of said mobile station and positioning errors in said approximate positions from said plurality of combinations, respectively, and derives said direct wave candidates contained in a combination corresponding to said positioning error of minimum value as said reception signals corresponding to the direct waves respectively coming from said mobile station to said plurality of base stations; and said position computing unit determines the present position of said mobile station from said reception signals corresponding to the direct waves respectively coming to said plurality of base stations, derived by said direct wave detecting unit.

39. A positioning apparatus comprising a first positioning device including said receiving unit, said range measuring unit, said direct wave detecting unit, and said position computing unit set forth in claim 30, further comprising:

a second positioning device which determines the present position of said mobile station by using the GPS; and a control unit which switches to the positioning by said second positioning device in cases where the present position of said mobile station determined by said first positioning device exceeds a predetermined positioning error.

40. A positioning apparatus comprising a first positioning device including said receiving unit, said range measuring unit, said direct wave detecting unit, and said positioning computing unit set forth in claim 30, further comprising:

a second positioning device which determines the present position of said mobile station by using the GPS;

a power supply which supplies driving power to said first and second positioning device; and a power supply control unit which detects a remaining amount of charge of said power supply and switches the supply of said driving power from said power supply between said first positioning device and said second positioning device, depending on the remaining amount of charge detected.

41. A positioning system for determining a present position of a mobile station lying within a communication area, a plurality of base stations being arranged within said communication area, said mobile station comprising:

a receiving unit which receives radio waves coming from said plurality of base stations to generate reception signals corresponding to the respective radio waves;

a range measuring unit which extracts a plurality of direct wave candidates of the radio waves coming from said respective base stations, out of said reception signals generated by said receiving unit;

a direct wave detecting unit which derives reception signals equivalent to direct waves from said plurality of direct wave candidates extracted by said range measuring unit; and a position computing unit which determines the present position of said mobile station from said reception signals derived by said direct wave detecting unit, wherein the present position of said mobile station is determined on the mobile-station side by using the radio waves coming from a plurality of base stations arranged within said communication area to said mobile station, and wherein said range measuring unit extracts said direct wave candidates out of reception signals generated from radio waves coming to said receiving unit within a predetermined time since the point of start of positioning.

42. A positioning system for determining a present position of a mobile station lying in a communication area, a plurality of base stations being arranged within said communication area, the positioning system comprising:

a receiving unit which receives radio waves coming from said mobile station to generate reception signals corresponding to the respective radio waves, said receiving unit being arranged in each of said plurality of base stations;

a range measuring unit which extracts a plurality of direct wave candidates of the radio waves coming to said respective base stations, out of said reception signals generated by said receiving unit;

a direct wave detecting unit which derives reception signals equivalent to direct waves from said plurality of direct wave candidates extracted by said range measuring unit; and a position computing unit which determines the present position of said mobile station from said reception signals derived by said direct wave detecting unit, wherein the present position of said mobile station is determined on the base-station side by using radio waves coming from said mobile station to a plurality of base stations arranged within said communication area, and wherein said range measuring unit extracts said direct wave candidates out of reception signals generated from radio waves coming to said receiving unit within a predetermined time since the point of start of positioning.

43. The positioning system according to claim 41 or 42, wherein said range measuring unit extracts as said direct wave candidates a plurality of signals of greater reception intensities out of said reception signals generated from the radio waves coming to said receiving unit within said predetermined time.

44. The positioning system according to claim 41 or 42, wherein said predetermined time is set in accordance with a size of communication area of said respective base stations.

45. The positioning system according to claim 41 or 42, wherein reception signals reaching predetermined reception intensities occur within said predetermined time.

46. The positioning system according to claim 41, wherein:

said range measuring unit extracts a plurality of direct wave candidates with respect to each of the radio waves coming from three base stations to said mobile station;

said direct wave detecting unit performs a first direct wave deriving process of performing positioning operations on combinations of direct wave candidates to determine approximate positions of said mobile station and positioning errors in said approximate positions for said respective combinations and deriving said direct wave candidate corresponding to a positioning error of minimum value among said positioning errors determined for said respective combinations as said reception signal corresponding to the direct wave coming from a third base station out of said three base stations to said mobile station, said combinations being obtained by fixing two direct wave candidates selected in ones from among direct wave candidates corresponding to said first and second base stations while using direct wave candidates corresponding to said third base station as variables, a second direct wave deriving process of performing positioning operations on combinations of direct wave candidates to determine approximate positions of said mobile station for a second time and positioning errors in said approximate positions for a second time and deriving said direct wave candidate corresponding to a positioning error of minimum value among said positioning errors determined for the second time as said reception signal corresponding to the direct wave coming from said second base station to said mobile station, said combinations being obtained by fixing said direct wave candidate derived as said reception signal resulting from the direct wave coming from said third base station in said first direct wave deriving process and a direct wave candidate selected from among direct wave candidates corresponding to said first base station while using direct wave candidates corresponding to said second base station as variables, and a third direct wave deriving process of performing positioning operations on combinations of direct wave candidates to determine approximate positions of said mobile station for a third time and positioning errors in said approximate positions for a third time and deriving said direct wave candidate corresponding to a positioning error of minimum value among said positioning errors determined for the third time as said reception signal corresponding to the direct wave coming from said first base station to said mobile station, said combinations being obtained by fixing said direct wave candidate derived as said reception signal resulting from the direct wave coming from said third base station in said first direct wave deriving process and said direct wave candidate derived as said reception signal resulting from the direct wave coming from said second base station in said second direct wave deriving process while using direct wave candidates corresponding to said first base station as variables; and said position computing unit determines the present position of said mobile station from reception signals corresponding to the direct waves from said first, second, and third base stations, said reception signals being obtained in said first, second, and third direct wave deriving processes.

47. The positioning system according to claim 41, wherein:

said range measuring unit extracts a plurality of direct wave candidates with respect to each of the radio waves coming from a plurality of base stations to said mobile station;

said direct wave detecting unit obtains a plurality of combinations of direct wave candidates by combining direct wave candidates selected in ones from among those of said respective base stations extracted by said range measuring unit, determines approximate positions of said mobile station and positioning errors in said approximate positions from said plurality of combinations, respectively, and derives said direct wave candidates contained in a combination corresponding to said positioning error of minimum value as said reception signals corresponding to the direct waves respectively coming from said plurality of base stations to said mobile station; and said position computing unit determines the present position of said mobile station from said reception signals corresponding to the direct waves respectively coming from said plurality of base stations to said mobile station, derived by said direct wave detecting unit.

48. The positioning system according to claim 42, wherein:

said range measuring unit extracts a plurality of direct wave candidates with respect to each of the radio waves coming from said mobile station to three base stations;

said direct wave detecting unit performs a first direct wave deriving process of performing positioning operations on combinations of direct wave candidates to determine approximate positions of said mobile station and positioning errors in said approximate positions for said respective combinations and deriving said direct wave candidate corresponding to a positioning error of minimum value among said positioning errors determined for said respective combinations as said reception signal corresponding to the direct wave coming from said mobile station to a third base station out of said three base stations, said combinations being obtained by fixing two direct wave candidates selected in ones from among direct wave candidates corresponding to said first and second base stations while using direct wave candidates corresponding to said third base station as variables;

a second direct wave deriving process of performing positioning operations on combinations of direct wave candidates to determine approximate positions of said mobile station for a second time and positioning errors in said approximate positions for a second time and deriving said direct wave candidate corresponding to a positioning error of minimum value among said positioning errors determined for the second time as said reception signal corresponding to the direct wave coming to said second base station, said combinations being obtained by fixing said direct wave candidate derived as said reception signal resulting from the direct wave coming to said third base station in said first direct wave deriving process and a direct wave candidate selected from among direct wave candidates corresponding to said first base station while using direct wave candidates corresponding to said second base station as variables;

a third direct wave deriving process of performing positioning operations on combinations of direct wave candidates to determine approximate positions of said mobile station for a third time and positioning errors in said approximate positions for a third time and deriving said direct wave candidate corresponding to a positioning error of minimum value among said positioning errors determined for the third time as said reception signal corresponding to the direct wave coming to said first base station, said combinations being obtained by fixing said direct wave candidate derived as said reception signal resulting from the direct wave coming to said third base station in said first direct wave deriving process and said direct wave candidate derived as said reception signal resulting from the direct wave coming to said second base station in said second direct wave deriving process while using direct wave candidates corresponding to said first base station as variables; and said position computing unit determines the present position of said mobile station from reception signals corresponding to the direct waves from said mobile station to said first, second, and third base stations, said reception signals being obtained in said first, second, and third direct wave deriving processes.

49. The positioning system according to claim 42, wherein:
said range measuring unit extracts a plurality of direct wave candidates with respect to each of the radio waves coming from said mobile station to a plurality of base stations;
said direct wave detecting unit obtains a plurality of combinations of direct wave candidates by combining direct wave candidates selected in ones from among those of said respective base stations extracted by said range measuring unit, determines approximate positions of said mobile station and positioning errors in said approximate positions from said plurality of combinations, respectively, and derives said direct wave candidates contained in a combination corresponding to said positioning error of minimum value as said reception signals corresponding to the direct waves respectively coming to said plurality of base stations; and
said position computing unit determines the present position of said mobile station from said reception signals corresponding to the direct waves respectively coming to said plurality of base stations, derived by said direct wave detecting unit.

* * * * *